(12) United States Patent
Kantajaraniti et al.

(10) Patent No.: US 9,278,668 B2
(45) Date of Patent: Mar. 8, 2016

(54) BRAKE/CLUTCH LOCKING DEVICE HAVING ANTI-LOCK MECHANISM

(76) Inventors: Kamol Kantajaraniti, Bangkok (TH); Suwat Petcharapirat, Prachuapkhirikhan (TH)

( * ) Notice: Subject to any disclaimer, the term of this patent is extended or adjusted under 35 U.S.C. 154(b) by 770 days.

(21) Appl. No.: 13/522,170

(22) PCT Filed: Jan. 14, 2011

(86) PCT No.: PCT/TH2011/000001
§ 371 (c)(1),
(2), (4) Date: Jul. 13, 2012

(87) PCT Pub. No.: WO2011/087463
PCT Pub. Date: Jul. 21, 2011

(65) Prior Publication Data
US 2013/0008212 A1    Jan. 10, 2013

(30) Foreign Application Priority Data

| Jan. 14, 2010 | (TH) | 1001000056 |
|---|---|---|
| Jan. 14, 2010 | (TH) | 1001000057 |
| Jan. 14, 2010 | (TH) | 1001000059 |
| Apr. 26, 2010 | (TH) | 1003000351 |

(51) Int. Cl.
| B60R 25/00 | (2013.01) |
| B60R 25/022 | (2013.01) |
| B60R 25/08 | (2006.01) |

(52) U.S. Cl.
CPC ............ *B60R 25/005* (2013.01); *B60R 25/022* (2013.01); *B60R 25/0221* (2013.01); *B60R 25/08* (2013.01); *Y10T 70/5717* (2015.04)

(58) Field of Classification Search
CPC .. B60R 25/005; B60R 25/006; B60R 25/007; B60R 25/022; B60R 25/0221; B60R 25/0225; B60R 25/06; B60R 25/063; B60R 25/066; B60R 25/08; B60R 25/083; B60R 25/086
USPC ............ 70/198–204, 228, 237, 238, 253, 254
See application file for complete search history.

(56) References Cited

U.S. PATENT DOCUMENTS

| 2,336,829 A | * | 12/1943 | Zimmermann et al. | ........ 70/199 |
| 4,432,432 A | * | 2/1984 | Martin | ............................ 70/238 |
| 4,887,443 A | * | 12/1989 | Wang | ............................. 70/209 |

(Continued)

FOREIGN PATENT DOCUMENTS

| EP | 0397588 A1 | 11/1990 |
| EP | 0404709 A1 | 12/1990 |

(Continued)

*Primary Examiner* — Christopher Boswell
(74) *Attorney, Agent, or Firm* — Fabian VanCott; Steven L. Nichols

(57) ABSTRACT

A brake/clutch locking system has a brake panel-blocking rod attached to a slidable axial tube in an axial tube to which an anti-lock mechanism is connected. A block in a chamber operatively coupled to a coil spring has a mass that produces more kinetic energy than the coil spring. The block has a shoulder portion with a shape corresponding to a protruding lower edge of a coil spring biased pin that slides into a bored hole provided in the wall of the axial tube and on the slidable axial tube, blocking movement of the slidable axial tube when an external force applied to the block creates a sufficient amount of kinetic energy to move the block from the protruding edge of the pin.

27 Claims, 29 Drawing Sheets

(56) References Cited

U.S. PATENT DOCUMENTS

| | | | |
|---|---|---|---|
| 5,121,617 A * | 6/1992 | Chen | 70/209 |
| 5,345,796 A * | 9/1994 | Chieh et al. | 70/202 |
| 6,192,724 B1 * | 2/2001 | Vito | 70/202 |
| 6,202,456 B1 * | 3/2001 | Vickers | 70/202 |
| 6,575,001 B1 * | 6/2003 | Simon et al. | 70/202 |
| 6,662,894 B2 * | 12/2003 | Chantrasuwan et al. | 70/202 |
| 7,412,859 B2 * | 8/2008 | Lycoudis | 70/202 |

FOREIGN PATENT DOCUMENTS

| | | |
|---|---|---|
| GB | 2211545 A | 7/1989 |
| WO | 02102630 A1 | 12/2002 |
| WO | 2004108488 A1 | 12/2004 |

\* cited by examiner

BRAKE/CLUTCH LOCKING DEVICE HAVING ANTI-LOCK MECHANISM

CROSS-REFERENCE TO RELATED APPLICATIONS

The present application claims the priority under 35 U.S.C. 119(a)-(d) or (f) and under C.F.R. 1.55(a) of previous International Patent Application No.: PCT/TH2011/000001, filed Jan. 14, 2011, entitled "Brake/Clutch Locking Device Having Anti-Lock Mechanism", which claims priority to Thailand Patent Applications TH 1001000056, TH 1001000057, TH 1001000059 filed on Jan. 14, 2010, and TH 1003000351 filed on Apr. 26, 2010, each entitled "An Anti-Lock Mechanism For Use With Brake/Clutch Locking Device". This application claims the earlier filing dates of the above-identified related applications. Each of the above-identified related applications is incorporated in the entirety herein by reference.

BACKGROUND OF THE INVENTION

The present invention relates to an anti-lock mechanism for use with a brake/clutch locking device.

Today, many manufacturers are doing research to provide a brake/clutch locking device. However, there are still some limitations in the use of each device. Some devices include many locking mechanisms and thus lead to extremely complicated operation. This is especially true for a brake/clutch locking device in the form of a slidable axial tube used in pulling the lock. Such a device lacks a mechanism that prevents locking due to impact when the device is in the unlocked state. Sometimes, the brake/clutch locking device may unintentionally be locked while being subjected to an external impact, resulting in the driver being unable to step on the brake pedal to stop the vehicle. One of the reasons why the anti-lock mechanism has been developed for use with the brake/clutch locking device according to the present invention is to solve the above problems and provide more safety to consumers.

BRIEF SUMMARY OF THE INVENTION

Briefly stated, the first preferred embodiment of an anti-lock mechanism 100 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 100 comprises a block 5 with appropriate shape and size slidable inside a mechanical chamber 16. The block 5 is provided with a spring 24 used in pushing the rear end of the block 5. The front end of the block 5 has a shoulder portion 5a having a shape corresponding to the protruding lower edge of a pin 11 inside a pin chamber and provided with a coil spring 12 to prevent the slidable axial tube 2 from sliding to be locked in a locking position of the brake/clutch locking device through the bored hole 13 provided on the wall of the axial tube 1 and on the slidable axial tube 2 in a position upstream of a locking position of the brake/clutch locking device of an automobile. When an external force of more than 20 kg·f is applied to the main structure of the automobile in a relative direction and angle, the block 5 may produce sufficient kinetic energy for the block 5 to overcome the coil spring 24 resistance to compress the coil spring 24 and thereby move the front shoulder 5a of the block 5 outwards the protruding edge of the pin 11. The pin 11, therefore, slides down into the bored hole 13 and blocks the movement of the slidable axial tube 2, which, in turn, prevents the brake/clutch locking device from sliding into the brake/clutch locking position. At the end of the pin 11, an axle 30 is provided extending through the wall of the mechanical chamber 16 in the outward direction to pull the pin 11 out of the position that blocks the slidable axial tube 2 to place the pin 11 onto the shoulder 5a of the block 5. The pin 11 is placed into the position suitable for preventing the brake/clutch locking device from entering the locking position in relation with the retreating of the block 5 along with the block holding axle 3a protruding through a slot 16a on top of the mechanical chamber 16.

The second preferred embodiment of an anti-lock mechanism 200 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 200 comprises a block 25 having a shape and size suitable for a sliding motion within the mechanical chamber 216 and a spring 224 used in pushing the rear end of the block 25. The front end of the block 25 is in the shape of the axle 25a with a rounded tip extending in correspondence with the protruding edge of the pin 211 having a curved top located in the mechanical chamber 216 and provided with a coil spring 212 for use in preventing the slidable axial tube 2 of the brake/clutch locking device from sliding to be locked in a locking position of the brake/clutch locking device through a bored hole 13 provided on a wall of the axial tube 1 and on the slidable axial tube 2 in a position upstream of a locking position of the brake/clutch locking device of an automobile. One side of an edge of the bored hole 13 on the slidable axial tube 2 of the brake/clutch locking device for use with the anti-lock mechanism 200 is a sloped portion 13a for convenience in pushing the end portion of the pin 11 back into the position while the slidable axial tube 2 is backed into the normal state. When an external force of more than 20 kg·f is applied to the main structure of the automobile in a relative direction and angle, the block 25 may produce sufficient kinetic energy for the block 25 to overcome the coil spring 224 resistance to move the front shoulder 25a of the block 25, which is in the shape of the round axle outward from the protruding edge of the pin 11. The pin 11 thus slides down into the bored hole 13 and prevents the slidable axial tube 2 from moving into the locking position with the abovementioned pin end 11 protruding out of the wall of the slidable axial tube 2 in the crossing direction adjacent to the axial tube 1. At the upper end portion of the pin 11, there is an axle 30 extending outward through the mechanical chamber 16. In the present embodiment of FIG. 4-6, the resetting of the anti-lock mechanism 200 occurs automatically without the need for the user to perform a manual reset as in the previous embodiment. Once the end portion of the pin 11 meets the sloped portion 13a, the continued movement of the slidable axial tube 2 causes the pin 11 to be urged upward back into the position while the slidable axial tube 2 is in the normal state.

The third embodiment of the anti-lock mechanism 300 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 300 comprises rings 345a and 345b that partitions the lock protecting mechanism chamber inside the slidable axial tube 2. Inside the lock protecting mechanism chamber, the pin 311 and the block 35 with appropriate shape and size are slidable inside the slidable axial tube 2 and engaged with an axle of the screwing mechanism 6 of the brake/clutch locking device. The block 35 is provided with a coil spring 324. The front part of the block 35 is in the form of a shoulder 35a. The shoulder 35a has a shape that corresponds to the protruding edge of the pin 311 located inside the slidable axial tube 2. The shoulder 35a is also provided with the coil spring 312 for preventing the slidable axial tube 2 from sliding to be locked at the locking position of the brake/clutch locking device through a bush 346 on the wall of the slidable axial tube 2 and the bored hole 13 on the wall of the axial tube 1 in a position upstream of the locking position of the brake/clutch locking device of an automobile. One edge of the bored hole 13 on the axial tube 1 is a sloped portion 13a for the sake of pushing the pin 311 back into the normal position after the slidable axial tube 2 slides back into the normal unlocked state. When an external force of more than 20 kg·f is applied to the main structure of an automobile in a relative direction and angle, the block 35 may produce sufficient kinetic energy to the block 35 to overcome the coil spring 324 resistance to move the front shoulder 35a of the block 35 to outward from the protruding edge of the pin 311. The pin 311, therefore, slides down into the bored hole 13 on the axial tube 1 and prevents the slidable axial tube 2 from moving into the locking position with the abovementioned pin end 311 protruding out of the wall of the slidable axial tube 2 in the crossing direction adjacent to the axial tube1. At the end portion of the block 35, there is provided an extending axle end 347 in the groove on the wall of the slidable axial tube 2 to prevent the pivotally movement of the block 35 around the axle of the screwing mechanism 6.

The fourth preferred embodiment of the anti-lock mechanism 400 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 400 comprises a block 45 with appropriate shape and size slidable inside the slidable axial tube 2. The block 45 has a round shoulder as an engaging end 45b. Inside the axial tube 2 is provided with a return spring 4. The lower end of the return spring 4 pushes the block 45 on the engaging end 45b. The other end of the return spring 4 pushes the end of the first locking mechanism 6 connected inside the axial tube 1. A pin 411 with a coil spring 412 used in driving the end portion of the pin 411 to slide into the locking position which is provided on the body of the block 45. The predetermined bored hole 13 is the locking position on the wall of the slidable axial tube 2 in the position upstream of the locking position of the brake/ clutch locking device. When an external force of more than 20 kg·f is applied to the main structure of an automobile in a relative direction and angle, sufficient kinetic energy may be produced to the block 45 to move the block 45 into the engaging position in preventing the brake/clutch locking device into the locking position.

The block 45 has an axle 45c protruding into a slot on the slidable axial tube 2. With the abovementioned pin end 411 protruding through a predetermined bored hole 13 on the wall of the slidable axial tube 2, the slidable axial tube 2 is then blocked with the edge of the axial tube 1 in the position upstream from the position so that the break/clutch locking device is unable to move into the lock position.

The fifth preferred embodiment of an anti-lock mechanism 500 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 500 comprises a block 55 with appropriate shape and size slidable inside the slidable axial tube 2 at the lower end of the slidable axial tube 2. Inside the slidable axial tube 2 is provided with a return spring 4 in which the lower end of the return spring 4 is pushing against a partitioning ring 545. The other end of the return spring 4 pushes the end of the turning mechanism 6 inside the axial tube 1. The block 55 has a rounded shoulder as an engaging end 55b persistently urged at one end of a spring 524. The other end of the spring 524 pushes against a partitioning ring 545. A pin 511 and a coil spring 512 are used in driving the end portion of the pin 511 to slide into the locking position provided on the body of the block 55. The predetermined bored hole 13 is the locking position on the wall of the slidable axial tube 2 in the position upstream of the locking position of the brake/clutch locking device. When an external force of more than 20 kg·f is applied to the main structure of an automobile in a relative direction and angle, sufficient kinetic energy may be produced to move the block 55 into the locking position. The block 55 has an axle 55c protruding into a slot on the slidable axial tube 2. With the abovementioned pin end 511 protruding through a predetermined bored hole 13 on the wall of the slidable axial tube 2, then the slidable axial tube 2 is blocked with the edge of the axial tube 1 in the position upstream from the position so that the break/clutch locking device cannot proceed into the locked position.

The sixth preferred embodiment of an anti-lock mechanism 600 for use with the brake/clutch locking device having an axial tube 1 and a slidable axial tube 2, a slot 34 a provided as a locking position for the brake/clutch locking device and at the same time it is used as a blocking position of the anti-lock mechanism so that the slot 34a is being used as an anti-lock location. The anti-lock mechanism 600 comprises a block 65 with appropriate shape and size slidable inside a mechanical chamber 616 with a slot 616a on a side wall of the mechanical chamber 616. The mechanical chamber 616 is placed in an end collar 22 of the second locking mechanism 10 of the brake/clutch locking device. The front end of the block 65 has an axle 630 protruding into the center hole 616b which is opposite to the open end of the mechanical chamber 616. On one side of the block 65 there is a dowel 611 slidable in the slot 616a and on the opposite site provided with a spring 624 and a pin 612 inside a hole 65b. Two mating holes (616c, 616d) are provided corresponding to the pin 612 on the internal wall of the mechanical chamber 616. There is a spring 21 at the front end of the mechanical chamber 616 and one end of the spring 21 pushing the wall of the second locking mechanism 10 chamber. When an external force of more than 20 kg·f is applied to the main structure of an automobile in a relative direction and angle, sufficient amount of kinetic energy may be produced to move the block 65 from the mating hole 616c to the mating hole 616d on the inner wall of the mechanical chamber 616, then the dowel 611 will slide into the slot 34a of the plate 34 of the brake/clutch locking device. The anti-locking mechanism is in an engaged position.

The first preferred embodiment of a brake/clutch locking device 190 having an anti-lock mechanism. The brake/clutch locking device 190 according to the present invention comprises an axial tube 1 and a slidable axial tube 2. One end of a slidable axial tube 2 is inserted inside the axial tube 1. The other end of the slidable axial tube 2 is provided with the blocking panel rod 3 attached thereto. Inside the axial tube 1 is provided with a return spring 4 wherein the axial tube 1 and the slidable axial tube 2 include a lock-pulling mechanism 29. The lower end of a first lock pulling mechanism 7 is connected with the brake/clutch panel-blocking rod 3. The upper end of the first lock pulling mechanism 7 is inserted through a collar 8 supporting the first lock pulling mechanism 7 on the wall of the axial tube 1 and connected with the lower end of a second lock pulling mechanism 9 used in defining a retreating sliding distance of the slidable axial tube 2 to prevent movement out of the end of the axial tube 1. The upper end of the axial tube 1 is the mounting part for the first locking mechanism 6 and the second locking mechanism 10 on the side of the first locking mechanism 6. The present brake/clutch locking device 190 further comprises a holding leg 14. One end of the holding leg 14 is fixed to the axial tube 1. The other end acts as a steering wheel cylinder. Further, the present brake/clutch locking device 190 also includes a first locking mechanism 6 on the upper end of the axial tube 1 comprising a turning mechanism 15 within the housing 23 which is turned by a key and a pin 17 working correspondingly wherein the pin 17 includes a pin 18 inside a housing 23b along with a spring 19 pushing an end of the slidable pin 18 to be locked with the bored holes 18c on the slidable axial tube 2 located in the corresponding position when the second lock pulling mechanism 9 is pulled to lock the brake/clutch locking device 190. The lateral portion of the first locking mechanism 6 further comprises a second locking mechanism 10 having a turning mechanism 15a which is turned by the key of the turning mechanism 15 wherein a lower portion of the turning mechanism 15a and a pin 17a are engaged to a second pin 18a in the lower end groove detachably engaged to a ridge on the end portion 20 of the second locking mechanism 10. The second locking mechanism 10 includes a second pin 18a with a spring 19a, and a spring 21 pushing an end of the second locking mechanism 10 wherein the second locking pin 18a slides into the locking position through the groove on the chamber wall 22 of the second locking mechanism 10. After the end of the slidable pin 18 of the first locking mechanism 6 is locked with the bored holes 18c on the wall of the axial tube 2, the break/clutch locking device 190 is in a locking position. The second locking mechanism 10 can be securably engaged in the locked position by pressing the second locking mechanism 10 so that the second pin 18a is inserted through the groove on the chamber wall 22, the bored hole of the axial tube 1 and the bored hole 18b on the wall of the abovementioned slidable axial tube 2, which have been placed in a corresponding position. When the brake/clutch locking device has been locked by the first locking mechanism 6, the second locking mechanism 10 becomes a second level of security to secure the blocking panel rod 3 to be immovably positioned to the rear of the brake/clutch pedals, thereby preventing operation of the pedals in the event first locking mechanism 6 is damaged.

The second embodiment of the brake/clutch locking device which can be incorporated with the anti-lock mechanism as described above. The brake/clutch locking device 290 comprises a holding leg 14. One end of the holding leg 14 is fixed to an axial tube 1, the other end of the holding leg 14 acts as a steering wheel cylinder. A return spring 4 is provided inside the axial tube 1 wherein the slidable axial tube 2 inserted inside. The lower end of the slidable axial tube 2 is connected to a blocking panel rod 3. A supporting axle 7 is inserted in a collar 8 connected to the axial tube 1, the upper end of the supporting axle 7 is connected to a pulling mechanism 9 and the lower end of the supporting axle 7 is connected to the panel blocking rod 3. By pulling mechanism 9, the panel blocking rod 3 will be moved inwardly toward the axial tube 1 to move the brake/clutch locking device 290 into the locking position. Further, the present brake/clutch locking device 290 also includes a first locking mechanism 6 comprising a turning mechanism 15 which is turned by a key and a locking pin 17 working correspondingly wherein the locking pin 17 includes a locking pin 18 along with a spring 19 pushing the end of a slidable pin 18 to be locked with an end 18c of a two-fang rod 20 provided at the end of the predetermined slidable axial tube 2 located in the corresponding position when the brake/clutch locking device 290 is in the locking position. The lateral portion of the first locking mechanism 6 further comprises a second locking mechanism 10 having a turning mechanism 15a inside a housing 23a wherein the lower portion of the turning mechanism 15a engaged with a pin 17a inside a housing 22a corresponding to a locking pin 18a in a housing 44 is pushed with a spring 19a through a slot of a collar 22 through the opening of the axial tube 1 to the bored hole 18d of the predetermined slidable axial tube 2 located in the corresponding position to the locking position. The second locking mechanism 10 can be securably engaged in the locked position by pressing the second locking mechanism 10 so that the second pin 18a is inserted through the groove on the collar 22, the opening of the axial tube 1 and the bored hole 18d on the wall of the abovementioned slidable axial tube 2, which have been placed in a corresponding position. When the brake/clutch locking device has been locked by the first locking mechanism 6, the second locking mechanism 10 becomes a second level of security to secure the blocking panel rod 3 to be immovably positioned to the rear of the brake/clutch pedals, thereby preventing operation of the pedals in the event first locking mechanism 6 is damaged.

The third embodiment of the brake/clutch locking device 390 which can be incorporated with the anti-lock mechanism as described above. The brake/clutch locking device 390 comprises a holding leg 14. One end of the holding leg 14 is fixed to an axial tube 1, and the other end acts as a steering wheel cylinder. A return spring 4 is provided inside the axial tube 1 wherein the slidable axial tube 2 inserted inside. The lower end of the slidable axial tube 2 is connected to a blocking panel rod 3. A line of opening 33 for use as a connecting portion of the end gripping rod 9 with the slidable tube 2 provided on another side of the axial tube 1. The line of the opening 33 is a member that defines a retreating sliding distance of the slidable axial tube 2 to prevent a movement out of the end of the axial tube 1. By pulling the gripping rod 9, the panel blocking rod 3 will be moved inward to the axial tube 1 in order to move the brake/clutch locking rod 3 into the locking position. Further, the present brake/clutch locking device 390 also includes a first locking mechanism 6 comprising a turning mechanism 15 which is turned by a key and a locking pin 17 working correspondingly wherein the locking pin 17 includes a locking pin 18 along with a spring 19 pushing the end of a slidable pin 18 to be locked with an end 18c of a two-fang rod 20 provided at the end of the predetermined slidable axial tube 2 located in the corresponding position when the brake/clutch locking device is in the locking position. The lateral portion of the first locking mechanism 6 further comprises a second locking mechanism 10 having a turning mechanism 15a inside a housing 23a wherein the lower portion of the turning mechanism 15a engaged with a pin 17a inside a housing 22a corresponding to a locking pin 18a in a housing 44. The locking pin 18a is being pushed with a spring 19a through a slot of collar 22 through the opening of the axial tube 1 to be locked with an end 18d of the two-fang rod 20 located in the corresponding position by pressing the second locking mechanism 10, thereby locking the brake/clutch locking device in the locked position.

The fourth embodiment of the brake/clutch locking device 490 which can be incorporated with the anti-lock mechanism as described above. The brake/clutch locking device 490 comprises an axial tube 1 and a slidable axial tube 2. A slidable axial tube 2 is inserted inside the axial tube 1. The upper end of axial tube 1 is mounted with a holding leg 14 and a first locking mechanism 6. The other end of the slidable axial tube 2 is provided with a brake panel-blocking rod 3 attached thereto. A return spring 4 is provided inside the slidable axial tube 2. The axial tube 1 is assembled with the slidable axial tube 2 by a pin 31, each end of which is attached to a wall of the axial tube 1 on the opposite side and inserted through a line of the opening 32 on the wall of the slidable axial tube 2 in a corresponding position for use as an upper blocking line of the return spring 4 and a sliding distance defining member of the slidable axial tube 2 as well. The first locking mechanism 6 is mounted on the upper end of the slidable axial tube 2 where the house 23 of the first locking mechanism 6 being enclosed by the pulling handle 48. When the handle 48 is pulled, the pin 18 which is inside the slidable axial tube 2 will move along with the slidable axial tube 2 to be locked with a slot 34a on a plate 34 that is attached to the opening of the axial tube 1, then the blocking panel-rod 3 slides inward to the axial tube 1 to block the brake and clutch pedals of an automobile. The second locking mechanism 10 having a turning mechanism 15a inside a housing 23a wherein the lower portion of the turning mechanism 15a connected with a pin 17a inside a housing 22a corresponding to a locking pin 18a inside a housing 44 which is pushed with a spring 19a through a slot of the collar 22 to a slot 34b on the plate 34 on a slidable axial tube 2 located in the corresponding position to the locking position. By pressing the second locking mechanism 10, the brake/clutch locking device will be locked in the locking position. A spring 21 is placed at the closed end of the collar 22 for pushing the lower end of the housing 23a when unlock the second locking mechanism 10.

The present invention provides at least one of an anti-start system and an alarm system as an additional anti-theft/security system to further prevent the vehicle from theft.

An anti-start system of this invention includes an electronic security system 75 plus a sound device 66 and a micro switch 50 installed on a wall of the slidable axial tube 2, the micro switch 50 provides electrical power to the sound alarm device 66. The micro switch 50 includes a switch pressing rod 51 mounted at the lower end of the axial tube 1. The function of the switch is related to the panel-blocking rod 3 which presses the switch pressing rod 51 to cut off the engine when the slidable axial tube 2 slide to be locked in the locking position.

An alarm system according to this invention, the first locking mechanism 6 and the second mechanism 10 comprise a turning mechanism 15 which is turn by key 67. The turning mechanism 15 comprises one key-code set having a key code member 60 and a micro switch 63 installed on the wall of the axial tube 1. When the key 67 is inserted, if the code signal from the key matches the code signal from the electronic security system, the sound alarm will not be turned on. If it is unlocked by any other different devices the sound alarm device 66 will turn on.

The flow diagram indicates how the alarm system works.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

Although similar reference numbers are used to refer to similar elements for convenience, it can be appreciated that each of the various embodiments may be considered to be distinct variations.

DETAILED DESCRIPTION OF THE INVENTION

Figure 1:
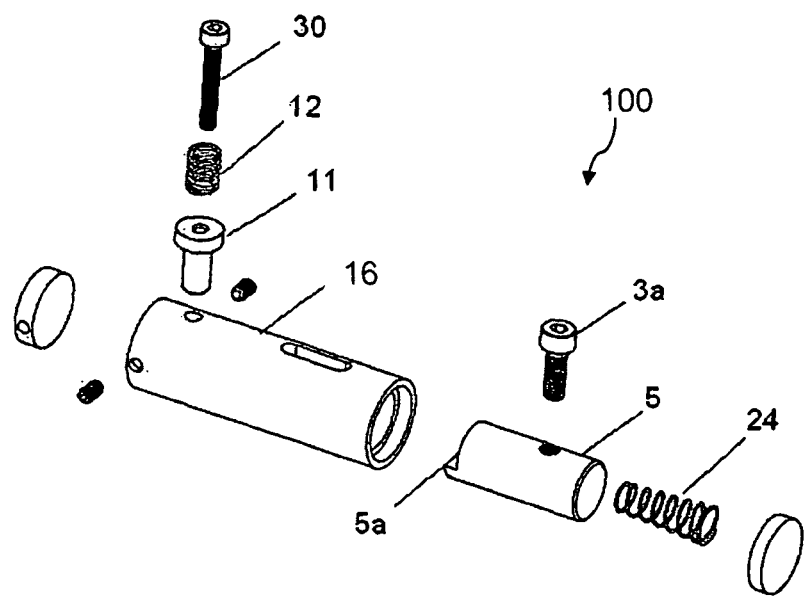
FIG. 1 is an exploded, perspective view of the first embodiment of an anti-lock mechanism for use with a brake/clutch locking device according to the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a," "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of electronic learning device, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first set could be termed a second set, and, similarly, a second set could be termed a first set, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a system and method for displaying, navigating and selecting electronically stored content.

Figure 2:
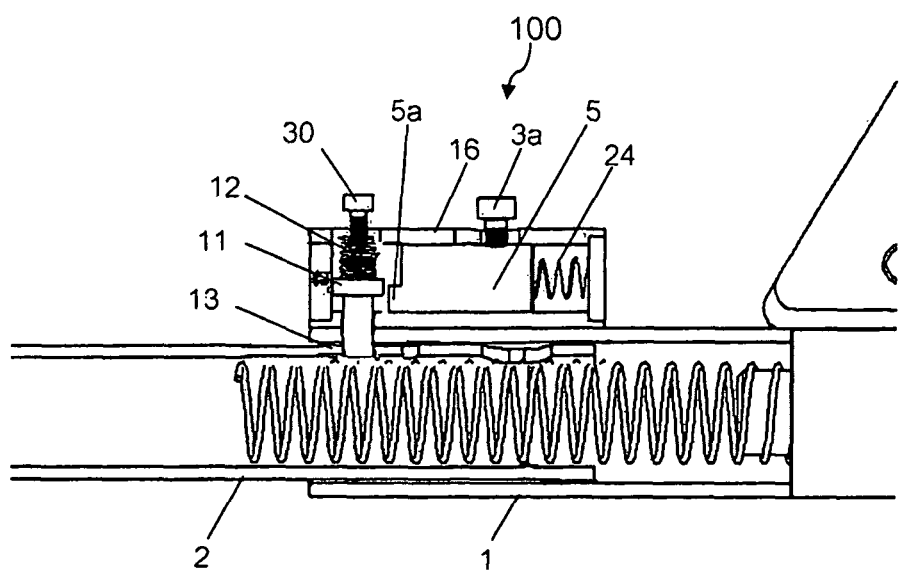
FIG. 2 is a cross-sectional view of first embodiment of the anti-lock mechanism of FIG. 1 incorporated with the brake/clutch locking device, wherein the anti-lock mechanism is in a disengaged position.
Figure 3:
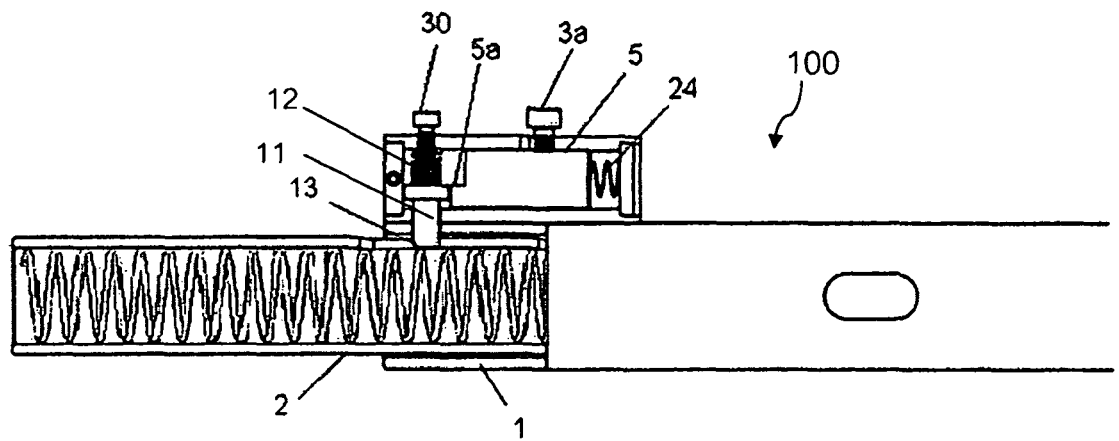
FIG. 3 is a cross-sectional view of first embodiment of the anti-lock mechanism of FIG. 1 incorporated with the brake/clutch locking device, wherein the anti-lock mechanism is in an engaged position.

According to FIG. 1-3, the first preferred embodiment of an anti-lock mechanism 100 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 100 comprises a block 5 with appropriate shape and size slidable inside a mechanical chamber 16. The block 5 is provided with a spring 24 used in pushing the rear end of the block 5. The front end of the block 5 has a shoulder portion 5a having a shape corresponding to the protruding lower edge of a pin 11 inside a pin chamber and provided with a coil spring 12 to prevent the slidable axial tube 2 from sliding to be locked in a locking position of the brake/clutch locking device through the bored hole 13 provided on the wall of the axial tube 1 and on the slidable axial tube 2 in a position upstream of a locking position of the brake/clutch locking device of an automobile. When an external force of more than 20 kg·f is applied to the main structure of the automobile in a relative direction and angle, the block 5 may produce sufficient kinetic energy for the block 5 to overcome the coil spring 24 resistance to compress the coil spring 24 and thereby move the front shoulder 5a of the block 5 outwards the protruding edge of the pin 11. The pin 11, therefore, slides down into the bored hole 13 and blocks the movement of the slidable axial tube 2, which, in turn, prevents the brake/clutch locking device from sliding into the brake/clutch locking position. At the end of the pin 11, an axle 30 is provided extending through the wall of the mechanical chamber 16 in the outward direction to pull the pin 11 out of the position that blocks the slidable axial tube 2 to place the pin 11 onto the shoulder 5a of the block 5. The pin 11 is placed into the position suitable for preventing the brake/clutch locking device from entering the locking position in relation with the retreating of the block 5 along with the block holding axle 3a protruding through a slot 16a on top of the mechanical chamber 16.

Figure 4:
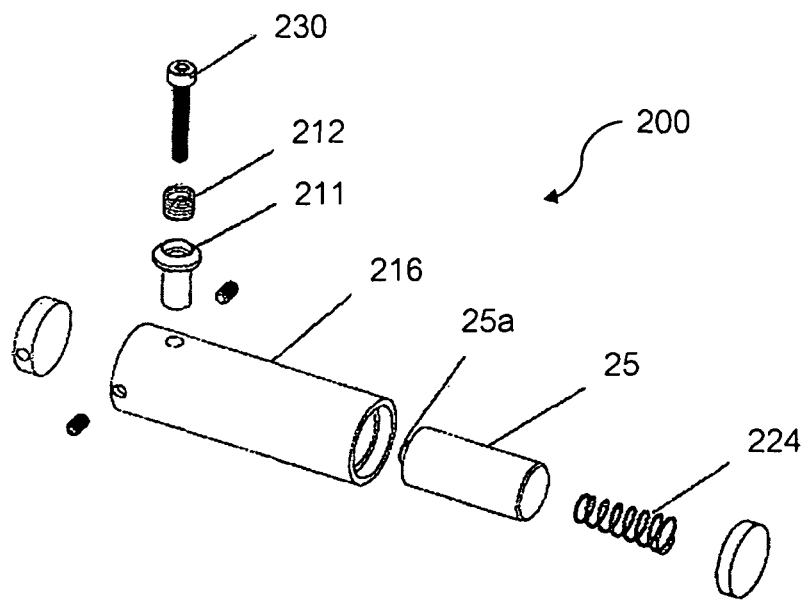
FIG. 4 is an exploded, perspective view of the second embodiment of an anti-lock mechanism for use with a brake/clutch locking device according to the present invention.
Figure 5:
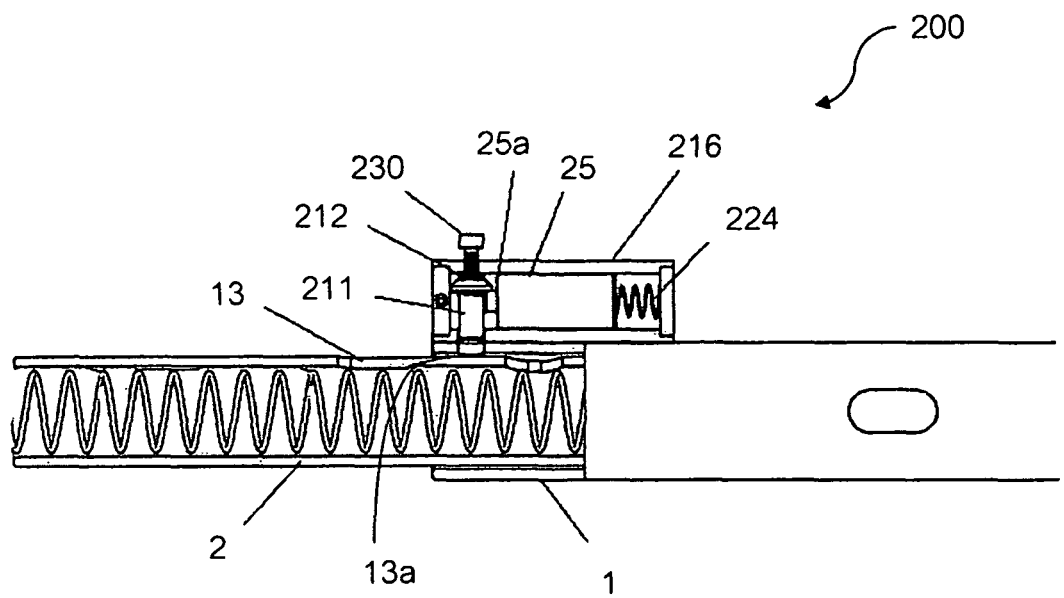
FIG. 5 is a cross-sectional view of second embodiment of the anti-lock mechanism of FIG. 4 incorporated with the brake/clutch locking device, wherein the anti-lock mechanism is in a disengaged position.
Figure 6:
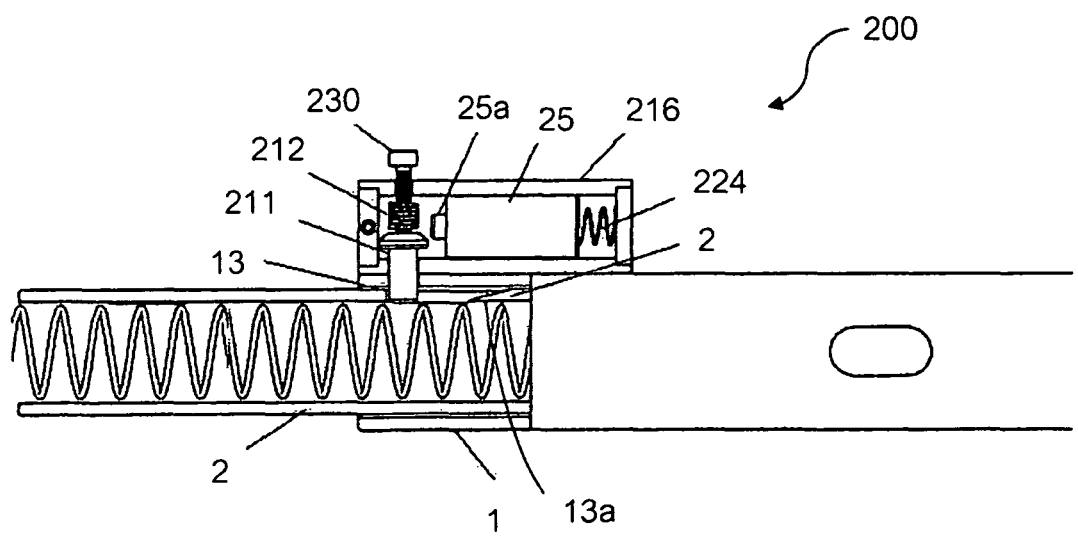
FIG. 6 is a cross-sectional view of second embodiment of the anti-lock mechanism of FIG. 4 incorporated with the brake/clutch locking device, wherein the anti-lock mechanism is in an engaged position.

According to FIG. 4-6, the second preferred embodiment of an anti-lock mechanism 200 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 200 comprises a block 25 having a shape and size suitable for a sliding motion within the mechanical chamber 216 and a spring 224 used in pushing the rear end of the block 25. The front end of the block 25 is in the shape of the axle 25a with a rounded tip extending in correspondence with the protruding edge of the pin 211 having a curved top located in the mechanical chamber 216 and provided with a coil spring 212 for use in preventing the slidable axial tube 2 of the brake/clutch locking device from sliding to be locked in a locking position of the brake/clutch locking device through a bored hole 13 provided on a wall of the axial tube 1 and on the slidable axial tube 2 in a position upstream of a locking position of the brake/clutch locking device of an automobile. One side of an edge of the bored hole 13 on the slidable axial tube 2 of the brake/clutch locking device for use with the anti-lock mechanism 200 is a sloped section 13a for convenience in pushing the end portion of the pin 11 back into the position while the slidable axial tube 2 is backed into the normal state. When an external force of more than 20 kg·f is applied to the main structure of the automobile in a relative direction and angle, the block 25 may produce sufficient kinetic energy for the block 25 to overcome the coil spring 224 resistance to move the front shoulder 25a of the block 25, which is in the shape of the round axle outward from the protruding edge of the pin 11. The pin 11 thus slides down into the bored hole 13 and prevents the slidable axial tube 2 from moving into the locking position with the abovementioned pin end 11 protruding out of the wall of the slidable axial tube 2 in the crossing direction adjacent to the axial tube 1. At the upper end portion of the pin 11, there is an axle 30 extending outward through the mechanical chamber 16. In the present embodiment of FIG. 4-6, the resetting of the anti-lock mechanism 200 occurs automatically without the need for the user to perform a manual reset as in the previous embodiment. Once the end portion of the pin 11 meets the sloped portion 13a, the continued movement of the slidable axial tube 2 causes the pin 11 to be urged upward back into the position while the slidable axial tube 2 is in the normal state.

Figure 7:
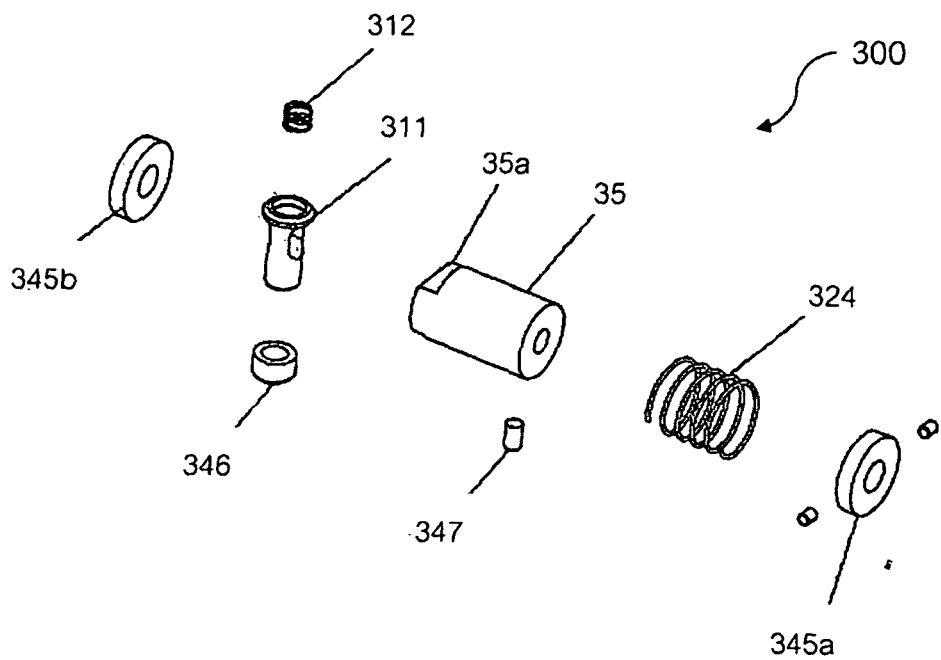
FIG. 7 is an exploded, perspective view of the third embodiment of an anti-lock mechanism for use with a brake/clutch locking device according to the present invention.
Figure 8:
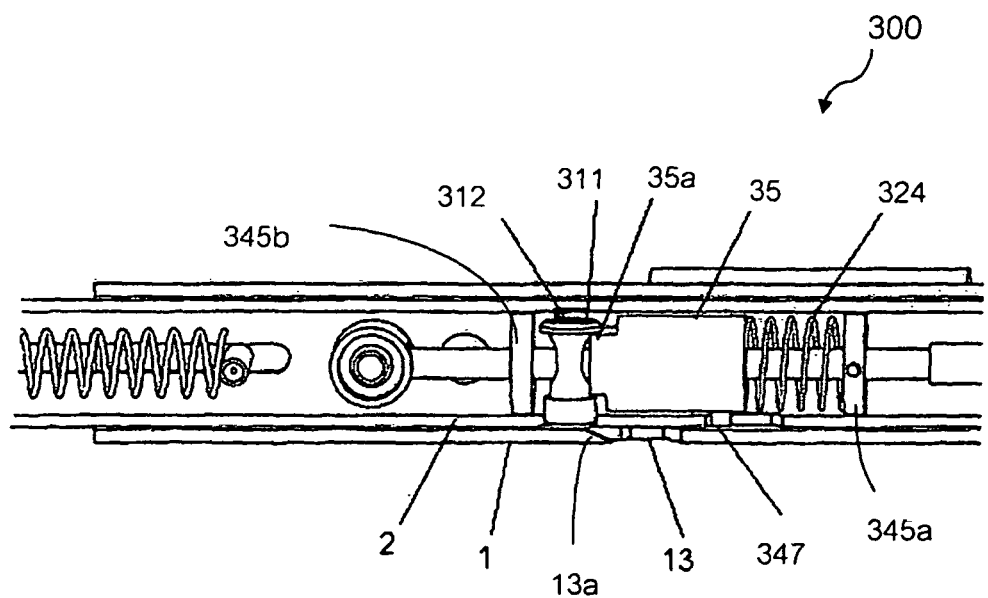
FIG. 8 is a cross-sectional view of the third embodiment of the anti-lock mechanism of FIG. 7 incorporated with the brake/clutch locking device, wherein the anti-lock mechanism is in a disengaged position.
Figure 9:
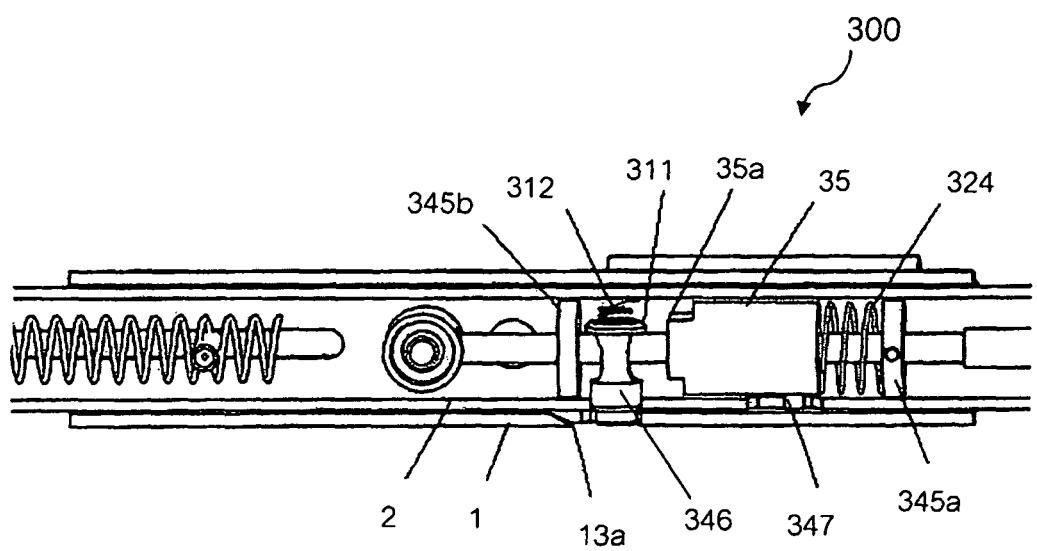
FIG. 9 is a cross-sectional view of the third embodiment of the anti-lock mechanism of FIG. 7 incorporated with the brake/clutch locking device, wherein the anti-lock mechanism is in an engaged position.

According to FIG. 7-9, the third embodiment of the anti-lock mechanism 300 for use with the brake/clutch locking device having an axial tube 1 and a slidable axial tube 2, a bored hole 13 provided in a wall of the axial tube 1 and on the slidable axial tube 2 in a position upstream of a locking position of the brake/clutch locking device. The anti-lock mechanism 300 comprises rings 345a and 345b that partitions the lock protecting mechanism chamber inside the slidable axial tube 2. Inside the lock protecting mechanism chamber, the pin 311 and the block 35 with appropriate shape and size are slidable inside the slidable axial tube 2 and engaged with an axle of the screwing mechanism 6 of the brake/clutch locking device. The block 35 is provided with a coil spring 324. The front part of the block 35 is in the form of a shoulder 35a. The shoulder 35a has a shape that corresponds to the protruding edge of the pin 311 located inside the slidable axial tube 2. The shoulder 35a is also provided with the coil spring 312 for preventing the slidable axial tube 2 from sliding to be locked at the locking position of the brake/clutch locking device through a bush 346 on the wall of the slidable axial tube 2 and the bored hole 13 on the wall of the axial tube 1 in a position upstream of the locking position of the brake/clutch locking device of an automobile. One edge of the bored hole 13 on the axial tube 1 is a sloped portion 13a for the sake of pushing the pin 311 back into the normal position after the slidable axial tube 2 slides back into the normal unlocked state. When an external force of more than 20 kg·f is applied to the main structure of an automobile in a relative direction and angle, the block 35 may produce sufficient kinetic energy to the block 35 to overcome the coil spring 324 resistance to move the front shoulder 35a of the block 35 to outward from the protruding edge of the pin 311. The pin 311, therefore, slides down into the bored hole 13 on the axial tube 1 and prevents the slidable axial tube 2 from moving into the locking position with the abovementioned pin end 311 protruding out of the wall of the slidable axial tube 2 in the crossing direction adjacent to the axial tube1. At the end portion of the block 35, there is provided an extending axle end 347 in the groove on the wall of the slidable axial tube 2 to prevent the pivotally movement of the block 35 around the axle of the screwing mechanism 6.

Figure 10:
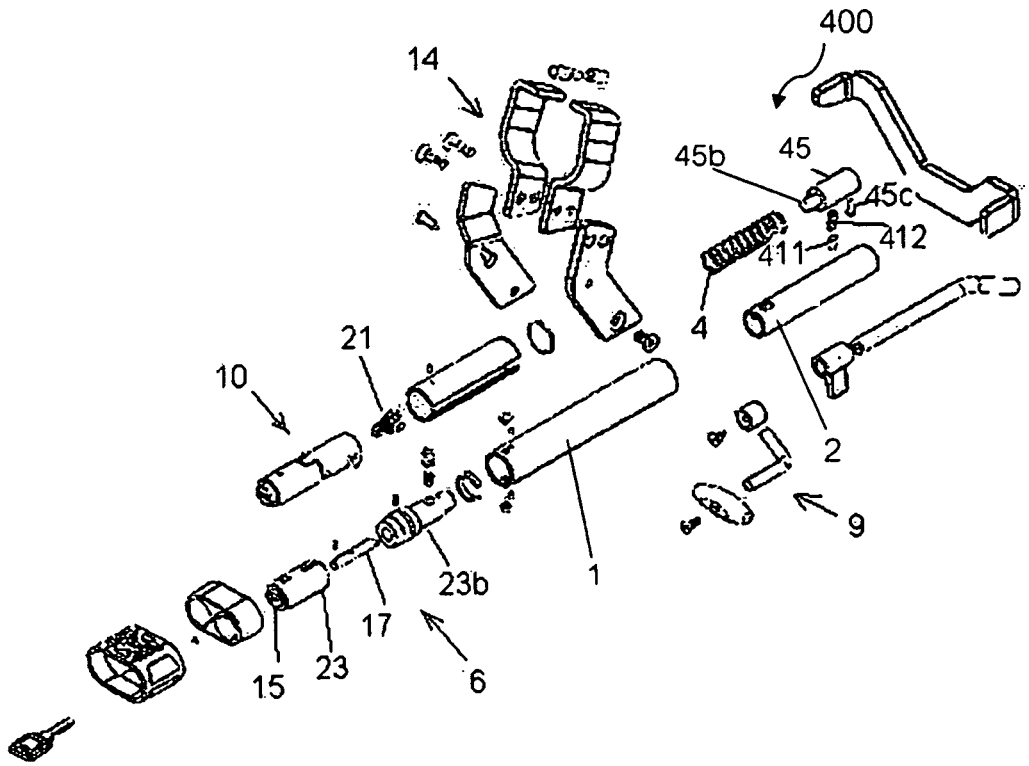
FIG. 10 is an exploded, perspective view of the fourth embodiment of an anti-lock mechanism for use with a brake/clutch locking device according to the present invention.
Figure 11:
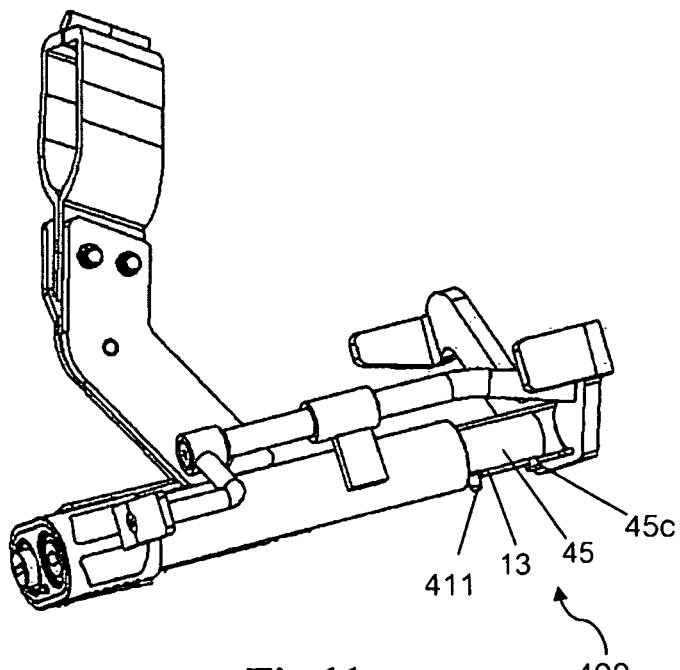
FIG. 11 is a perspective view of the fourth embodiment of anti-lock mechanism of FIG. 10 fixedly housed within a slidable axial tube of the brake/clutch locking device, wherein the anti-lock mechanism is in an engaged position.

According to FIG. 10-11, the fourth preferred embodiment of the anti-lock mechanism 400 for use with the brake/clutch locking device having an axial tube 1 and a slidable axial tube 2, a bored hole 13 provided on the slidable axial tube 2 in a position upstream of a locking position of the brake/clutch locking device. The anti-lock mechanism 400 comprises a block 45 with appropriate shape and size slidable inside the slidable axial tube 2. The block 45 has a round shoulder as an engaging end 45b. Inside the axial tube 2 is provided with a return spring 4. The lower end of the return spring 4 pushes the block 45 on the engaging end 45b. The other end of the return spring 4 pushes the end of the first locking mechanism 6 connected inside the axial tube 1. A pin 411 with a coil spring 412 used in driving the end portion of the pin 411 to slide into the locking position which is provided on the body of the block 45. The predetermined bored hole 13 is the locking position on the wall of the slidable axial tube 2 in the position upstream of the locking position of the brake/clutch locking device. When an external force of more than 20 kg·f is applied to the main structure of an automobile in a relative direction and angle, sufficient kinetic energy may be produced to the block 45 to move the block 45 into the engaging position in preventing the brake/clutch locking device into the locking position.

The block 45 has an axle 45c protruding into a slot on the slidable axial tube 2. With the abovementioned pin end 411 protruding through a predetermined bored hole 13 on the wall of the slidable axial tube 2, the slidable axial tube 2 is then blocked with the edge of the axial tube 1 in the position upstream from the position so that the break/clutch locking device is unable to move into the lock position.

Upon resuming a normal state by pushing protruding end of the pin 411 back inside the slidable axial tube 2 then the spring 4 will push the block 45 inward to the end of the slidable axial tube 2 where it is ready for activation again.

Figure 12:
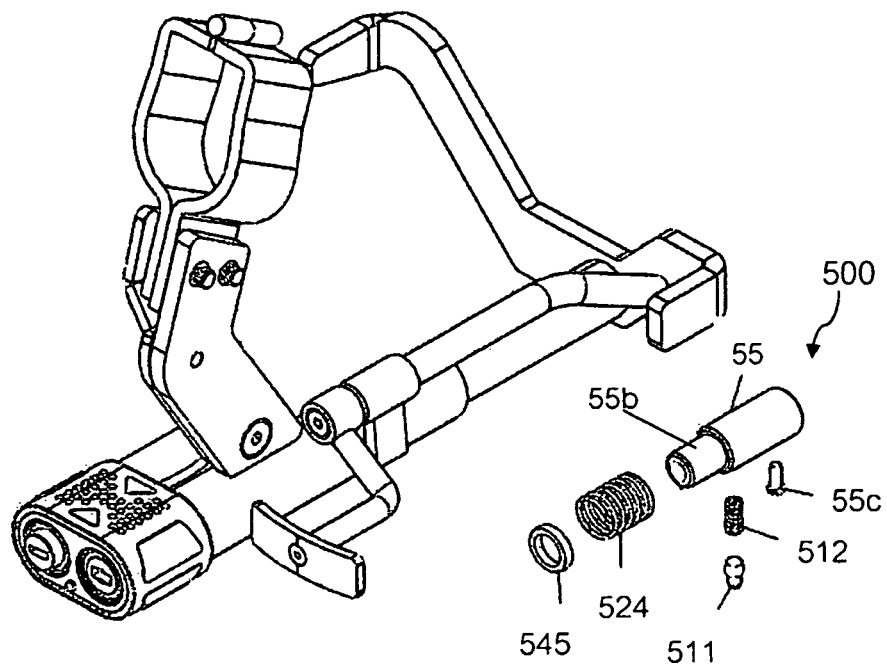
FIG. 12 is an exploded, perspective view of the fifth embodiment of an anti-lock mechanism for use with a brake/clutch locking device according to the present invention.
Figure 13:
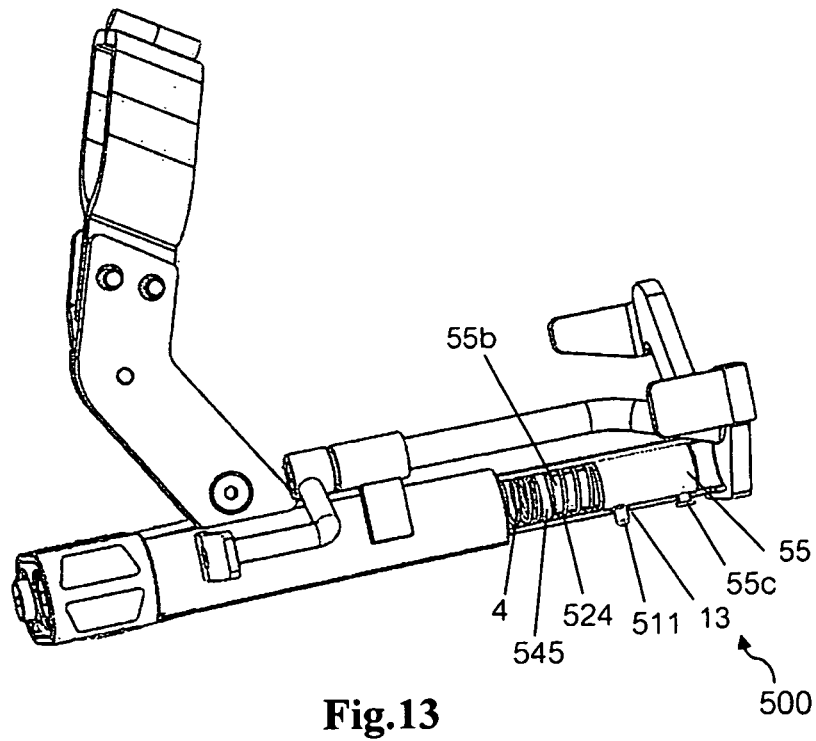
FIG. 13 is a cross-sectional view of the fifth embodiment of the anti-lock mechanism of FIG. 12 fixedly housed within a slidable axial tube of the brake/clutch locking device, wherein the anti-lock mechanism is in an engaged position.

According to FIG. 12-13, the fifth preferred embodiment of an anti-lock mechanism 500 for use with the brake/clutch locking device having an axial tube 1 and a slidable axial tube 2, a bored hole 13 provided on the slidable axial tube 2 in a position upstream of a locking position of the brake/clutch locking device. The anti-lock mechanism 500 comprises a block 55 with appropriate shape and size slidable inside the slidable axial tube 2 at the lower end of the slidable axial tube 2. Inside the slidable axial tube 2 is provided with a return spring 4 in which the lower end of the return spring 4 is pushing against a partitioning ring 545. The other end of the return spring 4 pushes the end of the turning mechanism 6 inside the axial tube 1. The block 55 has a rounded shoulder as an engaging end 55b persistently urged at one end of a spring 524. The other end of the spring 524 pushes against a partitioning ring 545. A pin 511 and a coil spring 512 are used in driving the end portion of the pin 511 to slide into the locking position provided on the body of the block 55. The predetermined bored hole 13 is the locking position on the wall of the slidable axial tube 2 in the position upstream of the locking position of the brake/clutch locking device. When an external force of more than 20 kg·f is applied to the main structure of an automobile in a relative direction and angle, sufficient kinetic energy may be produced to move the block 55 into the locking position. The block 55 has an axle 55c protruding into a slot on the slidable axial tube 2. With the abovementioned pin end 511 protruding through a predetermined bored hole 13 on the wall of the slidable axial tube 2, then the slidable axial tube 2 is blocked with the edge of the axial tube 1 in the position upstream from the position so that the break/clutch locking device cannot proceed into the locked position.

Upon resuming a normal state of the anti-lock mechanism 500, it is done by pushing the protruding end of the pin 511 back inside the slidable axial tube 2, the spring 524 will then push the block 55 back to the end of the slidable axial tube 2 where it is ready for activation again.

Figure 14:
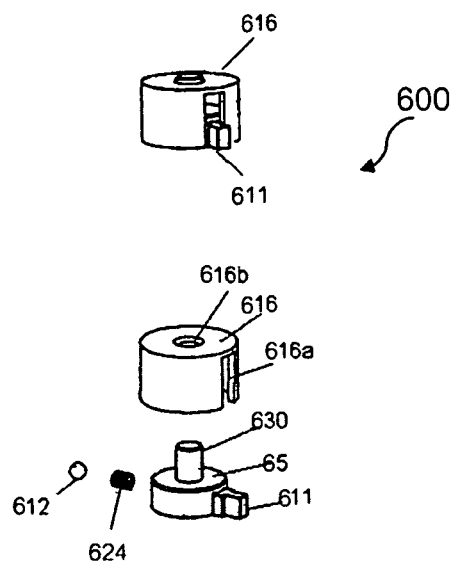
FIG. 14 is an exploded, perspective view of the sixth embodiment of an anti-lock mechanism for use with a brake/clutch locking device according to the present invention.
Figure 15:
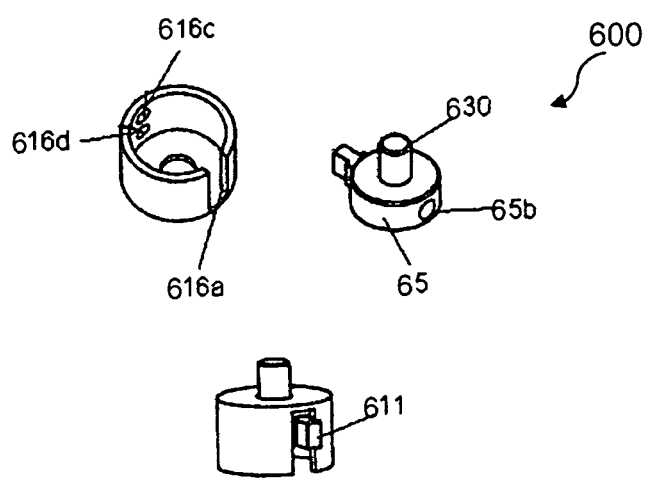
FIG. 15 is another exploded, perspective view of the sixth embodiment of an anti-lock mechanism for use with a brake/clutch locking device according to the present invention.
Figure 16:
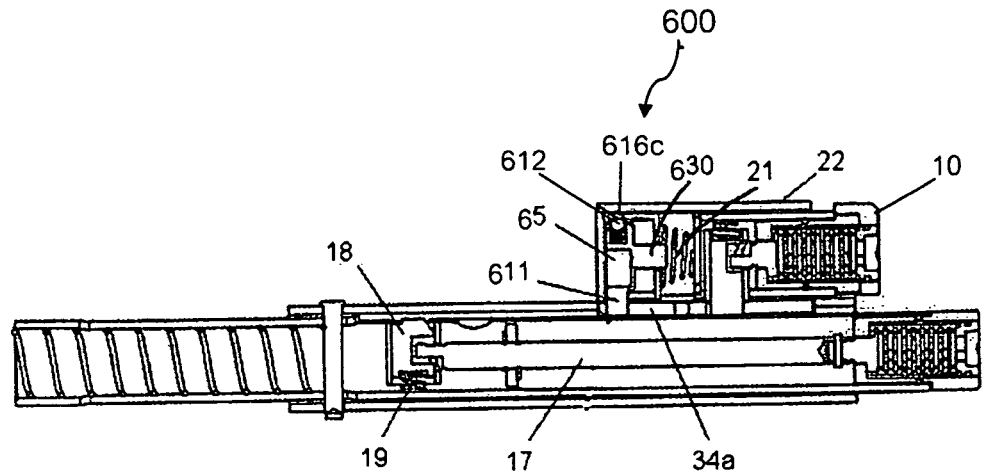
FIG. 16 is a cross-sectional view of the sixth embodiment of the anti-lock mechanism of FIG. 14 fixedly housed within a second locking mechanism of the brake/clutch locking device, wherein the anti-lock mechanism is in an engaged position.

According to FIG. 14-16, the sixth preferred embodiment of an anti-lock mechanism 600 for use with the brake/clutch locking device having an axial tube 1 and a slidable axial tube 2, a slot 3a provided on a wall of the slidable axial tube 2 The anti-lock mechanism 600 comprises a block 65 with appropriate shape and size slidable inside a mechanical chamber 616 with a slot 616a on a side wall of the mechanical chamber 616. The mechanical chamber 616 is placed in an end collar 22 of the second locking mechanism 10 of the brake/clutch locking device. The front end of the block 65 has an axle 630 protruding into the center hole 16b which is opposite to the open end of the mechanical chamber 616. On one side of the block 65 there is a dowel 611 slidable in the slot 616a and on the opposite side provided with a spring 624 and a pin 612 inside a hole 65b. Two mating holes (616c, 616d) are provided corresponding to the pin 612 on the internal wall of the mechanical chamber 616. There is a spring 21 at the front end of the mechanical chamber 616, one end of the spring 21 pushing the wall at the end of the second locking mechanism 10 chamber. When an external force of more than 20 kg·f is applied to the main structure of an automobile in a relative direction and angle, sufficient amount of kinetic energy may be produced to move the block 65 from the mating hole 616c to the mating hole 616d on the inner wall of the mechanical chamber 616, at the same time the dowel 611 will slide into proper place which is the slot 34a of the plate 34 of the brake/clutch locking device. The anti-locking mechanism is in an engaged position.

The resetting of the anti-lock mechanism 600 from the engaged position to the disengaged position occurs when the user press the second locking mechanism 10, the wall at the end of the second locking mechanism 10 chamber will push the block 65 back to the end of the collar 22 to be ready for activation again.

Figure 17:
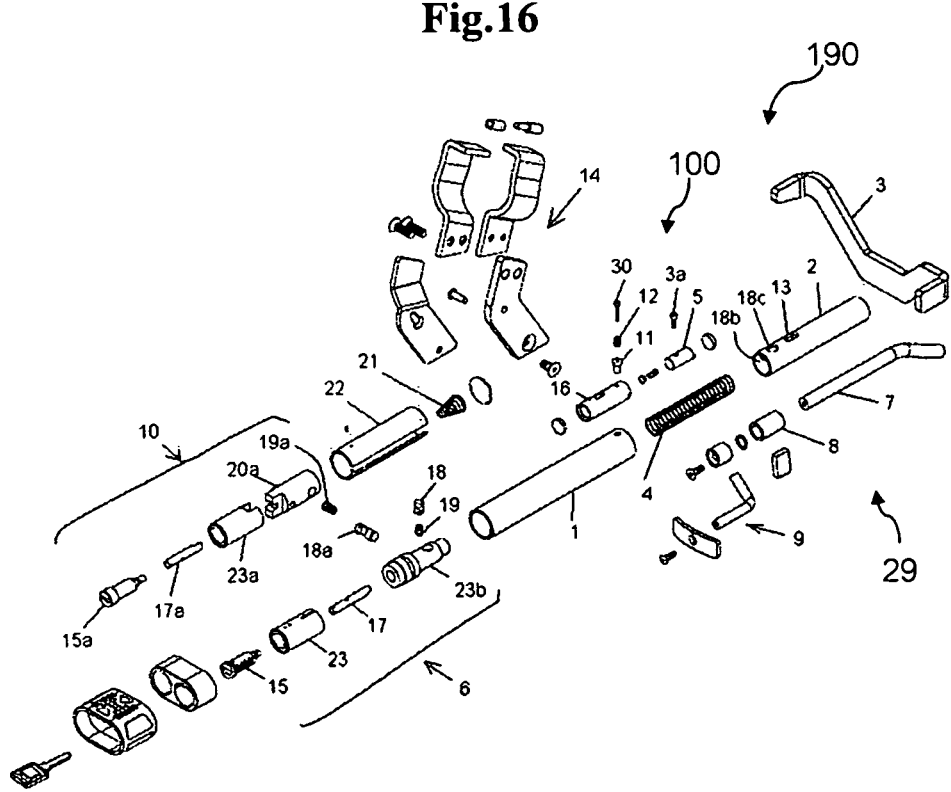
FIG. 17 is an exploded, perspective view of the first embodiment of a brake/clutch locking device incorporated with the first embodiment of the anti-lock mechanism as shown in FIG. 1.
Figure 18:
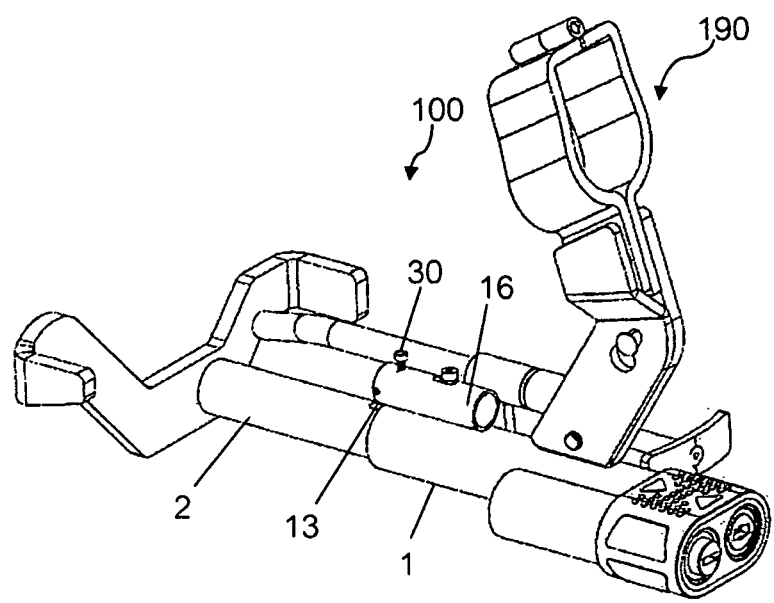
FIG. 18 is a perspective view of the first embodiment of the brake/clutch locking device incorporated with the first embodiment of the anti-lock mechanism as shown in FIG. 1.

FIG. 17-18 shows the first preferred embodiment of a brake/clutch locking device 190 having an anti-lock mechanism 100. The brake/clutch locking device 190 according to the present invention comprises an axial tube 1 and a slidable axial tube 2. One end of a slidable axial tube 2 is inserted inside the axial tube 1. The other end of the slidable axial tube 2 is provided with the blocking panel rod 3 attached thereto. Inside the axial tube 1 is provided with a return spring 4 wherein the axial tube 1 and the slidable axial tube 2 include a lock-pulling mechanism 29. The lower end of a first lock pulling mechanism 7 is connected with the brake/clutch panel-blocking rod 3. The upper end of the first lock pulling mechanism 7 is inserted through a collar 8 supporting the first lock pulling mechanism 7 on the wall of the axial tube 1 and connected with the lower end of a second lock pulling mechanism 9 used in defining a retreating sliding distance of the slidable axial tube 2 to prevent movement out of the end of the axial tube 1. The upper end of the axial tube 1 is the mounting part for the first locking mechanism 6 and the second locking mechanism 10 on the side of the first locking mechanism 6. On the upper end of the axial tube 1 of the brake/clutch locking device further comprises the anti-lock mechanism 100. The present brake/clutch locking device 190 further comprises a holding leg 14. One end of the holding leg 14 is fixed to the axial tube 1. The other end acts as a steering wheel cylinder. Further, the present brake/clutch locking device 190 also includes a first locking mechanism 6 on the upper end of the axial tube 1 comprising a turning mechanism 15 within the housing 23 which is turned by a key and a pin 17 working correspondingly wherein the pin 17 includes a pin 18 inside a housing 23b along with a spring 19 pushing an end of the slidable pin 18 to be locked with the bored holes 18c on the slidable axial tube 2 located in the corresponding position when the second lock pulling mechanism 9 is pulled to lock the brake/clutch locking device 190. The lateral portion of the first locking mechanism 6 further comprises a second locking mechanism 10 having a turning mechanism 15a which is turned by the key of the turning mechanism 15 wherein a lower portion of the turning mechanism 15a and a pin 17a are connected to a second pin 18a in the lower end groove detachably engaged to a ridge on the end portion 20 of the second locking mechanism 10. The second locking mechanism 10 includes a second pin 18a with a spring 19a, and a spring 21 pushing an end of the second locking mechanism 10 wherein the second locking pin 18a slides into the locking position through the groove on the chamber wall 22 of the second locking mechanism 10. After the slidable pin 18 of the first locking mechanism 6 is locked with the bored holes 18c on the wall of the axial tube 2, the break/clutch locking device 160 is in a locking position. The second locking mechanism 10 can be securably engaged in the locked position by pressing the second locking mechanism 10 so that the second pin 18a is inserted through the groove on the collar 22, the bored hole of the axial tube 1 and the bored hole 18b on the wall of the abovementioned slidable axial tube 2, which have been placed in a corresponding position. When engaged in the lock position, the second locking mechanism 10 becomes a second level of security to secure the blocking panel rod 3 to be immovably positioned to the rear of the brake/clutch pedals, thereby preventing operation of the pedals in the event first locking mechanism 6 is damaged.

Figure 19:
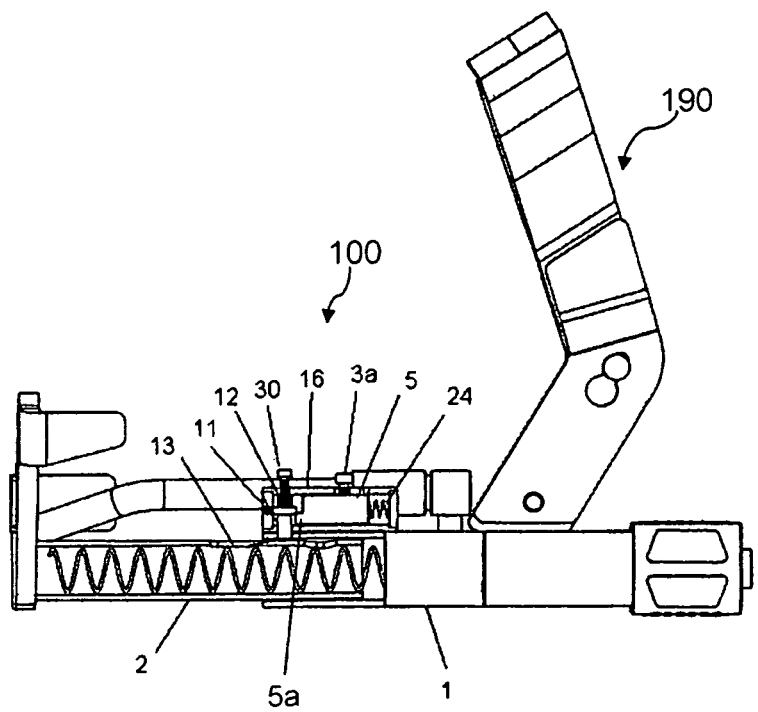
FIG. 19 is a cross-sectional view of the brake/clutch locking device incorporated with the first embodiment of the anti-lock mechanism of FIG. 18, wherein the anti-lock mechanism is in a disengaged position.
Figure 20:
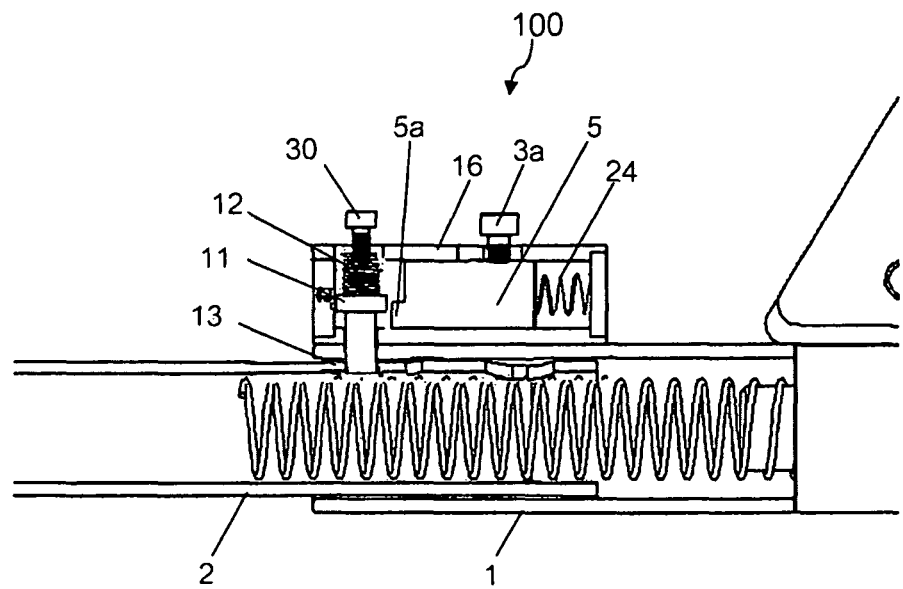
FIG. 20 is a cross-sectional view of the brake/clutch locking device incorporated with the first embodiment of the anti-lock mechanism of FIG. 18, wherein the anti-lock mechanism is in an engaged position.

According to FIG. 18-20, the brake/clutch locking device 190 having the anti-lock mechanism 100 in which the anti-lock mechanism 100 comprises a block 5 with appropriate shape and size slidable inside the mechanical chamber 16 and provided with a spring 24 pushing the block 5. The front portion of the block 5 has a shoulder portion 5a having a shape corresponding to the protruding lower edge of the pin 11 inside the pin chamber and provided with a coil spring 12 for preventing the slidable axial tube 2 from sliding through bored hole 13 provided on the wall of the axial tube 1 and on the slidable axial tube 2 in the predefined position upstream of the locking position of the brake/clutch locking device 190. When an external force of more than 20 kg·f is applied to the main structure of an automobile in a relative direction and angle, sufficient amount of kinetic energy may be produced to move the front shoulder 5a of the block 5 from the protruding edge of the pin 11. The pin 11, therefore, slides down into the bored holes 13 and blocks the movement of the slidable axial tube 2, which, in turn, prevents the brake/clutch locking device from sliding into the brake/clutch locking position. On the top of the pin 11, an axle 30 is provided extending through the wall of the mechanical chamber 16 in the outward direction to pull the pin 11 out of the position that blocks the slidable axial tube 2 to place the pin 11 onto the shoulder 5a of the block 5. The pin 11 is placed into the position suitable for preventing the brake/clutch locking device 190 from entering into the locking position in relation with the retreating of the block 5 along with the block holding axle 3a protruding through the slot on the mechanical chamber 16.

Figure 21:
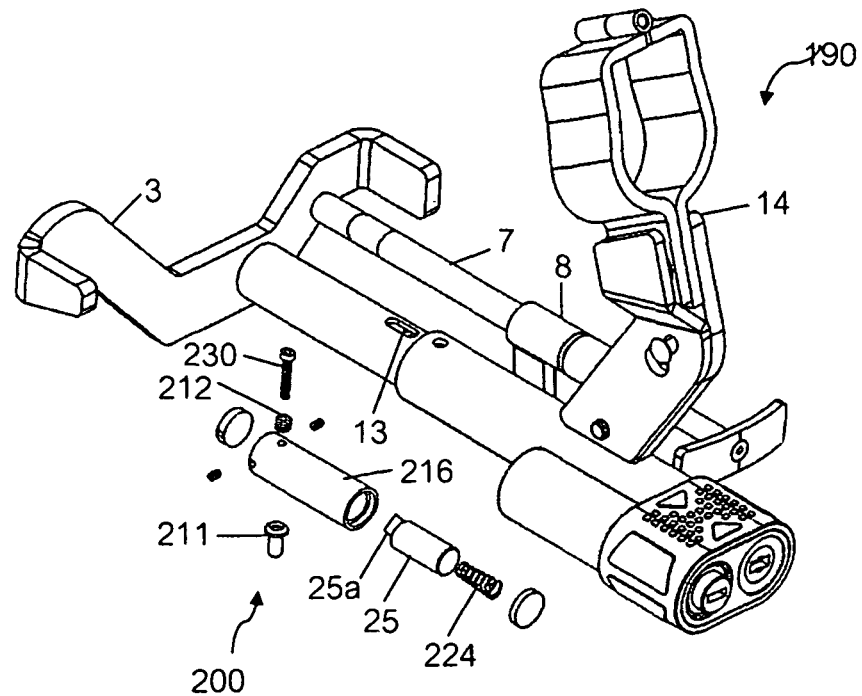
FIG. 21 is an exploded, perspective view of the first embodiment of a brake/clutch locking device incorporated with the second embodiment of the anti-lock mechanism as shown in FIG. 4.
Figure 22:
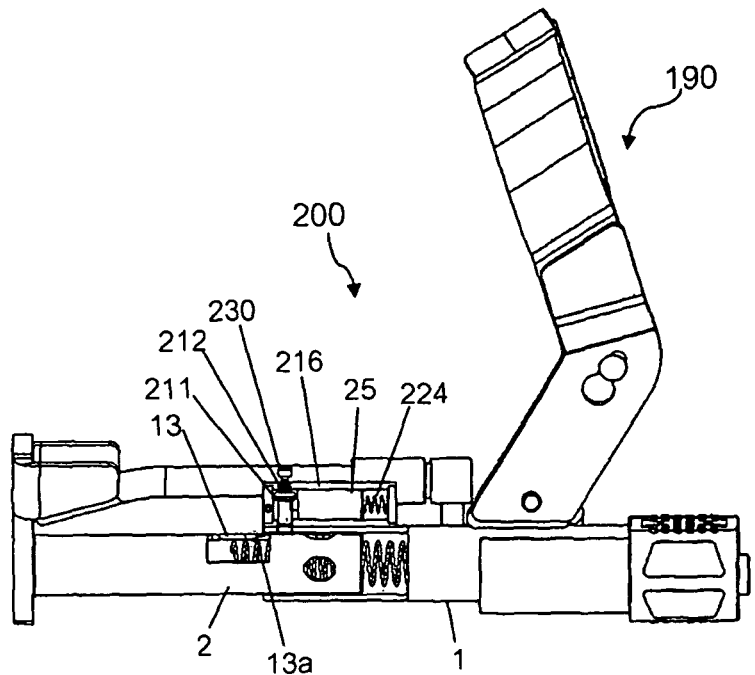
FIG. 22 is a cross-sectional view of the brake/clutch locking device incorporated with the second embodiment of the anti-lock mechanism of FIG. 21, wherein the anti-lock mechanism is in a disengaged position.
Figure 23:
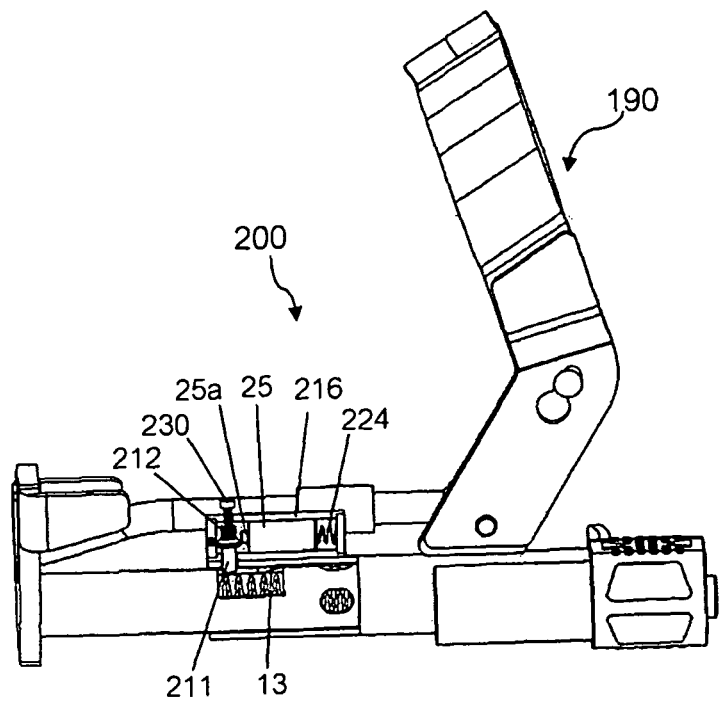
FIG. 23 is a cross-sectional view of the brake/clutch locking device incorporated with the second embodiment of the anti-lock mechanism of FIG. 21, wherein the anti-lock mechanism is in an engaged position.

According to FIG. 21-23, the brake/clutch locking device 190 having the anti-lock mechanism 200 comprises a block 25 with appropriate shape and size slidable inside the mechanical chamber 216 and provided with a spring 224 pushing the rear end of the block 25. The front end 25a of the block 25 is in the shape of the axle with a rounded tip extending in correspondence with the protruding edge of the pin 211 having a curved top and inside a pin chamber on top of the pin 211 provided with a coil spring 212 for preventing the slidable axial tube 2 from sliding through the bored holes 13 provided on the wall of the axial tube 1 and on the slidable axial tube 2 in a position upstream of the locking position of the brake/clutch locking device. One side of an edge of the bored hole 13 on the slidable axial tube 2 is a sloped portion for convenience in pushing the end portion of the pin 211 back into the position while the slidable axial tube 2 is back into the normal unlocked state. The bottom part of pin 211 is curved to accommodate this slide action. Once the main structure of the automobile is subject to an external force of more than 20 kg·f in the relative direction and angle, the block 25 may produce sufficient kinetic energy to move the block 25 along with the front shoulder 25a of the block 25 which is in the shape of the round axle outward from the protruding edge of the pin 211. The pin 211 thus slides down to the bored holes 13 and prevent the slidable axial tube 2 from sliding into the locking position. One side of an edge of the bored hole 13 on the slidable axial tube 2 is a sloped portion for convenience in pushing the curved end portion of the pin 211 back into the position while the slidable axial tube 2 is in the normal unlocked state. At the end portion of the pin 211, there is an axle 230 extending outward through the mechanical chamber 216.

Figure 24:
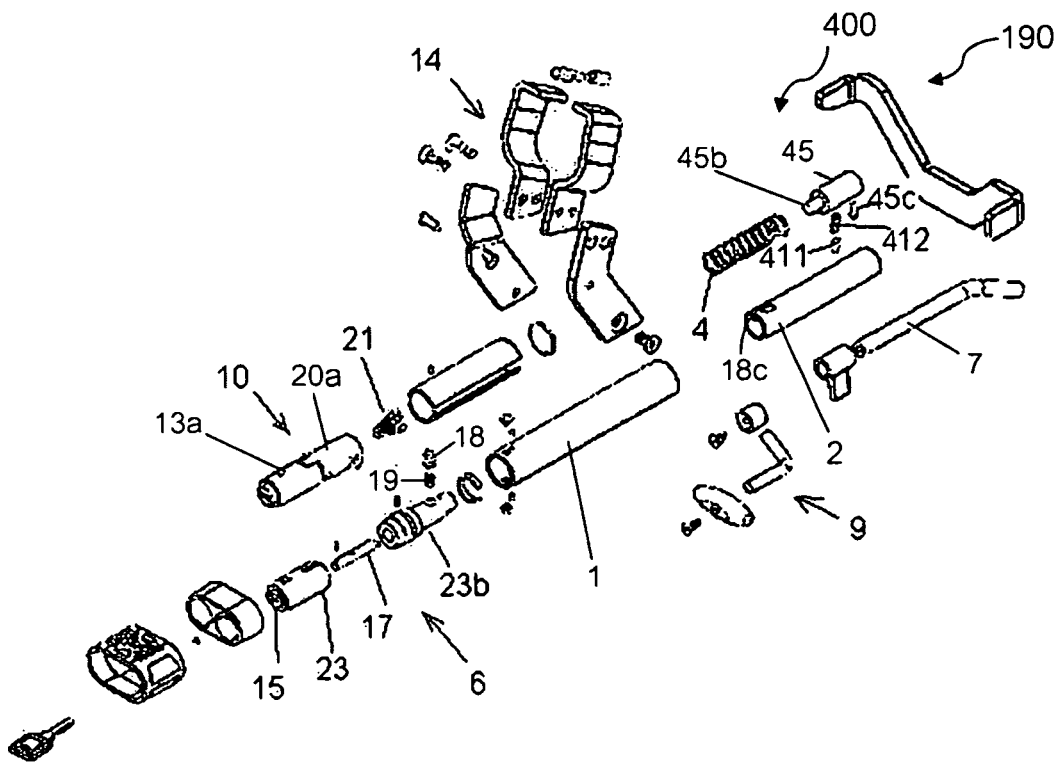
FIG. 24 is an exploded, perspective view of the first embodiment of a brake/clutch locking device incorporated with the fourth embodiment of the anti-lock mechanism.
Figure 25:
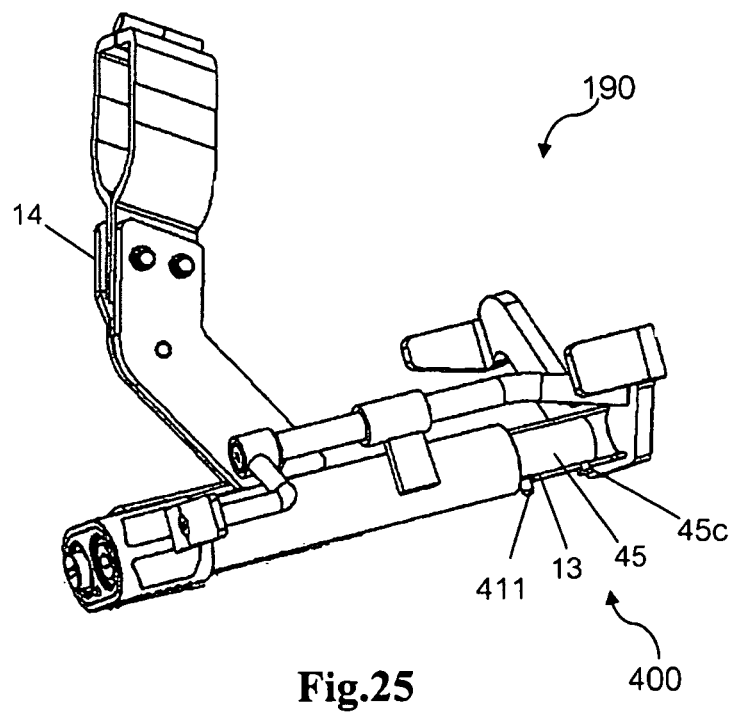
FIG. 25 is a cross-sectional view of the brake/clutch locking device incorporated with the fourth embodiment of the anti-lock mechanism of FIG. 24, wherein the anti-lock mechanism is in an engaged position.

According to FIG. 24-25, the brake/clutch locking device 190 is assembled with the anti-lock mechanism 400 according to the present invention. The brake/clutch locking device 190 comprises an axial tube 1 and a slidable axial tube 2. One end of a slidable axial tube 2 is inserted inside the axial tube 1. The other end of the slidable axial tube 2 is provided with the blocking panel rod 3 attached thereto. Inside the axial tube 1 is provided with a return spring 4 wherein the axial tube 1 and the slidable axial tube 2 include a lock pulling mechanism 29. The lower end of a first lock pulling mechanism 7 is connected with the brake/clutch panel-blocking rod 3. The upper end of the first lock pulling mechanism 7 is inserted through a collar 8 supporting the first lock pulling mechanism 7 on the wall of the axial tube 1 and connected with the lower end of a second lock pulling mechanism 9 used in defining a retreating sliding distance of the slidable axial tube 2 to prevent a movement of the slidable axial tube 2 out of the end of the axial tube 1. The upper end of the axial tube 1 is the mounting part for the first locking mechanism 6 and the second locking mechanism 10 on the lateral side of the first locking mechanism 6. The present brake/clutch locking device 190 further comprises a holding leg 14. One end of the holding leg 14 is fixed to the axial tube 1. The other end acts as a steering wheel cylinder. The first locking mechanism 6 on the upper end of the axial tube 1 comprises a turning mechanism 15 in a housing 23 which is turned by a key and a locking pin mechanism 17 working correspondingly wherein the locking pin mechanism 17 includes a lock pin 18 inside a housing 23b along with a spring 19 pushing an end of the lock pin 18 to be locked with the hole 18c on the slidable axial tube 2 located in the corresponding position when the second pulling mechanism 9 is pulled and the brake/clutch locking device is in the locking position. The second locking mechanism 10 has a turning mechanism 15a which is turned by the key of the turning mechanism 15 wherein a lower portion of the turning mechanism 15a with a pin 17a is connected to a second locking pin 18a in the lower end groove of a housing 23a detachably engaged to a ridge on the end portion 20 of the second locking mechanism 10. The second locking mechanism 10 includes the second pin18a with a spring 19a and a spring 21 pushing an end of the second locking mechanism 10 wherein the second locking pin 18a slides into the locking position of the brake/clutch locking device 190 through the groove on the collar 22 of the second locking mechanism 10. After the end of the slidable pin 18 of the first locking mechanism 6 is locked with the bored holes 18c on the wall of the axial tube 2, the break/clutch locking device is in a locking position. The second locking mechanism 10 can be securably engaged in the locked position by pressing the second locking mechanism 10 so that the second locking pin 18a is inserted through the groove on the collar 22, the bored hole of the axial tube 1 and the bored hole 18b on the wall of the abovementioned slidable axial tube 2, which have been placed in a corresponding position. When engaged in the lock position, the second locking mechanism 10 becomes a second level of security to secure the blocking panel rod 3 to be immovably positioned to the rear of the brake/clutch pedals, thereby preventing operation of the pedals in the event first locking mechanism 6 is damaged.

According to FIG. 24-25, the brake/clutch locking device 190 having the anti-lock mechanism 400, the anti-lock mechanism 400 comprises a block 45 with appropriate shape and size slidable inside the slidable axial tube 2. The block 45 has an engaging end 45b. Inside the axial tube 2 is provided a return spring 4. The lower end of the spring 4 pushes against the block 45. The other end of the return spring 4 pushes the end of the locking mechanism 6 connected inside the axial tube 1. A pin 411 with a coil spring 412 used in driving the end portion of the pin 411 to slide into the engaging position which is provided on the body of the block 45. The predetermined bored hole 13 is in the locking position on the wall of the slidable axial tube 2 in the position upstream of the locking position of the brake/clutch locking device. When an external force of more than 20 kg·f is applied to the main structure of an automobile in a relative direction and angle, sufficient kinetic energy may be produced to the block 45 to move the block 45 into the engaging position.

The block 45 has an axle 45c protruding into a slot on the slidable axial tube 2. With the abovementioned pin end 411 protruding through a predetermined bored hole 13 on the wall of the slidable axial tube 2, the slidable axial tube 2 is then blocked with the edge of the axial tube 1 in the position upstream from the brake/clutch locking position so that the break/clutch locking device is unable to move into the locked position. Upon resuming a normal state that will activate the block 45 again, the pin end 411 protruding out of the slidable axial tube 2 is pushed into the slidable axial tube 2 and the spring 4 pushes the block 45 inward to the end of the slidable axial tube 2 where it is ready for activation again.

Figure 26:
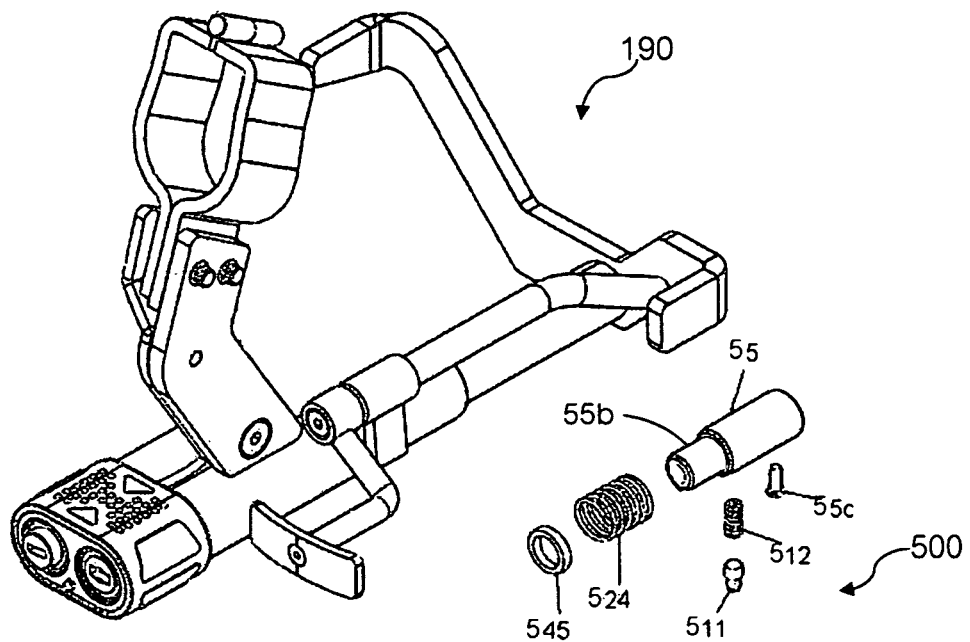
FIG. 26 is an exploded, perspective view of the first embodiment of the brake/clutch locking device incorporated with the fifth embodiment of the anti-lock mechanism.
Figure 27:
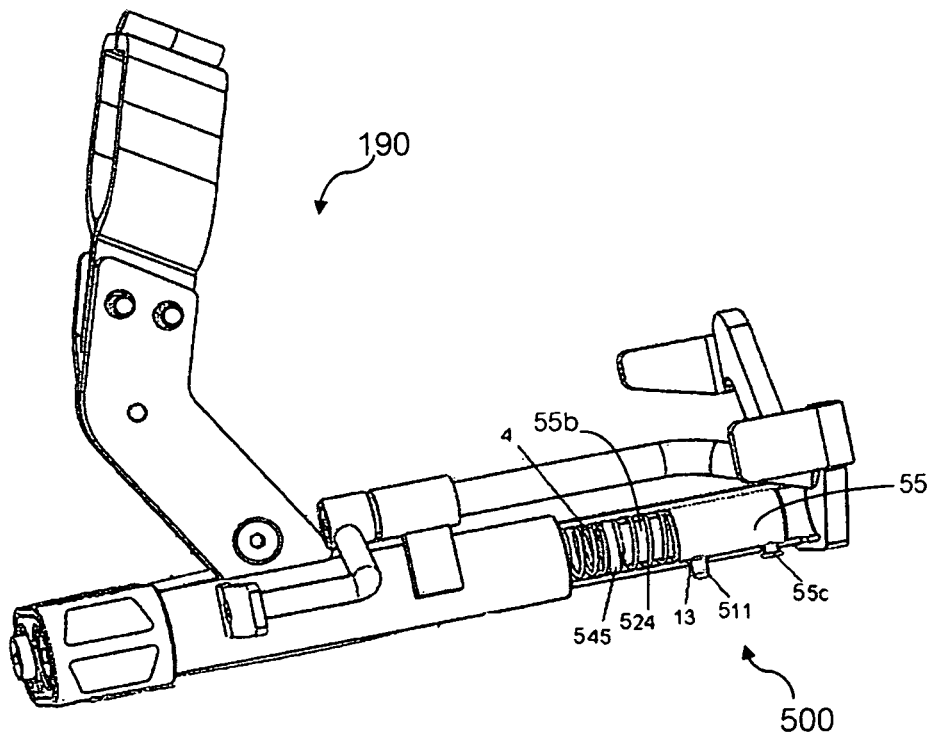
FIG. 27 is a cross-sectional view of the brake/clutch locking device incorporated with the fifth embodiment of the anti-lock mechanism of FIG. 26, wherein the anti-lock mechanism is in an engaged position.

According to FIG. 26-27, the brake/clutch locking device 190 has incorporated with the fifth embodiment of the anti-lock mechanism 500. The anti-lock mechanism 500 comprises a block 55 with appropriate shape and size slidable inside the slidable axial tube 2 at the lower end. Inside the slidable axial tube 1 is provided with a return spring 4 that has the lower end pushing against a partitioning ring 545. The other end of the return spring 4 pushes the end of the locking mechanism 6 connected inside the axial tube 1. The block 55 has an engaging end 55b persistently urged at one end of a spring 524. The other end of the spring 524 is push against a partitioning ring 545. A pin 511 with a coil spring 512 used in driving the end portion of the pin 511 to slide into the engaging position provided on the body of the block 55. The predetermined bored hole 13 is the engaging position on the wall of the slidable axial tube 2 in the position upstream of the locking position of the brake/clutch locking device 560. When an external force of more than 20 kg·f is applied to the main structure of an automobile in a relative direction and angle, sufficient kinetic energy may be produced to the block 55 to move the block 55 into the engaging position to prevent the brake/clutch locking device 560 from undesirably engaging into the locked position.

The block 55 has an axle 55c protruding into a slot on the slidable axial tube 2. With the abovementioned pin end 511 protruding through a predetermined bored hole 13 on the wall of the slidable axial tube 2, the slidable axial tube 2 is then blocked, with the edge of the axial tube 1 in the position upstream from the brake/clutch locking position so that the break/clutch locking device cannot proceed into the locked position.

Upon resuming a normal state that will activate the block 55 again, the pin end 511 protruding out of the slidable axial tube 2 is pushed into the slidable axial tube 2 and the spring 524 pushes the block 55 back to the end of the slidable axial tube 2 where it is ready for activation again.

Figure 28:
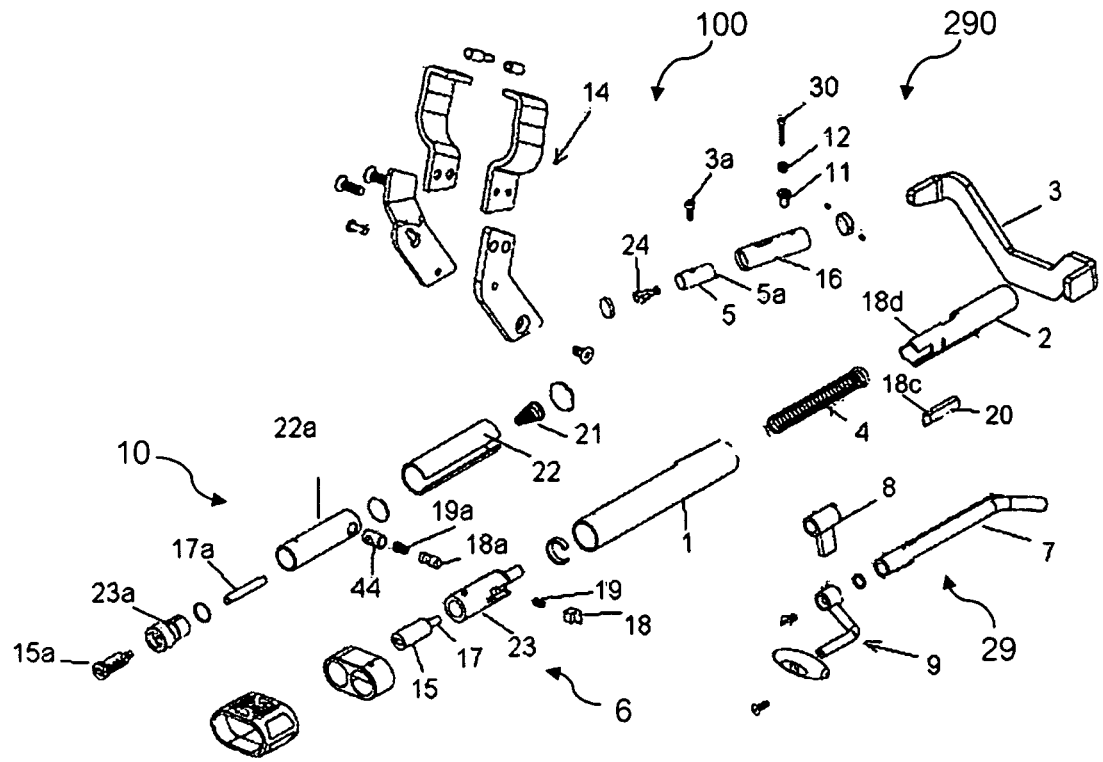
FIG. 28 is an exploded, perspective view of the second embodiment of a brake/clutch locking device incorporated with the first embodiment of the anti-lock mechanism as shown in FIG. 1.
Figure 29:
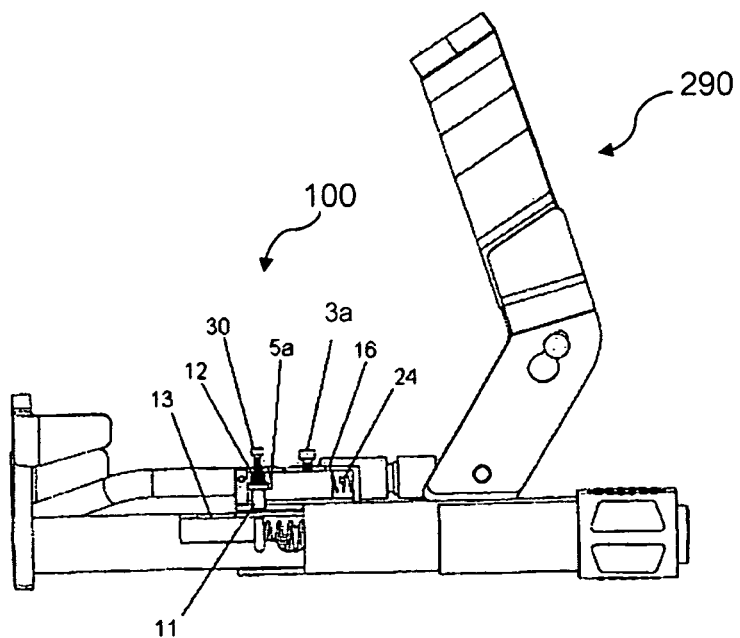
FIG. 29 is a cross-sectional view of the second embodiment of the brake/clutch locking device incorporated with the first embodiment of the anti-lock mechanism of FIG. 28, wherein the anti-lock mechanism is in a disengaged position.

According FIG. 28-29, there is shown the first embodiment of the anti-lock mechanism 100 assembled with the brake/clutch locking device 290 according to the present invention. The brake/clutch locking device 290 comprises a holding leg 14. One end of the holding leg 14 is fixed to an axial tube 1, the other end of the holding leg 14 acts as a steering wheel cylinder. A return spring 4 is provided inside the axial tube 1 wherein the slidable axial tube 2 inserted inside. The lower end of the slidable axial tube 2 is connected to a blocking panel rod 3. A supporting axle 7 is inserted in a collar 8 connected to the axial tube 1, the upper end of the supporting axle 7 is connected to a pulling mechanism 9 and the lower end of the supporting axle 7 is connected to the panel blocking rod 3. By pulling mechanism 9, the panel blocking rod 3 will be moved inwardly toward the axial tube 1 to move the brake/clutch locking device 170 into the locking position. Further, the present brake/clutch locking device 290 also includes a first locking mechanism 6 comprising a turning mechanism 15 which is turned by a key and a locking pin 17 working correspondingly wherein the locking pin 17 includes a locking pin 18 along with a spring 19 pushing the end of a slidable pin 18 to be locked with an end 18*c* of a two-fang rod 20 provided at the end of the predetermined slidable axial tube 2 located in the corresponding position when the brake/clutch locking device 290 is in the locking position. The lateral portion of the first locking mechanism 6 further comprises a second locking mechanism 10 having a turning mechanism 15*a* inside a housing 23*a* wherein the lower portion of the turning mechanism 15*a* engaged with a pin 17*a* inside a housing 22*a* corresponding to a locking pin 18*a* in a housing 44 is pushed with a spring 19*a* through a slot of collar 22 through the opening of the axial tube 1 to the bored hole 18*d* of the predetermined slidable axial tube 2 located in the corresponding position to the locking position. The second locking mechanism 10 can be securably engaged in the locked position by pressing the second locking mechanism 10 so that the second pin 18*a* is inserted through the groove on the collar 22, the opening of the axial tube 1 and the bored hole 18*d* on the wall of the abovementioned slidable axial tube 2, which have been placed in a corresponding position. When engaged in the lock position, the second locking mechanism 10 becomes a second level of security to secure the blocking panel rod 3 to be immovably positioned to the rear of the brake/clutch pedals, thereby preventing operation of the pedals in the event first locking mechanism 6 is damaged.

Figure 30:
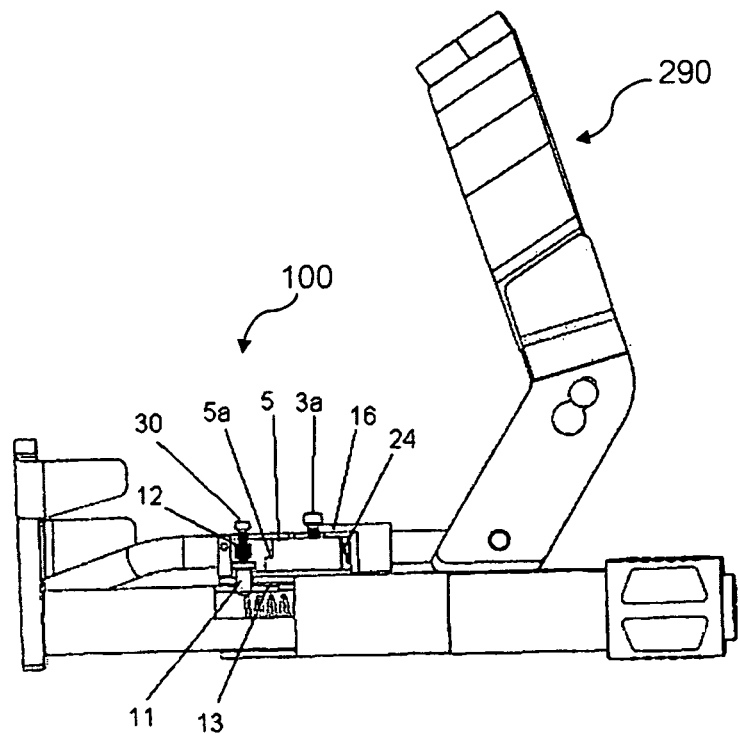
FIG. 30 is a cross-sectional view of the second embodiment of the brake/clutch locking device incorporated with the first embodiment of the anti-lock mechanism of FIG. 28, wherein the anti-lock mechanism is in an engaged position.

According to FIG. 29-30, the brake/clutch locking device 290 is incorporated with the anti-lock mechanism 100 for use with the brake/clutch locking device according to the present invention. The anti-lock mechanism 100 is mounted on the axial tube 1. An anti-lock mechanism 100 comprises a block 5 with appropriate shape and size slidable inside the mechanical chamber 16. The block 5 is provided with a spring 24 used in pushing the rear end of the block 5. The front end of the block has a shoulder portion 5*a* having a shape corresponding to the protruding lower edge of a pin 11 inside a mechanical chamber 16. On the top of a pin 11 is provided with a coil spring 12 for preventing the slidable axial tube 2 from sliding through the bored holes 13 provided on the wall of the axial tube 1 and on the slidable axial tube 2 in a position upstream of a locking position of the brake/clutch locking device 290. When an external force of more than 20 kg·f is applied to the main structure of an automobile in a relative direction and angle, sufficient kinetic energy may be produced for the block 5 to move the front shoulder 5*a* of the block 5 outward from the protruding edge of the pin 11. The pin 11, therefore, slides down into the bored holes 13 and blocks the movement of the slidable axial tube 2, which, in turn, prevents the brake/clutch locking device 290 from sliding into the brake/clutch locking position. On the top of the pin 11, an axle 30 is provided extending through the wall of the mechanical chamber 16 in the outward direction to pull the pin 11 out of the position that blocks the slidable axial tube 2 to place the pin 11 onto the shoulder 5*a* of the block 5 in the normal state again. The pin 11 is placed into the position suitable for preventing the brake/clutch locking device 290 from entering into the locking position in relation with the retreating of the block 5 along with the block holding axle 3*a* protruding through the slot on the mechanical chamber 16.

Figure 31:
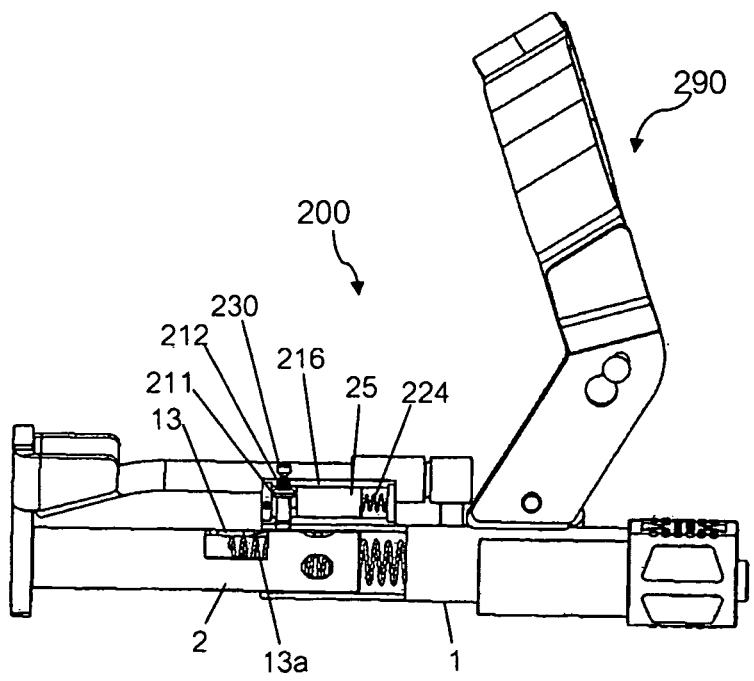
FIG. 31 is a cross-sectional view of the second embodiment of the brake/clutch locking device incorporated with the second embodiment of the anti-lock mechanism, wherein the anti-lock mechanism is in a disengaged position.
Figure 32:
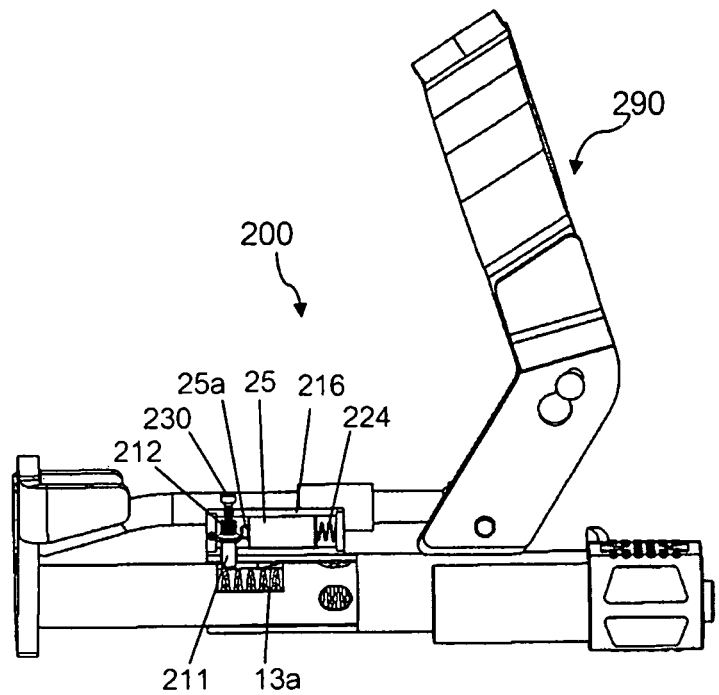
FIG. 32 is a cross-sectional view of the second embodiment of the brake/clutch locking device incorporated with the second embodiment of the anti-lock mechanism, wherein the anti-lock mechanism is in an engaged position.

According to FIG. 31-32, the brake/clutch locking device 290 is incorporated with the anti-lock mechanism 200 for use with the brake/clutch locking device 290 according to the present invention. The anti-lock mechanism 200 is mounted on the axial tube 1. The anti-lock mechanism 200 according to the present invention comprises a block 25 having a shape and size suitable for a sliding motion within the mechanical chamber 216 and a spring 224 used in pushing the rear end of the block 25. The front end of the block 25 is in the shape of the axle 25*a* with a rounded tip extending in correspondence with the protruding edge of the pin 211 having a curved top provided with a coil spring 212 for use in preventing the slidable axial tube 2 from sliding through bored holes 13 provided on the wall of an axial tube 1 and on the slidable axial tube 2 in a position upstream of a locking position of the brake/clutch locking device 290. One side of an edge of the bored hole 13 on the slidable axial tube 2 is a sloped portion 13*a* for convenience in pushing the end portion of the pin 211 back into the position while the slidable axial tube 2 is in the normal unlocked state. Once the main structure of an automobile is subject to an external force of more than 20 kg·f in the relative direction and angle, the sufficient kinetic energy may be produced for the block 25 to move the front shoulder 25*a* of the block 25 from outward the protruding edge of the pin 211. The pin 211 thus slides down to the bored holes 13 and prevent the slidable axial tube 2 from moving into the locking position of the brake/clutch locking device 290. The sloped portion 13*a* will pushing the end portion of the pin 211 back into the position while the slidable axial tube 2 is in the normal unlocked state. The bottom part of pin 211 is curved to accommodate this sliding action. At the end portion of the pin 211, there is an axle 230 extending outward through the mechanical chamber 216.

Figure 33:
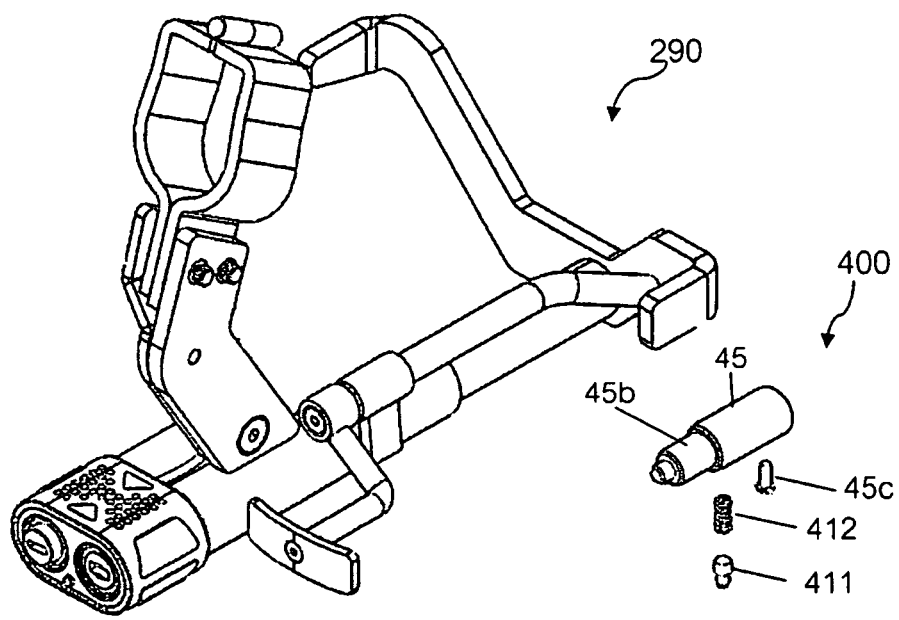
FIG. 33 is an exploded, perspective view of the second embodiment of a brake/clutch locking device incorporated with the fourth embodiment of the anti-lock mechanism.
Figure 34:
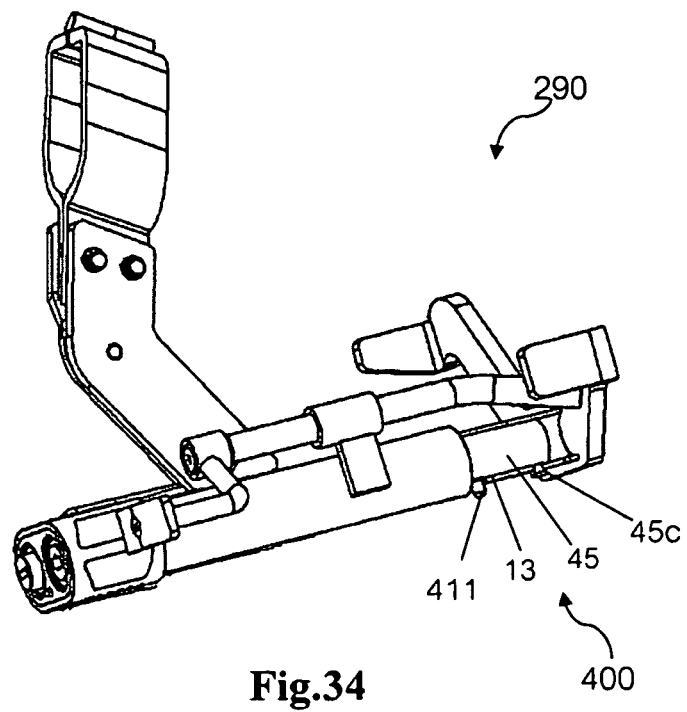
FIG. 34 is a perspective view of the brake/clutch locking device incorporated with the fourth embodiment of the anti-lock mechanism of FIG. 33, wherein the anti-lock mechanism is in an engaged position.

According to FIG. 33-34, the brake/clutch locking device 290 is incorporated with the anti-lock mechanism 400. The anti-lock mechanism 400 comprises a block 45 with appropriate shape and size slidable inside the slidable axial tube 2. The block 45 has an engaging end 45*a*. Inside the axial tube 2 is provided with a return spring 4. The lower end of the spring 4 pushes against the engaging end 45*a* of the block 45. The other end of the return spring 4 pushes against the end of the locking mechanism 6 connected inside the axial tube 1. A pin 411 with a coil spring 412 used in driving the end portion of the pin 411 to slide into the engaging position which is provided on the body of the block 45. The predetermined bored hole 13 is in the locking position on the wall of the slidable axial tube 2 in the position upstream of the locking position of the brake/clutch locking device 290. When an external force of more than 20 kg·f is applied to the main structure of an automobile in a relative direction and angle, sufficient kinetic energy may be produced to the block 45 to move the block 45 into the engaging position.

The block 45 has an axle 45*c* protruding into a slot on the slidable axial tube 2. With the abovementioned pin end 411 protruding through a predetermined bored hole 13 on the wall of the slidable axial tube 2, then the slidable axial tube 2 is blocked with the edge of the axial tube 1 in the position upstream from the brake/clutch locking position so that the break/clutch locking device is unable to proceed into the locked position.

Upon resuming a normal state that will activate the block 45 again, the pin end 411 protruding out of the slidable axial tube 2 is pushed into the slidable axial tube 2 and the spring 4 pushes the block 45 back to the end of the slidable axial tube 2 where it is ready for activation again.

Figure 35:
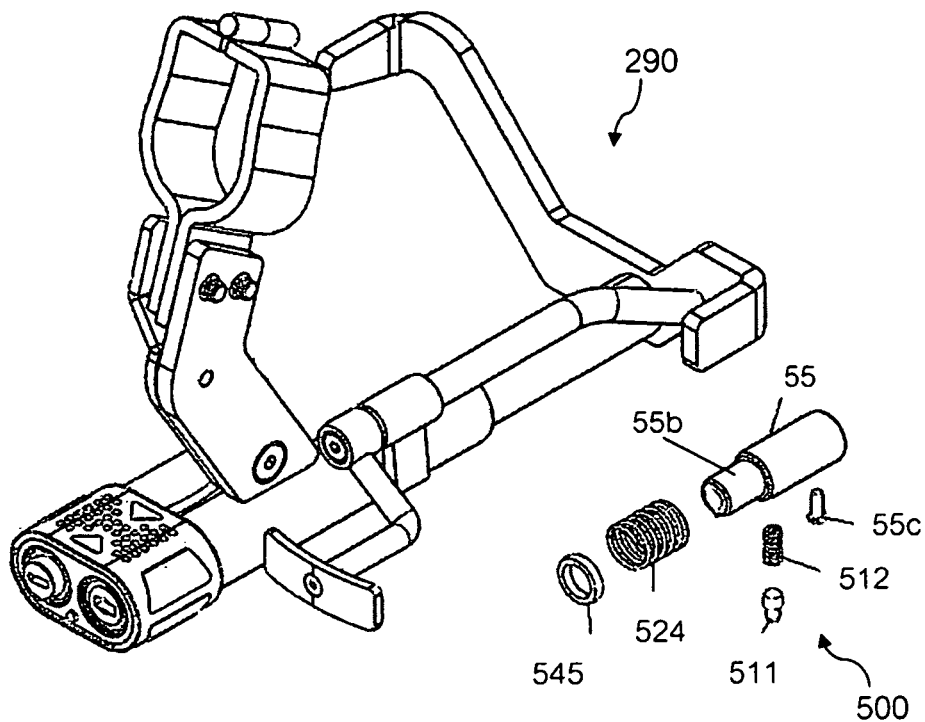
FIG. 35 is an exploded, perspective view of the second embodiment of the brake/clutch locking device incorporated with the fifth embodiment of the anti-lock mechanism.
Figure 36:
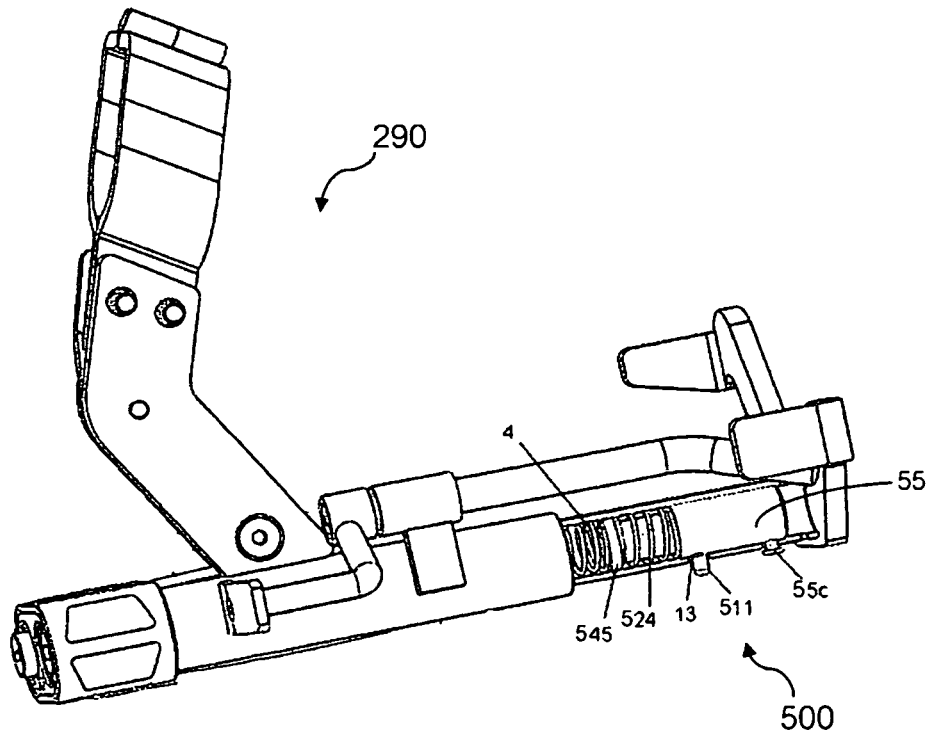
FIG. 36 is a cross-sectional view of the second embodiment of the brake/clutch locking device incorporated with the fifth embodiment of the anti-lock mechanism of FIG. 35, wherein the anti-lock mechanism is in an engaged position.

According to FIG. 35-36, the brake/clutch locking device 290 is incorporated with the anti-lock mechanism 500. The anti-lock mechanism 500 comprises a block 55 with appropriate shape and size slidable inside the slidable axial tube 2 at the lower end. Inside the slidable axial tube 1 is provided with a return spring 4 that has the lower end pushing against a partitioning ring 545. The other end of the return spring 4 pushes against the end of the locking mechanism 6 connected inside the axial tube 1. The block 55 has an engaging end 55a corresponding to a spring 524, the other end of spring 524 is push against a partitioning ring 545. A pin 511 with a coil spring 512 used in driving the end portion of the pin 511 to slide into the engaging position provided on the body of the block 55. The predetermined bored hole 13 is the engaging position on the wall of the slidable axial tube 2 in the position upstream of the locking position of the brake/clutch locking device 290. When an external force of more than 20 kg·f is applied to the main structure of an automobile in a relative direction and angle, sufficient kinetic energy may be produced to the block 55 to move the block 55 into the engaging position.

The block 55 has an axle 55c protruding into a slot on the slidable axial tube 2. With the abovementioned pin end 511 protruding through a predetermined bored hole 13 on the wall of the slidable axial tube 2, the slidable axial tube 2 is then blocked, with the edge of the axial tube 1 in the position upstream from the brake/clutch locking position so that the break/clutch locking device is unable to proceed into the locked position.

Upon resuming a normal state that will activate the block 55 again, the pin end 511 protruding out of the slidable axial tube 2 is pushed into the slidable axial tube 2 and the spring 524 pushes the block 55 back to the end of the slidable axial tube 2 where it is ready for activation again.

Figure 37:
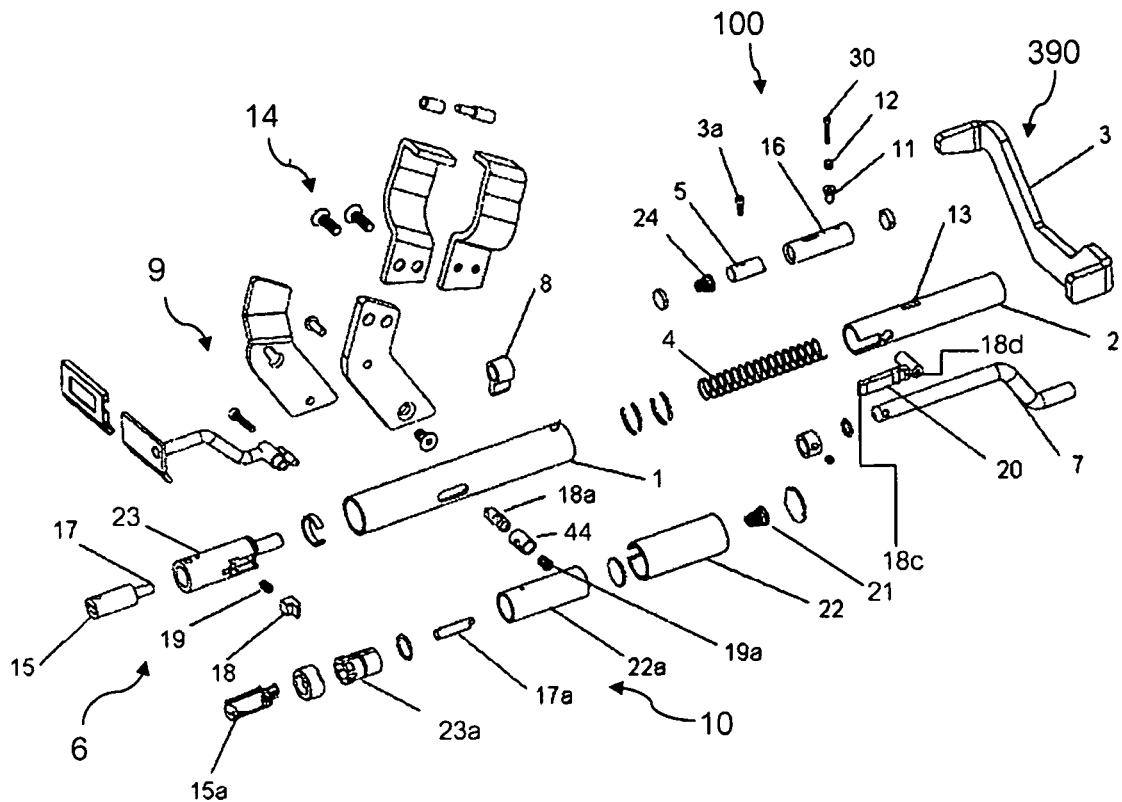
FIG. 37 is an exploded, perspective view of the third embodiment of a brake/clutch locking device incorporated with the first embodiment of the anti-lock mechanism.
Figure 38:
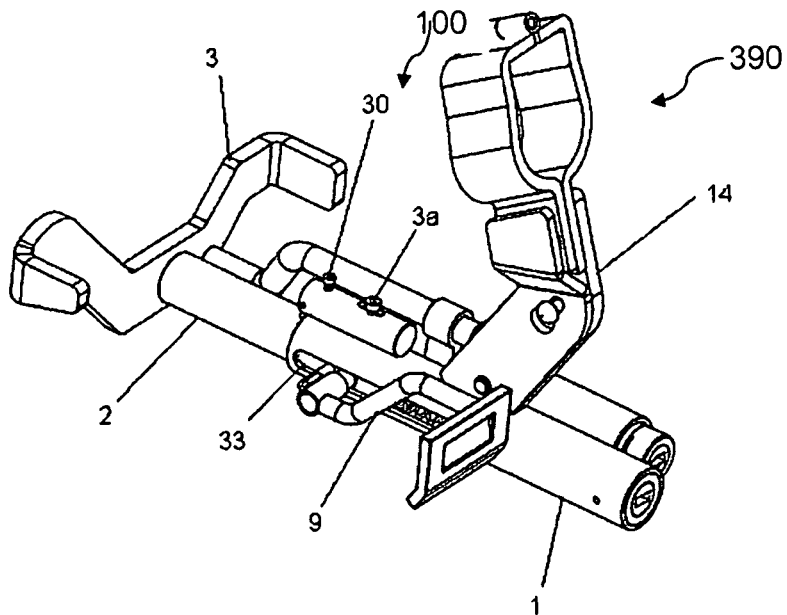
FIG. 38 is a perspective view of the third embodiment of the brake/clutch locking device incorporated with the first embodiment of the anti-lock mechanism of FIG. 37.

According to FIG. 37-38, there is shown the third embodiment of the brake/clutch locking device 390 incorporated with the anti-lock mechanism 100 according the present invention. The brake/clutch locking device 390 comprises a holding leg 14. One end of the holding leg 14 is fixed to an axial tube 1, and the other end acts as a steering wheel cylinder. A return spring 4 is provided inside the axial tube 1 wherein the slidable axial tube 2 inserted inside. The lower end of the slidable axial tube 2 is connected to a blocking panel rod 3. A line of opening 33 for use as a connecting portion of the end gripping rod 9 with the slidable tube 2 is provided on another side of the axial tube 1. The line of the opening 33 is a member that defines a retreating sliding distance of the slidable axial tube 2 to prevent a movement out of the end of the axial tube 1. By pulling the gripping rod 9, the panel blocking rod 3 will be moved inward to the axial tube 1 in order to lock the brake/clutch locking device into the locking position. Further, the present brake/clutch locking device 390 also includes a first locking mechanism 6 comprising a turning mechanism 15 which is turned by a key and a locking pin 17 working correspondingly wherein the locking pin 17 includes a locking pin 18 along with a spring 19 pushing the end of a slidable pin 18 to be locked with an end 18c of a two-fang rod 20 provided at the end of the predetermined slidable axial tube 2 located in the corresponding position when the brake/clutch locking device is in the locking position. The lateral portion of the first locking mechanism 6 further comprises a second locking mechanism 10 having a turning mechanism 15a inside a housing 23a wherein the lower portion of the turning mechanism 15a engaged with a pin 17a inside a housing 22a corresponding to a locking pin 18a in a housing 44 is pushed with a spring 19a through a slot of collar 22 through the opening of the axial tube 1 to be locked with an end 18d of the two-fang rod 20 located in the corresponding position by pressing the second locking mechanism 10, thereby locking the brake/clutch locking device in the locked position.

Figure 39:
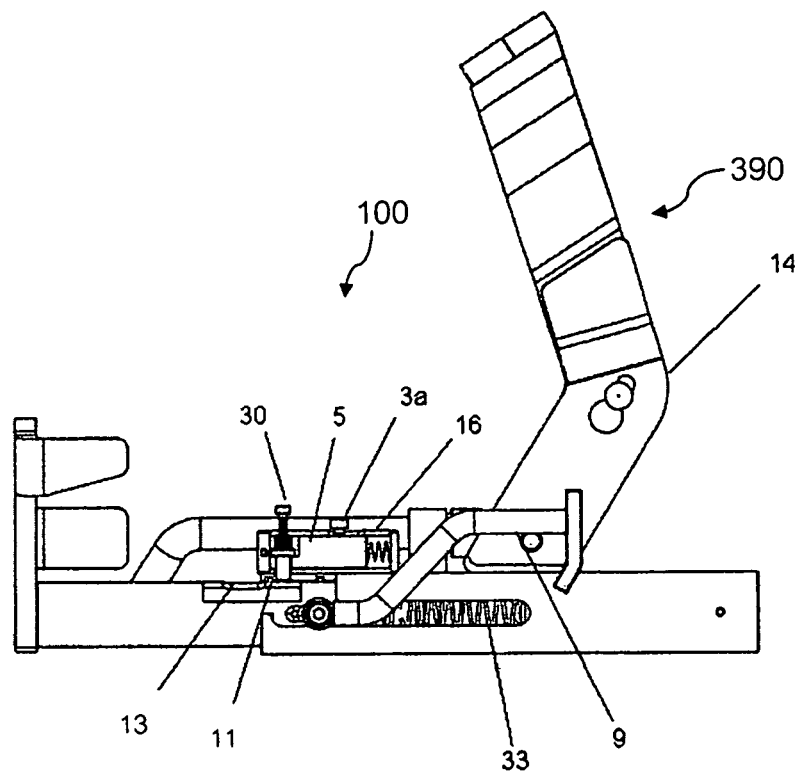
FIG. 39 is a cross-sectional view of the third embodiment of the brake/clutch locking device incorporated with the first embodiment of the anti-lock mechanism of FIG. 38, wherein the anti-lock mechanism is in a disengaged position.
Figure 40:
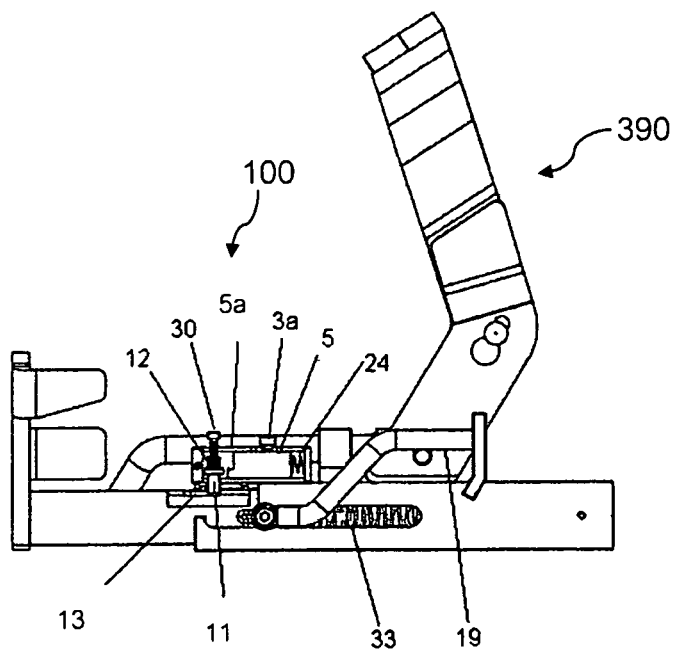
FIG. 40 is a cross-sectional view of the third embodiment of the brake/clutch locking device incorporated with the first embodiment of the anti-lock mechanism of FIG. 38, wherein the anti-lock mechanism is in an engaged position.

According to FIG. 38-40, the brake/clutch locking device 390 is incorporated with the anti-lock mechanism 100 for use with the brake/clutch locking device according to the present invention. The anti-lock mechanism 100 is mounted on the axial tube 1. The anti-lock mechanism 100 comprises a block 5 with appropriate shape and size slidable inside the mechanical chamber 16. The block 5 is provided with a spring 24 used in pushing the rear end of the block 5. The front end of the block has a shoulder portion 5a having a shape corresponding to the protruding lower edge of a pin 11 and inside a pin chamber on top of a pin 11 provided with a coil spring 12 for use in preventing the slidable axial tube 2 from sliding through the bored holes 13 provided on a wall of the axial tube 1 and on the slidable axial tube 2 in a position upstream of a locking position of the brake/clutch locking device 390. When an external force of more than 20 kg·f is applied to the main structure of an automobile in a relative direction and angle, sufficient kinetic energy may be produced to the block 5 to move the front shoulder 5a of the block 5 outward from the protruding edge of the pin 11. The pin 11, therefore, slides down into the bored holes 13 and blocks the movement of the slidable axial tube 2, which, in turn, prevents the brake/clutch locking device from sliding into the brake/clutch locking position. On the top of the pin 11, an axle 30 is provided extending through the wall of the mechanical chamber 16 in the outward direction to pull the pin 11 out of the position that blocks the slidable axial tube 2 to place the pin 11 onto the shoulder 5a of the block 5. The pin 11 is placed into the position suitable for preventing the brake/clutch locking device from entering the locking position in relation with the retreating of the block 5 along with the block holding axle 3a protruding through the slot on the mechanical chamber 16.

Figure 41:
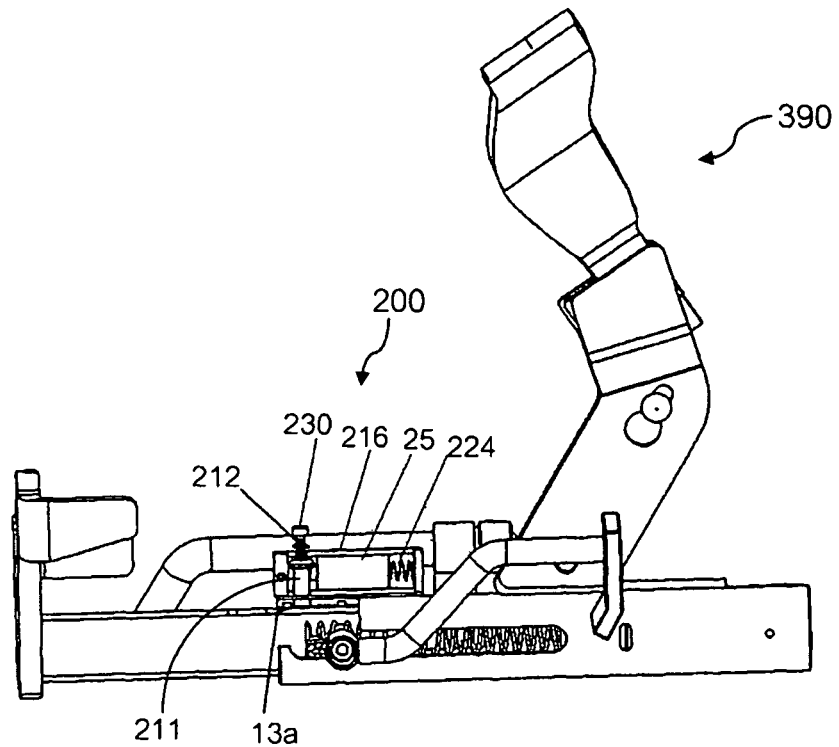
FIG. 41 is a cross-sectional view of the third embodiment of the brake/clutch locking device incorporated with the second embodiment of the anti-lock mechanism, wherein the anti-lock mechanism is in a disengaged position.
Figure 42:
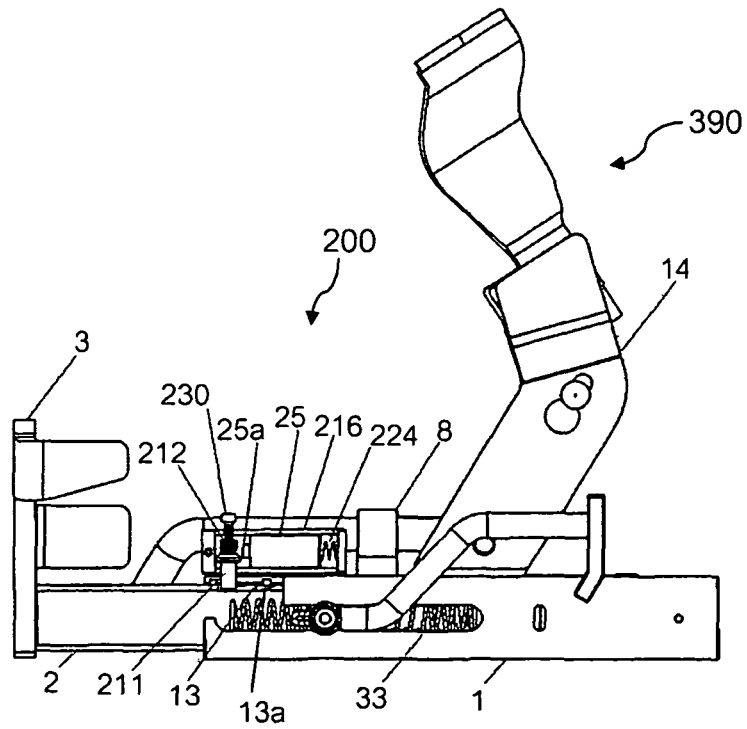
FIG. 42 is a cross-sectional view of the third embodiment of the brake/clutch locking device incorporated with the second embodiment of the anti-lock mechanism, wherein the anti-lock mechanism is in an engaged position.

According to FIG. 41-42, the brake/clutch locking device 390 is incorporated with the anti-lock mechanism 200 according present invention. The anti-lock mechanism 200 is mounted on the axial tube 1. The anti-lock mechanism 200 has a block 25 having a shape and size suitable for a sliding motion within the mechanical chamber 216 and a spring 224 is used to pushing the rear end of the block 25. The front end 25a of the block 25 is in the shape of the axle with a rounded tip extending in correspondence with the protruding edge of the pin 211. The pin 211 has a curved top and inside a pin chamber on the top of the pin 211 provided with a coil spring 212 for use in preventing the slidable axial tube 2 from sliding through bored holes 13 provided on the wall of an axial tube 1 and on the slidable axial tube 2 in a position upstream of a locking position of the brake/clutch locking device 390. One side of an edge of the bored hole 13 on the slidable axial tube 2 is a sloped portion 13a for convenience in pushing the end portion of the pin 211 back into the position while the slidable axial tube 2 is in the normal unlocked state. Once the main structure of an automobile is subject to an external force of more than 20 kg·f in the relative direction and angle, the sufficient kinetic energy may be produced for the block 25 to move the front shoulder 25a of the block 25 outward from the protruding edge of the pin 211. The pin 211 thus slides down to the bored holes 13 and prevent the slidable axial tube 2 from moving into the locking position of the brake/clutch locking device 390. The bottom part of the pin 211 is curved to accommodate this sliding action. At the end portion of the pin 211, there is an axle 30 extending outward through the mechanical chamber 16.

Figure 43:
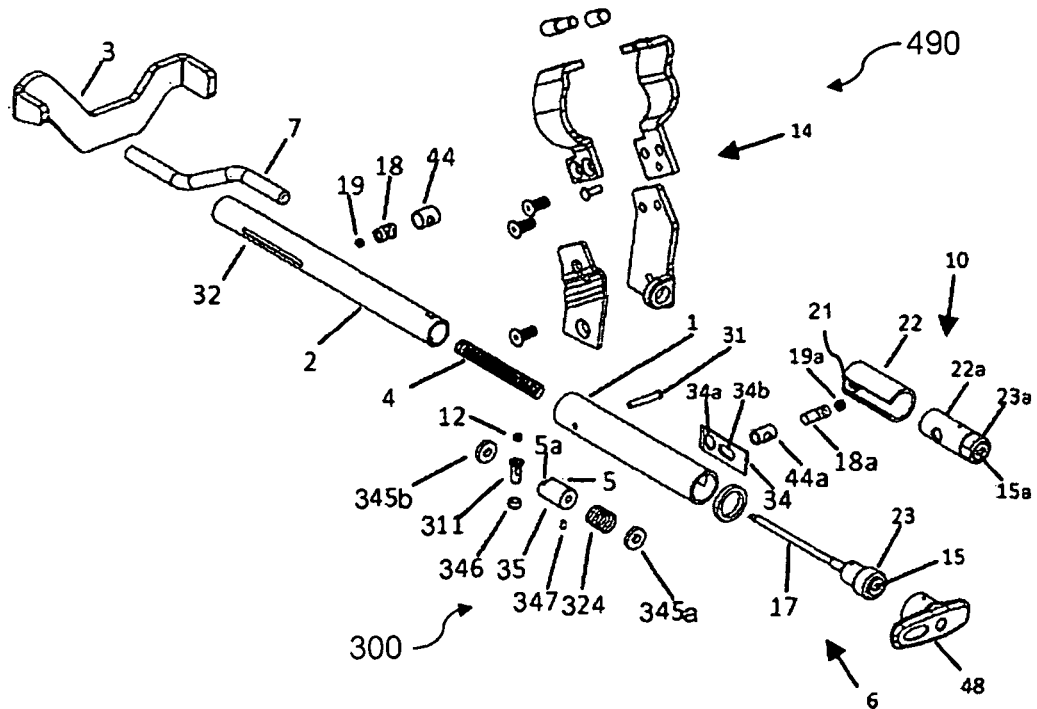
FIG. 43 is an exploded, perspective view of the fourth embodiment of a brake/clutch locking device incorporated with the fourth embodiment of the anti-lock mechanism.

According to FIG. 43, there is shown the fourth embodiment of the brake/clutch locking device 490 incorporated with the anti-lock mechanism. The brake/clutch locking device 490 comprises an axial tube 1 and a slidable axial tube 2. A slidable axial tube 2 is inserted inside the axial tube 1. The upper end of axial tube 1 is mounted with a holding leg 14 and a first locking mechanism 6. The other end of the slidable axial tube 2 is provided with a blocking panel rod 3 attached thereto. A return spring 4 is provided inside the slidable axial tube 2. The axial tube 1 is assembled with the slidable axial tube 2 by a pin 31, each end of which is attached to a wall of the axial tube 1 on the opposite side and insert through a line of the opening 32 on the wall of the slidable axial tube 2 in a corresponding position for use as an upper blocking line of the return spring 4 and a sliding distance defining member of the slidable axial tube 2 as well. The upper end of the slidable axial tube 2 is mounting part for the first locking mechanism 6, and a second locking mechanism 10 on the side of the first locking mechanism 6. The first locking mechanism 6 at the housing 23 is enclosed by the pulling handle 48. When the pulling handle 48 is pulled, the pin 18 which is inside the slidable axial tube 2 will move along with the slidable axial tube 2 to lock with a slot 34a on a plate 34 that is attached to the opening of the axial tube 1, then the blocking panel rod 3 slides inward to the axial tube 1 to block the brake and clutch pedals of an automobile. The second locking mechanism 10 having a turning mechanism 15a inside a housing 23a wherein the lower portion of the turning mechanism 15a engaged with a pin 17a inside a housing 22a corresponding to a locking pin 18a inside a housing 44a which is push with a spring 19a through a slot of the collar 22 to a slot 34b on a plate 34 and a bored hole on the slidable axial tube 2 located in the corresponding position to the locking position. By pressing the second locking mechanism 10, the brake/clutch locking device will be locked in the locking position. A spring 21 is placed at the closed end of the collar 22 for pushing the lower end of the housing 22a when unlock the second locking mechanism 10.

Figure 44:
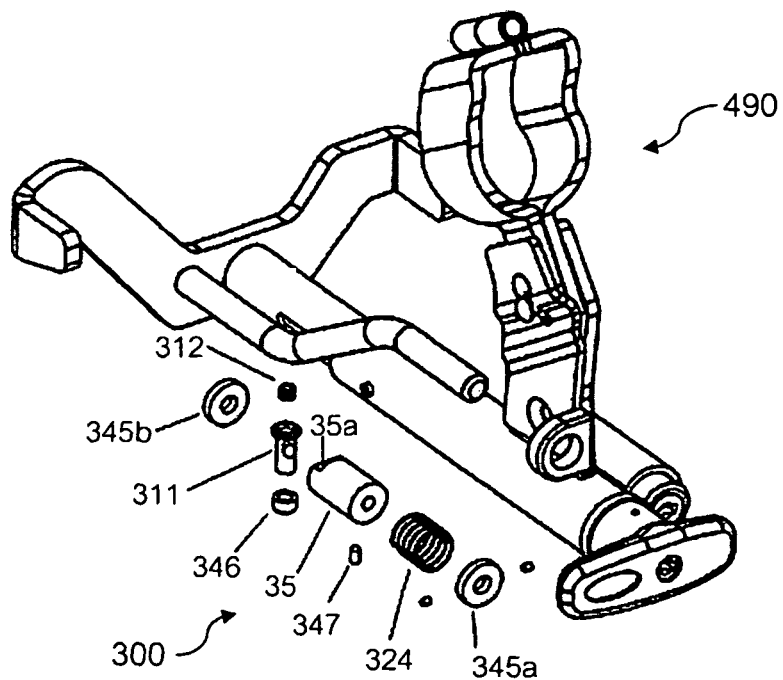
FIG. 44 is a perspective view of the fourth embodiment of the brake/clutch locking device incorporated with the fourth embodiment of the anti-lock mechanism of FIG. 43.
Figure 45:
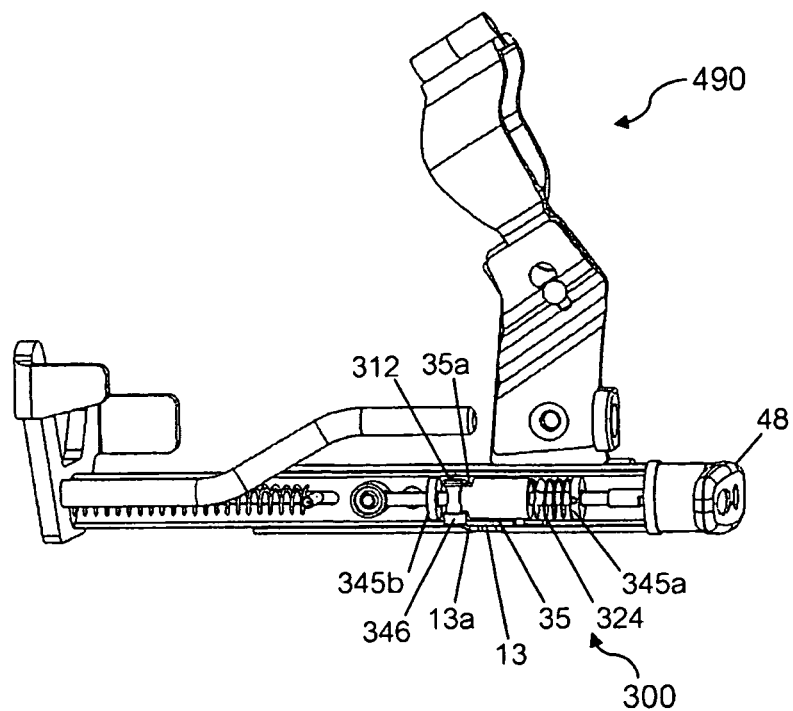
FIG. 45 is a cross-sectional view of the fourth embodiment of the brake/clutch locking device incorporated with the fourth embodiment of the anti-lock mechanism of FIG. 43, wherein the anti-lock mechanism is in a disengaged position.
Figure 46:
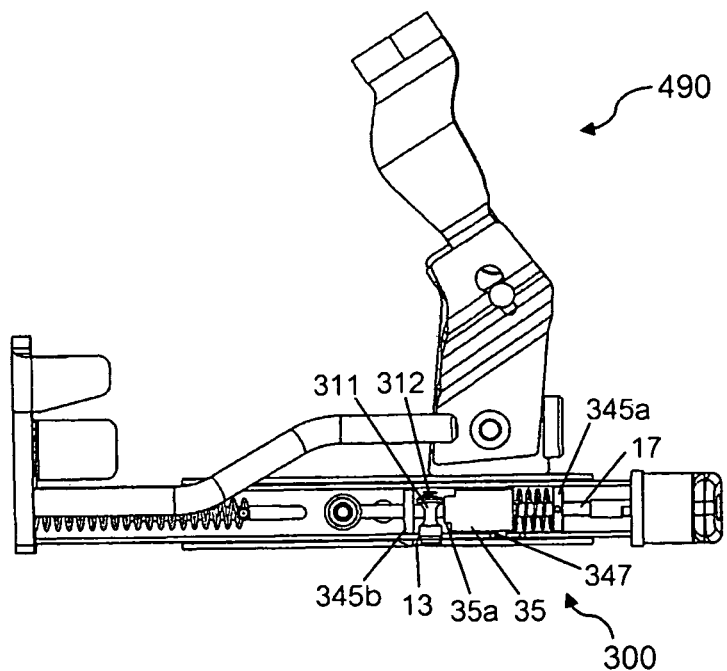
FIG. 46 is a cross-sectional view of the fourth embodiment of the brake/clutch locking device incorporated with the fourth embodiment of the anti-lock mechanism of FIG. 43, wherein the anti-lock mechanism is in an engaged position.

According to FIG. 44-46, inside the slidable axial tube 2 of the brake/clutch locking device 490, further comprises the anti-lock mechanism 300. The anti-lock mechanism 300 comprises rings 345a,345b partitioning the lock protecting mechanism chamber inside the slidable axial tube 2 with the first locking mechanism 6 and a first locking pin 18 with a spring 19 inside a housing 44 in the slidable axial tube 2. Inside the lock protecting mechanism chamber, a pin 311 and a block 35 are provided such that the pin311 and the block 35 which has a shape and size appropriate for sliding inside the slidable axial tube 2 and engaged with an axle 17 of the first turning mechanism 6 and provided with a spring 324 pushing the block 35. The front portion 35a of the block 35 has a shoulder portion having a shape corresponding to the protruding edge of the pin 311 inside the pin chamber and provided with a coil spring 312 for preventing the slidable axial tube 2 from sliding through a bush 346 on the wall of the slidable axial tube 2 to enable the locking position of the brake/clutch locking device 490. One edge of the bored hole 13 on the axial tube 1 is a sloped portion 13a for convenience in pushing the end portion of the pin 311 back into the position while the slidable axial tube 2 is in the normal unlocked position. The bottom part of the pin 311 is curved to accommodate this slide action. When an external force more than 20 kg·f is applied to the main structure of an automobile in a relative direction and angle, sufficient amount of kinetic energy may be produced to move the front shoulder 35a of the block 35 from the protruding edge of the pin 311. Therefore, the end of the pin 311 slides down into the bored holes 13 and blocks the movement of the slidable axial tube 2 into the locking position of the brake/clutch locking device with the abovementioned pin 311 protruding out of the wall of the slidable axial tube 2 to block the edge of the axial tube 1. At the end portion of the block 35, an axle end protruding 347 is provided such that a groove on the wall of the slidable axial tube 2 will prevent the pivotal movement of the block 35 around the first turning mechanism 6.

Figure 47:
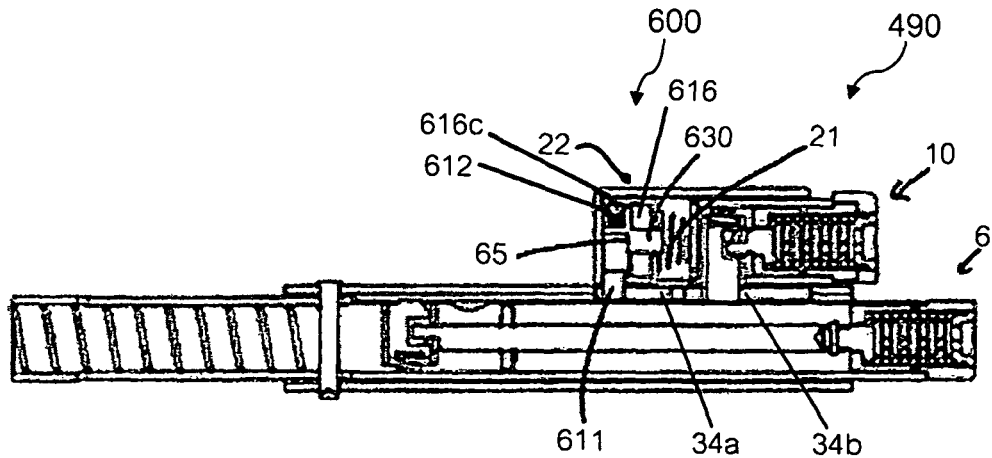
FIG. 47 is a cross sectional view of the sixth embodiment of anti-lock mechanism incorporated with the second locking mechanism of the fourth embodiment of the brake/clutch locking device, wherein in normal vehicle operating the anti-lock mechanism is in a disengaged position.
Figure 48:
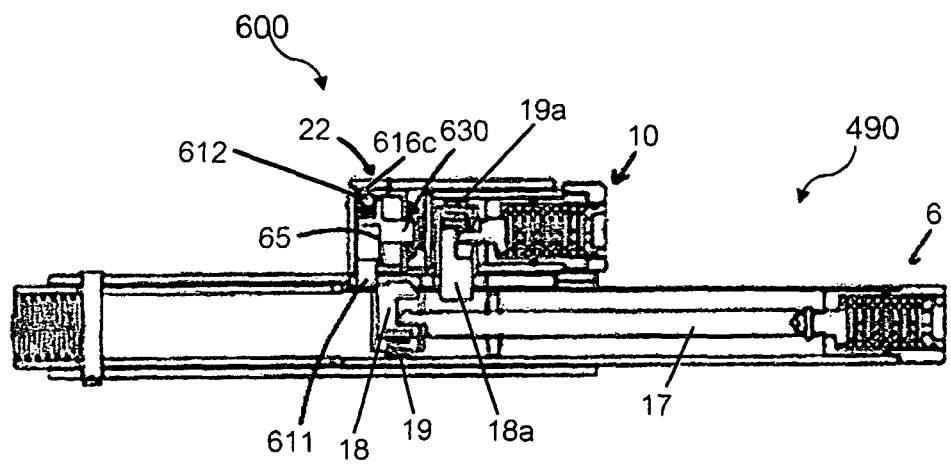
FIG. 48 is a cross sectional view of the sixth embodiment of anti-lock mechanism incorporated with the second locking mechanism of the fourth embodiment of the brake/clutch locking device, wherein in normal vehicle operating and when the brake/clutch locking device is in locked position, the anti-lock mechanism is in a disengaged position.
Figure 49:
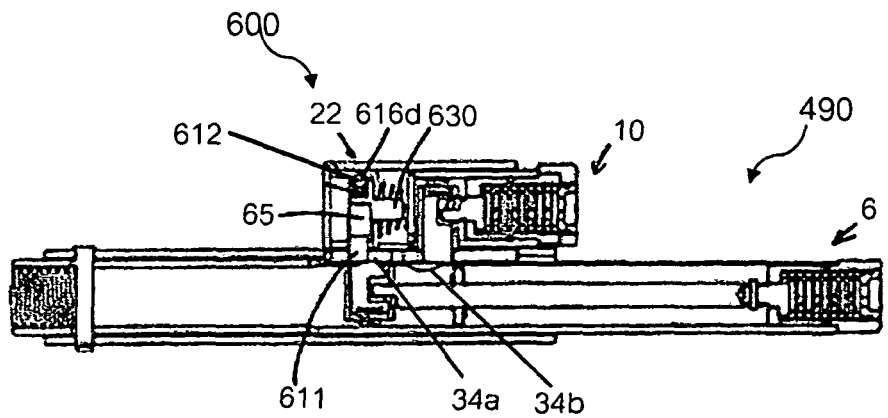
FIG. 49 is a cross sectional view of the sixth embodiment of anti-lock mechanism incorporated with the second locking mechanism of the fourth embodiment of the brake/clutch locking device, wherein in abnormal vehicle operating situation, the anti-lock mechanism is in an engaged position.

According to FIG. 47-49, the slidable axial tube 2 of the brake/clutch locking device 490 further comprises the anti-lock mechanism 600 for use with the brake/clutch locking device. The anti-lock mechanism 600 comprises a block 65 with appropriate shape and size slidable inside a mechanical chamber 616. The mechanical chamber 616 includes a slot 616a on a side wall. The anti-lock mechanism 600 is placed in an end of the collar 22 of the second locking mechanism 10 of the brake/clutch locking device 490. The front end of the block 65 has an axle 630 protruding into the center hole 616b which is opposite to the open end of the mechanical chamber 616. On one side of the block 65 there is a dowel 611 slidable in the slot 616a and on the opposite site provided with a spring 624 and a pin 612 inside a hole 65b. Two mating holes (616c, 616d) are provided corresponding to the pin 612 on the internal wall of the mechanical chamber 616. A spring 21 is provided at the front end of the mechanical chamber 616, one end of the spring 21 pushing the wall at the end of the second locking mechanism 10 chamber. When an external force of more than 20 kg·f is applied to the main structure of an automobile in a relative direction and angle, sufficient amount of kinetic energy may be produced to move the block 65 from the mating hole 616c to the mating hole 616d on the inner wall of the mechanical chamber 616, at the same time the dowel 611 will slide into proper place which is the slot 34a of the plate 34, the anti-locking mechanism is in the engaging position, that is the locking position of the brake/clutch locking device 490.

The resetting of the anti-lock mechanism 600 from the engaged position to the disengaged position occurs when the user press the second locking mechanism 10, the wall at the end of the second locking mechanism 10 chamber will push the block 65 back. In doing so, pushing pin 612 becomes free from the second mating hole 616d and moves to engage into the first mating hole 616c where the block 65 backs to the end of the collar 22 to be ready for activation again.

According to four embodiments of the brake/clutch locking devices of this invention as described above, the process of unlocking is that the second locking mechanism 10 will be unlocked first by the turning mechanism 15a with the key. The spring 21 will push the second locking mechanism 10 back and release the pin 18a out of the locking position. Then, by unlocking the first locking mechanism 6 by rotating the turning mechanism 15 with the key. The pin 18 will be released from the locking position, then the spring 4 will force the slidable axial tube 2 pushing the blocking panel rod 3 to unlock the brake/clutch of an automobile.

Figure 50:
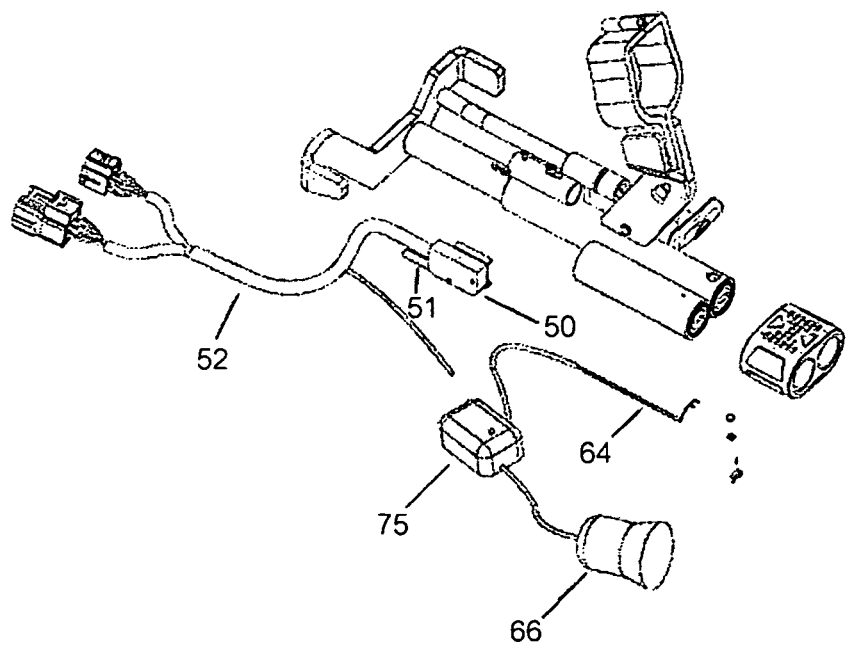
FIG. 50 is a perspective view of the first embodiment of the brake/clutch locking device incorporated with the first embodiment of the anti-lock mechanism, alarm system and anti-start system.

Anti-start system according to FIG. 50, the above brake/clutch locking device further comprises an engine cut off switch 50 that will cut off the engine from starting system when the brake/clutch locking device is in the locked position to prevent the engine from starting, and the engine cut off switch functioning to connect the engine start system when the brake lever/clutch locking device is in the unlocked position to allow the engine starting and stepping on the brake/ clutch pedals as usual. The engine cut off switch 50 provided with a switch pressing rod 51 is mounted at the lower end of the axial tube 1 The function of the switch is related to the blocking rod 3 presses the switch pressing rod 51 to cut off the engine when the slidable axial tube 2 slides to be locked in the locking position and the switch pressing rod 51 will be released when the slidable axial tube 2 is in the unlocked position. Then the engine can work again.

Figure 51:
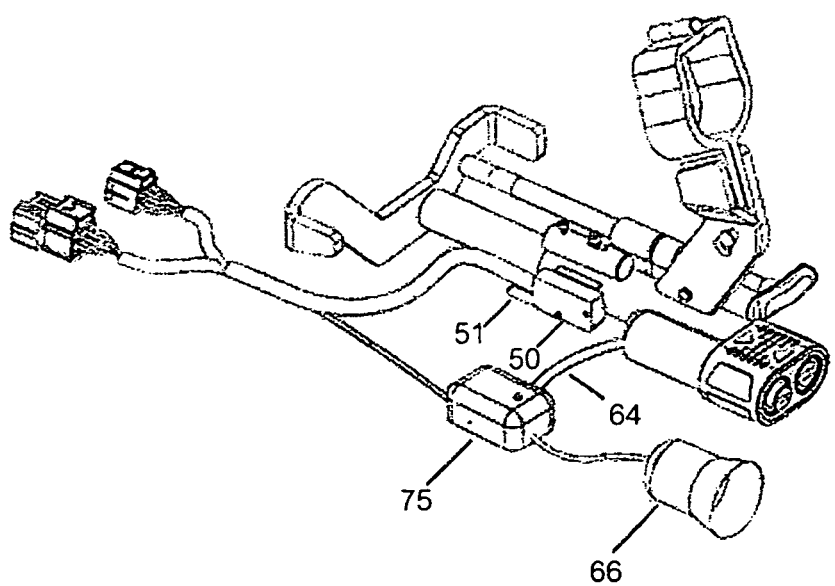
FIG. 51 is another perspective view of the brake/clutch locking device of FIG. 50.
Figure 52:
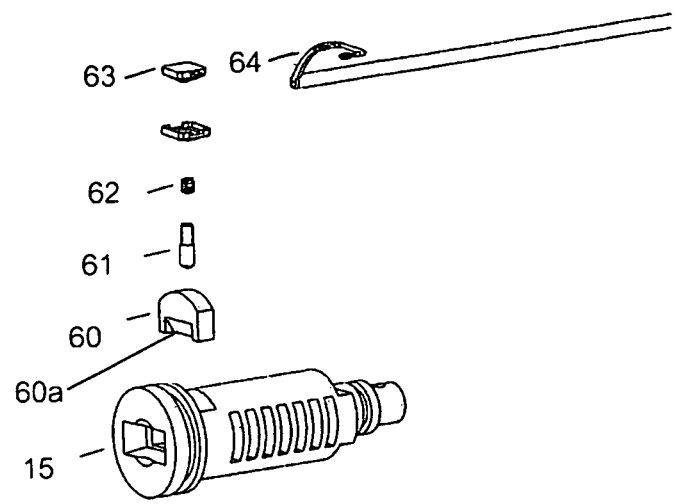
FIG. 52 is a perspective view of micro switch set.
Figure 53:
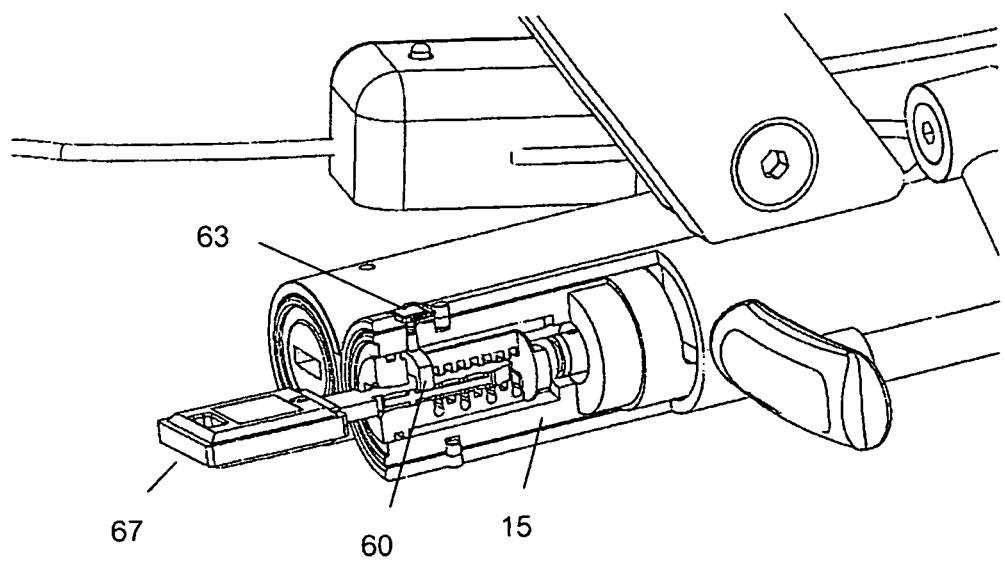
FIG. 53 is an enlarged, partial cut-away view of a locking mechanism connected to the alarm system and anti-start system with a key inserted therein.

Alarm system according to FIG. 51-53, the first locking mechanism 6 and the second locking mechanism 10 comprises a turning mechanism 15 which is turned by a key 67. The turning mechanism 15 comprises one key code set having a key code member 60 including a protrusion for use in abutting through a through hole to the micro switch 63 installed on the wall of the axial tube 1. When a key 67 is inserted to unlock the brake lever/clutch locking device, said micro switch 63 is the mechanism used in activating the electronic security system 75 to emit the code signal wave to determine the code signal wave of the key 67 having the signal code storage device attached thereto. If the code signal from the key matches the code signal from the electronic security system 75 installed inside the automobile, the sound alarm system will not be turned on via the sound alarm device 66. If it is unlocked by any another different devices or a key without the code signal that matches the code signal from the security system provided inside the automobile, the security system will turn on the alarm system to alert the unusual situation.

That is to say, the aforementioned key code member 60 includes the protrusion to be coupled to a rod 61 used in pressing a micro switch 63 having a return spring 62. The rod 51 extends to the micro switch 63 having the signal wire 64 connecting to the electronic security system 75, and the lower portion of the key code member 60*a* is inclined corresponding with an inserting direction. The length of the rod 61 matches the distance where the micro switch 63 can be operated.

Figure 54:
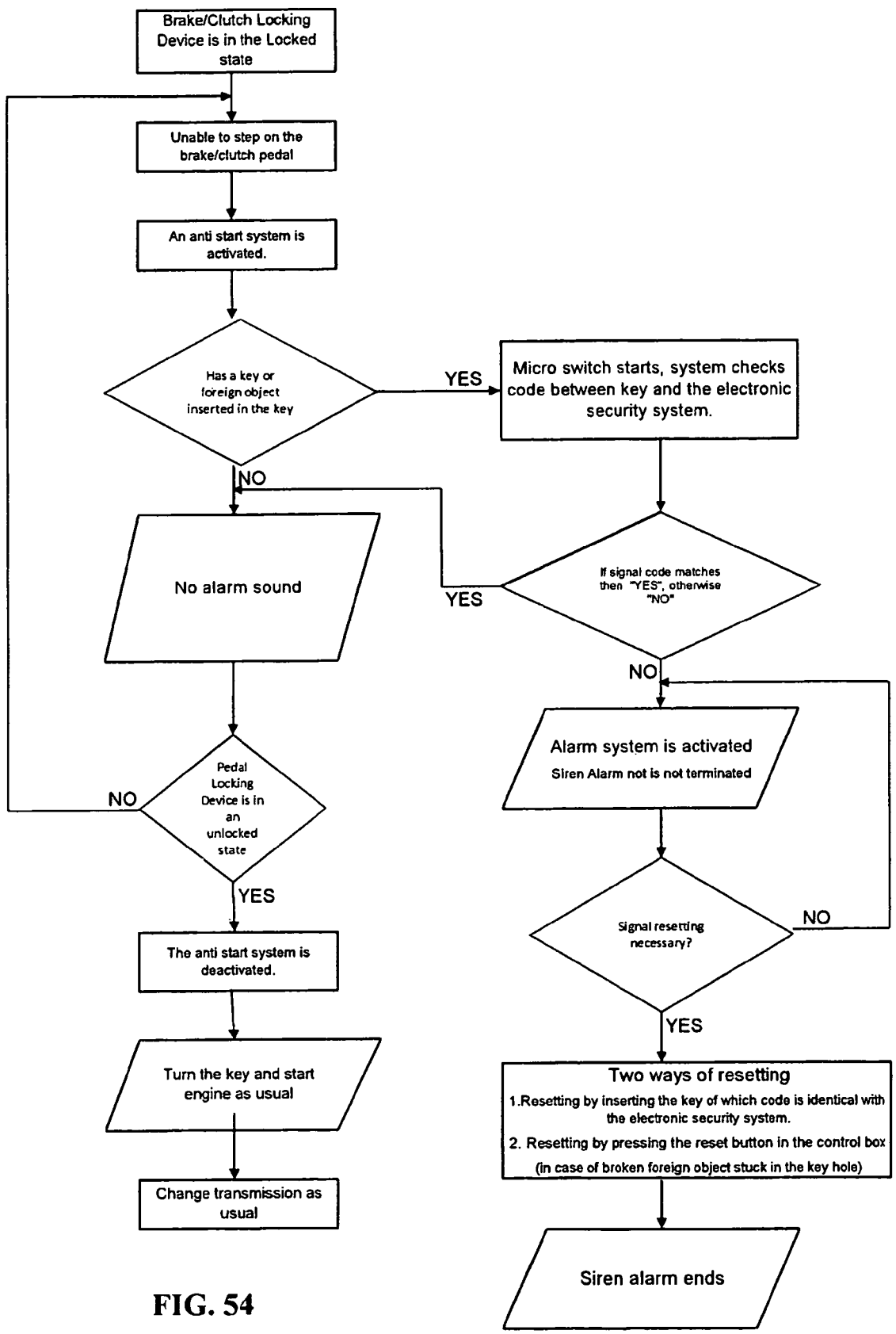
FIG. 54 is a flow diagram of the operational configuration of the alarm system and the anti-start system.

FIG. 54 shows the flow-diagram of another embodiment of the security system of the locking mechanism of the brake lever/clutch locking device according to the present invention. When the turning mechanism 15 is inserted with the key or invaded by some foreign objects, the security system will be activated by the micro switch 63 and transmit the signal wave to determine the code signal stored on a part of the key. In case the code signal matches the preset one, the alarm device 66 will not go off. On the other hand, in case the code signal does not match the preset one, the alarm system will be triggered and remain active by the security system. The aforementioned security system is able to terminate the alarm system by inserting the key with the correct preset code or pressing the reset button on the security box to reset the security system to the original condition before inserting the key or entering any foreign object into the turning mechanism 15.

Figure 55:
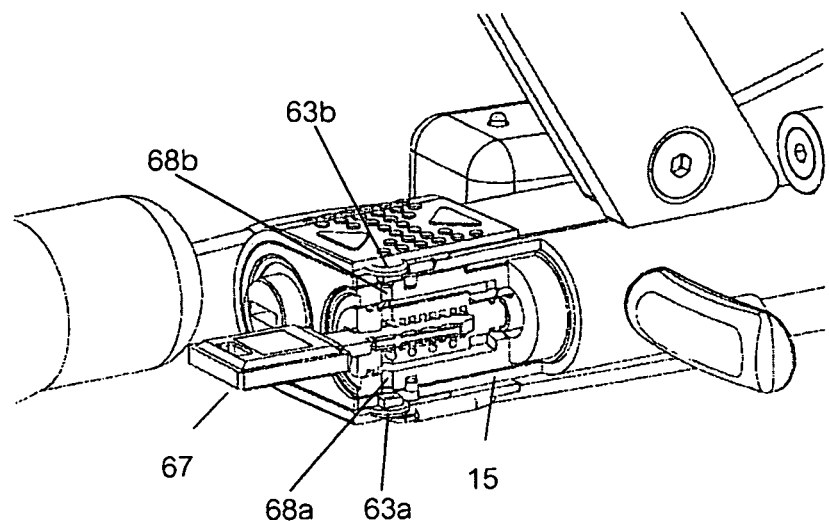
FIG. 55 is an enlarged, partial cut-away view of a locking mechanism connected to the alarm system and anti-start system and infrared switch with a key inserted therein.

According to FIG. 55, the present invention provided with the turning mechanism 15 along with one key code set as mentioned above according to another embodiment includes a through hole. The two ends (68*a*, 68*b*) of the through hole are provided with the infrared switch (63*a*,63*b*) on the opposite sides. The infrared switch activates the electronic security system 75 to emit the code signal wave to determine the code signal wave of the key 67 having the signal code storage device attached thereto. If the code signal from the key 67 matches the code signal from the electronic security system 75 installed inside the automobile, the sound alarm device 66 will not go off. If it is unlocked by another different device or the key without the code signal that matches the code signal from the security system provided inside the automobile, the security system will turn on the alarm system to alert the unusual situation.

Those skilled in the art will appreciate that changes could be made to the embodiments described above without departing from the broad inventive concept thereof. Therefore, the electronic learning device with a graphic user interface for interactive writing is not limited to the particular embodiments disclosed, but it is intended to cover modifications within the spirit and scope of the present invention as defined by the appended claims.

All references, patent applications, and patents mentioned above are incorporated herein by reference in their entirety and are not to be construed as an admission that any of the cited documents constitutes prior art, or as an admission against interest in any manner.

We claim:

1. An anti-lock mechanism for use with a brake/clutch locking device having an axial tube and a slidable axial tube, a bored hole provided in a wall of the axial tube and on the slidable axial tube in a position upstream of a locking position of the brake/clutch locking device, the anti-lock mechanism comprising:
 a mechanical chamber having a wall;
 a pin in the mechanical chamber for use in preventing the slidable axial tube from sliding in the axial tube and on the slidable axial tube in the position upstream of the locking position of the brake/clutch locking device, the pin having an upper end with a protruding lower edge;
 a coil spring biasing the pin;
 a block having:
  a front end and a rear end, the front end having a shoulder portion having a shape corresponding to the protruding lower edge of the pin, and
  an appropriate shape and size to slide inside the mechanical chamber between a first position in which the shoulder portion supports the protruding lower edge of the pin and a second position allowing the pin to slide down into the bored hole and block the movement of the slidable axial tube, which, in turn, prevents the brake/clutch locking device from sliding into the brake/clutch locking position;
 a spring to apply a pushing force to the rear end of the block;
 an axle provided at the upper end of the pin to extend through the wall of the mechanical chamber in an outward direction to:
  pull the pin out of a position that blocks the slidable axial tube; and
  place the pin onto the shoulder of the block; and
 a block holding axle protruding through the wall of the mechanical chamber, operatively coupled to the block to move the block between the first and second positions to allow the pin to be placed into a position suitable for preventing the brake/clutch locking device from entering the locking position in relation with a retreating of the block,
 wherein when an external force is applied to a main structure of an automobile in a relative direction and angle, the block produces sufficient kinetic energy to overcome a spring force by the spring and the block is moved from the first position to the second position.

2. An anti-lock mechanism for use with a brake/clutch locking device having an axial tube and a slidable axial tube, a bored hole provided in a wall of the axial tube and on the slidable axial tube in a position upstream of a locking position of the brake/clutch locking device, the bored hole on the slidable axial tube having a sloped portion, the anti-lock mechanism comprising:

a mechanical chamber having a wall;
a pin in the mechanical chamber for use in preventing the slidable axial tube from sliding in the axial tube and passing the axial tube wall and the slidable axial tube in the position upstream of the locking position of the brake/clutch locking device, the pin having an end portion and a curved top with a protruding lower edge;
a coil spring biasing the pin;
a block having a front end and a rear end, the front end having a shoulder portion having a shape of an axle with a rounded tip extending in correspondence with the protruding lower edge of the pin, the block having a mass and a shape and a size to slide inside the mechanical chamber between a first position in which the rounded tip supports the protruding lower edge of the pin and a second position allowing the pin to slide down into the bored hole and prevent the slidable axial tube from moving into the locking position, the end portion of the pin protruding out of the wall of the slidable axial tube in a crossing direction adjacent to the axial tube and preventing the slidable axial tube from moving into the locking position;
a spring configured to apply a pushing force to the rear end of the block; and
an axle provided at an upper end of the pin to extend through the wall of the mechanical chamber in an outward direction,
wherein when an external force is applied to a main structure of an automobile in a relative direction and angle, the block produces sufficient kinetic energy to overcome a spring force by the spring and the block is moved from the first position to the second position, and
wherein the sloped portion of the bored hole on the slidable axial tube is to push the end portion of the pin back into the mechanical chamber while the slidable axial tube is backed into a normal state.

3. An anti-lock mechanism for use with the brake/clutch locking device having an axial tube and a slidable axial tube, a bored hole provided in a wall of the axial tube and on the slidable axial tube in a position upstream of a locking position of the brake/clutch locking device, the bored hole on the slidable axial tube having a sloped portion, the anti-lock mechanism is characterized by comprising:

rings for partitioning a lock protecting mechanism chamber inside the slidable axial tube;
a pin inside the lock protecting mechanism chamber, the pin having a protruding edge located inside a pin chamber;
a block inside the lock protecting mechanism chamber, the block having a shape and size to slide inside the slidable axial tube and to engage with an axle of a screwing mechanism, the block comprises a first coil spring; a front part of the block to form a shoulder having a rounded tip shape corresponding to the protruding edge of the pin, the shoulder comprises a second coil spring for preventing the slidable axial tube from sliding through a bush which bush is provided on the wall of the slidable axial tube and the bored hole on the axial tube wall in a position upstream of a locking position of a brake/clutch locking device of an automobile, one edge of the bored hole is the sloped portion for pushing the pin back into a lock-ready position after the slidable axial tube slides back into a normal unlocked state,
wherein when an external force is applied to a main structure of the automobile in a relative direction and angle, the block produces sufficient kinetic energy to overcome a spring force by the spring and the block is moved from the first position to the second position; and
an axle end at an end portion of the block extending into a groove on the wall of the slidable axial tube for preventing a pivot movement of the block around the axle of the screwing mechanism,
wherein the front shoulder of the block moves out from under the protruding edge of the pin and the pin slides down into the bored hole and a pin end protruding from the slidable axial tube wall blocks the edge of the axial tube to prevent the slidable axial tube from entering the locking position when a main structure of the automobile is subject to an external force in a relative direction and angle.

4. An anti-lock mechanism for use with the brake/clutch locking device having an axial tube and a slidable axial tube, a bored hole provided on the slidable axial tube in a position upstream of a locking position of the brake/clutch locking device, the anti-lock mechanism comprises:

a pin inside the slidable axial tube; a block having an appropriate shape and size to be slidable inside the slidable axial tube and to engage with a return spring of the brake/clutch locking device; the block comprises a rounded shoulder; a lower end of the return spring to push the block on the rounded shoulder; another end of the return spring to push the end of the first locking mechanism connected inside the axial tube; the pin comprises a coil spring for driving the end portion of the pin to slide into the bored hole,
when an external force of more than 20 kg·f is applied to a main structure of an automobile in a relative direction and angle, the block produces sufficient kinetic energy to overcome a spring force by the spring and the block is moved from the first position to second position; and
an axle end at the end portion of the block extending into a slot on a wall of the slidable axial tube for preventing the block from movement around a horizontal axis of the block;
wherein when an external force is applied to a main structure of an automobile in a relative direction and angle, the block produces sufficient kinetic energy to overcome a spring force by the spring and the front shoulder of the block is moved inwardly to the spring and causes the coil spring and pin to move along with the block, and the pin slides down into the bored hole preventing the slidable axial tube from entering the locking position.

5. The anti-lock mechanism according to claim 4, wherein the anti-lock mechanism further comprises a ring partitioning a lock protecting mechanism chamber inside the slidable axial tube.

6. The anti-lock mechanism according to claim 4, wherein the anti-lock mechanism further comprises the coil spring biasing the block and the ring.

7. An anti-lock mechanism for use with the brake/clutch locking device having an axial tube and a slidable axial tube, a first locking mechanism and a second locking mechanism, the anti-lock mechanisms comprise:

a block with an appropriate shape and size to slide inside a mechanical chamber comprising a slot on a side wall of the mechanical chamber, the mechanical chamber is placed in an end collar of the second locking mechanism of the brake/clutch locking device, the front end of the block has an axle protruding into a center hole which front end is opposite to the open end of the mechanical chamber;

a dowel on one side of the block, slidable in the slot and on an opposite side provided with a spring and a pin inside a hole;

two mating holes corresponding to the pin on an internal wall of the mechanical chamber, one end of a spring is provided at a front end of the mechanical chamber and another end of the spring to push at one end of a chamber of the second locking mechanism, when an external force of more than 20 kg·f is applied to a main structure of an automobile in a relative direction and angle, the block produces sufficient kinetic energy to overcome a spring force by the spring and the block is moved from a first mating hole to a second mating hole, and the dowel is placed into a slot of a plate of the brake/clutch locking device.

8. A brake/clutch locking device for use in a vehicle having one or more pedals and a steering column, the brake/clutch locking device comprising:

an axial tube;

a slidable axial tube having one end in the axial tube and other end;

a bored hole provided in a wall of the axial tube and on the slidable axial tube in a position upstream of a locking position of the brake/clutch locking device;

a blocking panel rod attached to the other end of the slidable axial tube;

a holding leg for securing the brake/clutch locking device to the vehicle at the steering column;

a return spring inside the axial tube, the return spring operatively coupled to the slidable axial tube;

a lock-pulling mechanism comprising:

a first lock pulling mechanism connected with the blocking panel rod, the upper end of the first lock pulling mechanism is inserted through a collar supporting the first lock pulling mechanism on the wall of the axial tube;

a second lock pulling mechanism connected with the first lock pulling mechanism for defining a retreating sliding distance of the slidable axial tube to prevent the movement out of the end of the axial tube;

a first locking mechanism connected to an upper end of the axial tube, for locking the blocking panel rod in a locked position; the first locking mechanism comprising:

a first turning mechanism within a housing which is turned by a key and a first pin wherein the first pin includes a slidable pin inside the housing along with a spring pushing an end of the slidable pin to be locked with the bored hole on the slidable axial tube located in a corresponding position when the second lock pulling mechanism is pulled to lock the brake/clutch locking device;

a second locking mechanism installed on a side of the first locking mechanism, for locking the blocking panel rod in the locked position after the first locking mechanism has been locked, the second locking mechanism connected to the upper end of the axial tube; the second locking mechanism comprising:

a second turning mechanism which is turned by the key of the first turning mechanism wherein a lower portion of the second turning mechanism and a second pin include a locking pin in a lower end groove detachably engaged to a ridge on the end portion of the second locking mechanism, the second locking mechanism comprises the locking pin with a second spring, and a third spring pushing an end of the second locking mechanism wherein the locking pin slides into a locking position through the groove on the collar of the second locking mechanism, the second locking mechanism is securely engaged in the locked position by pressing the second locking mechanism so that the locking pin is inserted through the groove on the collar and the bored hole of the axial tube and the bored hole on the wall of the slidable axial tube, which have been placed in a corresponding position;

an anti-lock mechanism connected to the upper end of the axial tube;

wherein the anti-lock mechanism is to prevent the brake/clutch locking device from engaging in the locked position in an abnormal operating situation.

9. The brake/clutch locking device having an anti-lock mechanism according to claim 8, wherein the anti-lock mechanism comprises:

a mechanical chamber having a wall;

a third pin in the mechanical chamber to prevent the slidable axial tube from sliding in the axial tube and on the slidable axial tube in the position upstream of the locking position of the brake/clutch locking device, the third pin having an upper end with a protruding lower edge;

a coil spring biasing the third pin;

a block having a front end and a rear end, the front end having a shoulder portion having a shape corresponding to the protruding lower edge of the third pin, the block having a mass and an appropriate shape and size to slide inside the mechanical chamber between a first position in which the shoulder portion supports the protruding lower edge of the third pin and a second position allowing the third pin to slide down into the bored hole and block the movement of the slidable axial tube, which, in turn, prevents the brake/clutch locking device from sliding into the brake/clutch locking position;

a fourth spring to apply a pushing force to the rear end of the block;

an axle provided at the upper end of the pin to extend through the wall of the mechanical chamber in an outward direction to pull the third pin out of a position that blocks the slidable axial tube and to place the pin onto the shoulder of the block; and a block holding axle protruding through the wall of the mechanical chamber, operatively coupled to the block to move the block between the first and second positions and to allow the third pin to be placed into a position for preventing the brake/clutch locking device from entering the locking position in relation with a retreating of the block, when an external force is applied to a main structure of an automobile in a relative direction and angle, the mass of the block produces sufficient kinetic energy to overcome a spring force by the fourth spring and the block moves from the first position to the second position.

10. The brake/clutch locking device having an anti-lock mechanism according to claim 8, wherein the bored hole comprises a sloped portion and the anti-lock mechanism comprises:

a mechanical chamber having a wall;

a third pin in the mechanical chamber to prevent the slidable axial tube from sliding in the slidable axial tube in the position upstream of the locking position of the brake/clutch locking device, the third pin having an end portion and a curved top with a protruding lower edge;

a coil spring biasing the third pin;

a block having a front end and a rear end, the front end having a shoulder portion having a shape of an axle with a rounded tip extending in correspondence with the protruding edge of the third pin, the block having a mass and a shape and a size to slide inside the mechanical chamber between a first position in which the rounded tip supports the protruding lower edge of the third pin and a second position allowing the third pin to slide down into the bored hole and prevent the slidable axial tube from moving into the locking position, the end portion of the third pin protruding out of the wall of the slidable axial tube in a crossing direction adjacent to the axial tube to prevent the slidable axial tube from moving into the locking position;

a fourth spring to apply a pushing force to the rear end of the block; and an axle provided at an upper end of the third pin to extend through the wall of the mechanical chamber in an outward direction, when an external force is applied to a main structure of an automobile in a relative direction and angle, the mass of the block produces sufficient kinetic energy to overcome a spring force by the fourth spring and the block moves from the first position to the second position, and wherein the sloped portion of the bored hole on the slidable axial tube is to push the end portion of the third pin back into the mechanical chamber while the slidable axial tube is backed into a normal state.

11. The brake/clutch locking device having an anti-lock mechanism according to claim 8, wherein the anti-lock mechanism comprising:

a third pin inside the slidable axial tube;

a block having appropriate shape and size to slide inside the slidable axial tube, and to engage with the return spring of the brake/clutch locking device; the block has a rounded shoulder; a lower end of the return spring pushes the block on the rounded shoulder; the other end of the return spring pushes the end of the first locking mechanism connected inside the axial tube; the third pin aligns with a coil spring for driving an end portion of the third pin to slide into the bored hole, wherein when an external force of more than 20 kg·f is applied to a main structure of an automobile in a relative direction and angle, the block produces sufficient kinetic energy to overcome a spring force by the return spring and the block is moved from the first position to second position; and an axle at an end portion of the block extending into a slot on a wall of the slidable axial tube to prevent the block from movement around a horizontal axis of the block;

wherein when the external force is applied to the main structure of the automobile in the relative direction and angle, the block produces sufficient kinetic energy to overcome the spring force by the spring and the front shoulder of the block is moved inwardly to the spring and the coil spring and the third pin move along with the block, and the third pin slides down into the bored hole preventing the slidable axial tube from entering the locking position.

12. The brake/clutch locking device having an anti-lock mechanism according to claim 11, wherein the anti-lock mechanism further comprises a ring partitioning the lock protecting mechanism chamber inside the slidable axial tube and the coil spring biasing the block and the ring.

13. The brake/clutch locking device according to claim 8 further comprising at least one of an alarm system and an anti-start system operatively connected to at least one locking mechanism that includes:

an electronic security system including a sound alarm device and a micro switch installed on a wall of the axial tube, the micro switch is in electrical communication with the sound alarm device, and wherein the first locking mechanism further comprises the first turning mechanism that comprises a key code set including a key having a signal code storage device in which a code signal wave is stored and a key code member including a protrusion for use in abutting through a through hole to the micro switch, wherein the sound alarm device is not activated when the key is inserted for use in turning the first turning mechanism and the code signal from the key matches the code signal from the electronic security system and wherein the sound alarm device is activated if the first turning mechanism is unlocked by any another device different from the key without the code signal that matches the code signal from the electronic security system.

14. The brake/clutch locking device according to claim 13 wherein the protrusion of the key code member is coupled to a rod to press the micro switch and the micro switch has a return spring, the rod having a signal wire connecting to the electronic security system, and a lower portion of the key code member is inclined corresponding with an inserting direction.

15. The brake/clutch locking system according to claim 14, further comprising an engine cut off switch to cut off an engine from a starting system when the brake lever/clutch locking device is in the locked position to prevent the engine from starting, wherein the engine cut off switch connects the engine start system when the brake/clutch locking device is in an unlocked position to allow the engine to start and brake lever/clutch pedals to operate in response to a user stepping on the pedals, the engine cut off switch provided with a switch pressing rod mounted at the lower end of the axial tube, the function of the switch is related to the blocking rod pressing the switch pressing rod to cut off the engine when the slidable axial tube sliding to be locked in the locking position and the switch pressing rod being released when the slidable axial tube moving into the unlocked position, then the engine is able to start again.

16. The brake/clutch locking system according to claim 13 wherein the insertion of the key with a correct preset code or pressing a reset button on a security box resets the security system to a deactivated condition when the alarm system has been activated.

17. The brake/clutch locking system according to claim 8 further comprising:

an electronic security system including a sound alarm device and an infrared switch in electrical communication with the sound alarm device, and wherein the first locking mechanism further comprises the first turning mechanism that comprises a key code set including a key having a signal code storage device in which a code signal wave is stored and a key code member, wherein the infrared switch does not activate the sound alarm device when the key is inserted for use in turning the first turning mechanism and the code signal from the key matches the code signal from the electronic security system and;

wherein the infrared switch activated the sound alarm device if the first turning mechanism is unlocked by any another device different from the key without the code signal that matches the code signal from the electronic security system.

18. A brake/clutch locking device for use in a vehicle having one or more pedals and a steering column, the brake/clutch locking device comprising:
an axial tube;
a slidable axial tube having one end in the axial tube and other end;
a bored hole provided in a wall of the axial tube and on the slidable axial tube in a position upstream of a locking position of the brake/clutch locking device;
a blocking panel rod attached to the other end of the slidable axial tube;
a holding leg for securing the brake/clutch locking device to the vehicle at the steering column;
a return spring inside the axial tube, the return spring operatively coupled to the slidable axial tube;
a supporting axle to be inserted in a collar connected to the axial tube, an upper end of the supporting axle is connected to a pulling mechanism and a lower end of the supporting axle is connected to the panel blocking rod;
a first locking mechanism connected to an upper end of the axial tube, for locking the blocking panel rod in a locked position; the first locking mechanism comprising:
a first turning mechanism which is turned by a key and a first pin working correspondingly wherein the first pin includes a slidable pin along with a first spring pushing an end of the slidable pin to be locked with an end of a two-fang rod provided at an end of the slidable axial tube located in the corresponding position when the brake/clutch locking device is in a locking position;
a second locking mechanism installed on a side of the first locking mechanism for locking the blocking panel rod in the locked position after the first locking mechanism has been locked, the second locking mechanism connected to the upper end of the axial tube; the second locking mechanism comprising:
a second turning mechanism inside a housing wherein the lower portion of the second turning mechanism engages with a second pin inside a first housing corresponding to a locking pin in a second housing is pushed with a second spring through a slot of a collar through the opening of the axial tube to the bored hole of the slidable axial tube located in the corresponding position to the locking position, the second locking mechanism is securably engaged in the locked position by pressing the second locking mechanism so that the locking pin is inserted through a groove on the chamber wall, the opening of the axial tube and the bored hole on the wall of the slidable axial tube;
an anti-lock mechanism connected to the upper end of the axial tube;
wherein the anti-lock mechanism prevents the brake/clutch locking device from engaging in the locked position in an abnormal operating situation.

19. The brake/clutch locking device having an anti-lock mechanism according to claim 18, wherein the anti-lock mechanism comprises:
a mechanical chamber having a wall;
a third pin in the mechanical chamber to prevent the slidable axial tube from sliding in the axial tube wall and the slidable axial tube in the position upstream of the locking position of the brake/clutch locking device, the third pin having an upper end with a protruding lower edge;
a coil spring biasing the third pin;
a block having a front end and a rear end, the front end having a shoulder portion having a shape corresponding to the protruding lower edge of the third pin, the block having a mass and an appropriate shape and size to slide inside the mechanical chamber between a first position in which the shoulder portion supports the protruding lower edge of the third pin and a second position allowing the third pin to slide down into the bored hole and block the movement of the slidable axial tube, which, in turn, prevents the brake/clutch locking device from sliding into the brake/clutch locking position;
a fourth spring to apply a pushing force to the rear end of the block;
an axle provided at the upper end of the third pin to extend through the wall of the mechanical chamber in an outward direction to pull the third pin out of a position that blocks the slidable axial tube to place the third pin onto the shoulder of the block; and
a block holding axle protruding through the wall of the mechanical chamber, operatively coupled to the block to move the block between the first and second positions to allow the third pin to be placed into a position suitable for preventing the brake/clutch locking device from entering the locking position in relation with a retreating of the block,
wherein when an external force is applied to a main structure of an automobile in a relative direction and angle, the block produces sufficient kinetic energy to overcome spring force by the fourth spring and the block is moved from the first position to the second position.

20. The brake/clutch locking device having an anti-lock mechanism according to claim 18, wherein the anti-lock mechanism comprises:
a mechanical chamber having a wall;
a third pin in the mechanical chamber to prevent the slidable axial tube from sliding in the axial tube wall and the slidable axial tube in the position upstream of the locking position of the brake/clutch locking device, the third pin having an end portion and a curved top with a protruding lower edge;
a coil spring biasing the third pin;
a block having a front end and a rear end, the front end having a shoulder portion having a shape of an axle with a rounded tip extending in correspondence with the protruding edge of the third pin, the block having a mass and a shape and a size to slide inside the mechanical chamber between a first position in which the rounded tip supports the protruding lower edge of the third pin and a second position allowing the third pin to slide down into the bored hole and prevent the slidable axial tube from moving into the locking position, the end portion of the third pin protruding out of the wall of the slidable axial tube in a crossing direction adjacent to the axial tube and preventing the slidable axial tube from moving into the locking position;
a fourth spring to apply a pushing force to the rear end of the block; and
an axle provided at the upper end of the pin to extend through the wall of the mechanical chamber in an outward direction,
when an external force is applied to a main structure of an automobile in a relative direction and angle, the mass of the block produces sufficient kinetic energy to overcome a spring force by the fourth spring and the block is moved from the first position to the second position, and wherein the sloped portion of the bored hole on the slidable axial tube pushes the end portion of the third pin back into the mechanical chamber while the slidable axial tube is backed into a normal state.

21. The brake/clutch locking device having an anti-lock mechanism according to claim 18, wherein the anti-lock mechanism comprising:

a third pin inside the slidable axial tube;

a block having appropriate shape and size to slide inside the slidable axial tube, and to engage with the return spring of the brake/clutch locking device; the block has a rounded shoulder; a lower end of the return spring pushes the block on the rounded shoulder; the other end of the return spring pushes the end of the first locking mechanism connected inside the axial tube; the third pin aligns with a coil spring for driving the end portion of the third pin to slide into the bored hole, wherein when an external force of more than 20 kg·f is applied to a main structure of an automobile in a relative direction and angle, the block produces sufficient kinetic energy to overcome spring force by a fourth spring and the block is moved from the first position to second position; and an axle at an end portion of the block extending into a slot on a wall of the slidable axial tube for preventing the block from movement around a horizontal axis of the block;

wherein when an external force is applied to the main structure of the automobile in the relative direction and angle, the block produces sufficient kinetic energy to overcome the spring force by the fourth spring and the front shoulder of the block is moved inwardly to the spring and causes the coil spring and third pin to move along with the block, and the third pin slides down into the bored hole preventing the slidable axial tube from entering the locking position.

22. The brake/clutch locking device having an anti-lock mechanism according to claim 21, wherein the anti-lock mechanism further comprises a ring partitioning a lock protecting mechanism chamber inside the slidable axial tube and the coil spring biasing the block and the ring.

23. A brake/clutch locking device for use in a vehicle having one or more pedals and a steering column, the brake/clutch locking device comprising:

an axial tube having a side wall, another side wall spaced from the side wall, and an axially extending opening in the other side wall;

a slidable axial tube having one end in the axial tube and other end for connecting with a blocking panel rod, wherein the opening is a member that defines a retreating sliding distance of the slidable axial tube to prevent a movement out of the end of the axial tube;

a bored hole provided in a wall of the axial tube and on the slidable axial tube in a position upstream of a locking position of the brake/clutch locking device;

the blocking panel rod attached to the other end of the slidable axial tube;

a holding leg for securing the brake/clutch locking device to the vehicle at the steering column;

a return spring inside the axial tube, the return spring operatively coupled to the slidable axial tube;

a gripping rod slidably attached to the opening, wherein when pulling the gripping rod, the blocking panel rod is moved inward to the axial tube to move the brake/clutch locking device into a locked position;

a first locking mechanism connected to an upper end of the axial tube, for locking the blocking panel rod in the locked position; the first locking mechanism comprising:

a first turning mechanism which is turned by a key and a first pin working correspondingly wherein the first pin includes a slidable pin along with a first spring pushing the end of the slidable pin to be locked with an end of a two-fang rod provided at the end of the predetermined slidable axial tube located in the corresponding position when the brake/clutch locking device is in the locking position;

a second locking mechanism installed on a side of the first locking mechanism for locking the blocking panel rod in the locked position after the first locking mechanism has been locked, the second locking mechanism connected to the upper end of the axial tube; the second locking mechanism comprising:

a second turning mechanism inside a housing wherein the lower portion of the second turning mechanism engaged with a second pin inside a first housing corresponding to a locking pin in a second housing is pushed with a second spring through a slot of a collar through the opening of the axial tube to be locked with an end of a two-fang rod connected to the slidable axial tube located in the corresponding position to the locking position, the second locking mechanism is securably engaged in the locked position by pressing the second locking mechanism so that the locking pin is inserted through the groove on the collar, and the opening of the axial tube is locked with an end of a two-fang rod connected to the slidable axial tube, which have been placed in a corresponding position;

an anti-lock mechanism connected to the upper end of the axial tube; wherein the anti-lock mechanism prevents the brake/clutch locking device from engaging in the locked position in an abnormal operating situation.

24. The brake/clutch locking device having an anti-lock mechanism according to claim 23, wherein the anti-lock mechanism comprising:

a mechanical chamber having a wall;

a third pin in the mechanical chamber to prevent the slidable axial tube from sliding in the axial tube and on the slidable axial tube in the position upstream of the locking position of the brake/clutch locking device, the pin having an upper end with a protruding lower edge;

a coil spring biasing the third pin;

a block having a front end and a rear end, the front end having a shoulder portion having a shape corresponding to the protruding lower edge of the third pin, the block having a mass and an appropriate shape and size to slide inside the mechanical chamber between a first position in which the shoulder portion supports the protruding lower edge of the third pin and a second position allowing the third pin to slide down into the bored hole and block the movement of the slidable axial tube, which, in turn, prevents the brake/clutch locking device from sliding into the brake/clutch locking position;

a fourth spring to apply a pushing force to the rear end of the block;

an axle provided at the upper end of the third pin to extend through the wall of the mechanical chamber in an outward direction to pull the third pin out of a position that blocks the slidable axial tube and to place the third pin onto the shoulder of the block; and a block holding axle protruding through the wall of the mechanical chamber, operatively coupled to the block to move the block between the first and second positions to allow the third pin to be placed into a position suitable for preventing the brake/clutch locking device from entering the locking position in relation with a retreating of the block, wherein when an external force is applied to main structure of an automobile in a relative direction and angle, the block produces sufficient kinetic energy to overcome spring force by the fourth spring and the block is moved from the first position to the second position.

25. The brake/clutch locking device having an anti-lock mechanism according to claim 23, wherein the anti-lock mechanism comprising:

a mechanical chamber having a wall;

a third pin in the mechanical chamber for use in preventing the slidable axial tube from sliding in and the slidable axial tube in the position upstream of the locking position of the brake/clutch locking device, the third pin having an end portion and a curved top with a protruding lower edge;

a coil spring biasing the third pin;

a block having a front end and a rear end, the front end having a shoulder portion having a shape of an axle with a rounded tip extending in correspondence with the protruding edge of the third pin, the block having a mass and a shape and a size to slide inside the mechanical chamber between a first position in which the rounded tip supports the protruding lower edge of the third pin and a second position allowing the third pin to slide down into the bored hole and prevent the slidable axial tube from moving into the locking position, the end portion of the third pin protruding out of the wall of the slidable axial tube in a crossing direction adjacent to the axial tube and preventing the slidable axial tube from moving into the locking position;

a fourth spring to apply a pushing force to the rear end of the block; and an axle provided at the upper end of the third pin to extend through the wall of the mechanical chamber in an outward direction, wherein when an external force is applied to a main structure of an automobile in a relative direction and angle, the block produces sufficient kinetic energy to overcome a spring force by the fourth spring and the block is moved from the first position to the second position, and wherein the sloped portion of the bored hole on the slidable axial tube pushes the end portion of the third pin back into the mechanical chamber while the slidable axial tube is backed into a normal unlocked state.

26. A brake/clutch locking device for use in a vehicle having one or more pedals and a steering column, the brake/clutch locking device comprising:

an axial tube;

a slidable axial tube having one end in the axial tube and other end;

a return spring inside the slidable axial tube; wherein the axial tube is assembled with the slidable axial tube by a pin, each end of the pin attached to a wall of the axial tube on an opposite side and inserted through a line of the opening on the wall of the slidable axial tube in a corresponding position for use as an upper blocking line of a return spring and a sliding distance defining member of the slidable axial tube;

a bored hole provided in a wall of the axial tube;

a blocking panel rod attached to the other end of the slidable axial tube;

a holding leg for securing the brake/clutch locking device to the vehicle at the steering column attached on the axial tube;

a first locking mechanism connected to an upper end of the slidable axial tube, for locking the blocking panel rod in a locked position; the first locking mechanism comprising:

a first turning mechanism which is turned by a key and a first pin working correspondingly wherein the pin includes a slidable pin along with a first spring pushing the end of the slidable pin to be locked with a slot on a plate when the pulling handle is pulled, thereby the blocking panel rod slides inward to the axial tube to block the brake and clutch pedals of an automobile;

a second locking mechanism installed on side of the first locking mechanism for locking the blocking panel rod in the locked position after the first locking mechanism has been locked, the second locking mechanism connected to a lateral side of the axial tube; the second locking mechanism comprising:

a second turning mechanism inside a housing wherein the lower portion of the second turning mechanism engaged with a second pin inside a first housing corresponding to a locking pin in a second housing is pushed with a second spring through a slot of a collar through a slot on the plate and the bored hole on the slidable axial tube located in the corresponding position to the locking position, the second locking mechanism is securably engaged in the locked position by pressing the second locking mechanism so that the locking pin is inserted through the groove on the collar;

an anti-lock mechanism incorporated inside the slidable axial tube;

wherein the anti-lock mechanism prevents the brake/clutch locking device from engaging in the locked position in an abnormal operating situation;

wherein the anti-lock mechanism comprises:

a ring and a ring partitioning a lock protecting mechanism chamber inside the slidable axial tube;

a third pin inside the lock protecting mechanism chamber, the third pin having a protruding edge of the pin located inside a pin chamber;

a block inside the lock protecting mechanism chamber, the block having a shape and size to slide inside the slidable axial tube and to engage with an axle of a screwing mechanism, the block having a first coil spring; a front part of the block forming a shoulder having a rounded tip shape corresponding to the protruding edge of the third pin, the third pin having a second coil spring for preventing the slidable axial tube from sliding through a bush which bush is provided on the wall of the slidable axial tube and the bored hole on the axial tube wall in a position upstream of a locking position of a brake/clutch locking device of an automobile, one edge of the bored hole is the sloped portion for pushing the third pin back into a lock-ready position after the slidable axial tube slides back into a normal unlocked state, wherein when an external force is applied to a main structure of an automobile in a relative direction and angle, the block produces sufficient kinetic energy to overcome a spring force by a fourth spring and the block is moved from the first position to the second position; and an axle end at an end portion of the block extending into a groove on a wall of the slidable axial tube for preventing a pivot movement of the block around the axle of the screwing mechanism, wherein the front shoulder of the block moves out from under the protruding edge of the third pin, the third pin slides down into the bored hole and a pin end protruding from the slidable axial tube wall blocks the edge of the axial tube preventing the slidable axial tube from entering the locking position when the main structure of the automobile is subject to an external force in a relative direction and angle.

27. The brake/clutch locking device having an anti-lock mechanism according to claim 26, wherein the anti-lock mechanism comprising:

the block with appropriate shape and size to slide inside a mechanical chamber having a slot on a side wall of the mechanical chamber, the mechanical chamber is placed in an end collar of the second locking mechanism of the brake/clutch locking device, the front end of the block has an axle protruding into a center hole which is opposite to an open end of the mechanical chamber;

a dowel on one side of the block, slidable in the slot and on an opposite side provided with the spring and the third pin inside a hole;

two mating holes corresponding to the pin on the internal wall of the mechanical chamber, one end of the fourth spring is provided at the front end of the mechanical chamber, and the other end of the fourth spring pushes at one end of the second locking mechanism chamber, wherein when an external force of more than 20 kg·f is applied to a main structure of an automobile in a relative direction and angle, the block produces sufficient kinetic energy to overcome a spring force by the fourth spring and the block is moved from a first mating hole to a second mating hole, and the dowel is placed into a slot of a plate of the brake/clutch locking device.

* * * * *